United States Patent
Kia et al.

(10) Patent No.: US 11,487,926 B2
(45) Date of Patent: Nov. 1, 2022

(54) INTEGRATED CIRCUIT WITH A DYNAMICS-BASED RECONFIGURABLE LOGIC BLOCK

(71) Applicant: NORTH CAROLINA STATE UNIVERSITY, Raleigh, NC (US)

(72) Inventors: Behnam Kia, Raleigh, NC (US); William Ditto, Raleigh, NC (US); Yaman Dalal, Raleigh, NC (US); Ravikanth Somsole, Raleigh, NC (US); Siva Rama Maruthi Ven Donepudi Krishna Sesha Sai, Raleigh, NC (US); Allen R. Mendes, Raleigh, NC (US); Akshay Parnami, Raleigh, NC (US); Robin George, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 738 days.

(21) Appl. No.: 16/326,603

(22) PCT Filed: Aug. 29, 2017

(86) PCT No.: PCT/US2017/049177
§ 371 (c)(1),
(2) Date: Feb. 19, 2019

(87) PCT Pub. No.: WO2018/044923
PCT Pub. Date: Mar. 8, 2018

(65) Prior Publication Data
US 2021/0294954 A1    Sep. 23, 2021

Related U.S. Application Data

(60) Provisional application No. 62/380,891, filed on Aug. 29, 2016.

(51) Int. Cl.
*G06F 30/38* (2020.01)
*G06F 30/373* (2020.01)
(Continued)

(52) U.S. Cl.
CPC ............ *G06F 30/38* (2020.01); *G06F 30/333* (2020.01); *G06F 30/337* (2020.01); *G06F 30/373* (2020.01); *G06F 2119/12* (2020.01)

(58) Field of Classification Search
CPC .... G06F 30/333; G06F 30/337; G06F 30/373; G06F 30/38; G06F 2119/12; G06N 3/126; G06N 7/08
See application file for complete search history.

(56) References Cited

U.S. PATENT DOCUMENTS

2008/0150578 A1    6/2008    Kiel et al.
2011/0006807 A1    1/2011    Schneiderwind
(Continued)

OTHER PUBLICATIONS

PCT/US2017/049177, "International Preliminary Report on Patentability", dated Mar. 14, 2019, 7 pages.
(Continued)

*Primary Examiner* — Jack Chiang
*Assistant Examiner* — Aric Lin
(74) *Attorney, Agent, or Firm* — Kilpatrick Townsend & Stockton LLP

(57) ABSTRACT

A system can include a nonlinear circuit and a voltage decoder. The nonlinear circuit can perform an operation on an input voltage. The operation can be changed. A voltage decoder can be communicatively coupled to the nonlinear circuit for receiving an output voltage from the nonlinear circuit that results from the operation performed on the input voltage. The voltage decoder can compare the output voltage to a threshold voltage and determine a result of the operation.

15 Claims, 38 Drawing Sheets

(51) Int. Cl.
    *G06F 30/337*     (2020.01)
    *G06F 30/333*     (2020.01)
    *G06F 119/12*     (2020.01)

(56) References Cited

U.S. PATENT DOCUMENTS

2011/0062986 A1*  3/2011  Ditto .................... H03K 19/20
    326/38
2015/0015304 A1   1/2015  Myers et al.

OTHER PUBLICATIONS

PCT/US2017/049177, "PCT Search Report", dated Dec. 21, 2017, 8 pages.
Song, H., et al., "Winding, Fabrication, Engineering Design, and Other Considerations for 2G HTS Coils," SuperPower Inc., 2013.
Wang, Y. and Song, H., "Influence of turn-to-turn resistivity and coil geometrical size on charging characteristics of no-electrical-insulation REBCO pancake coil," Supercond. Sci. and Technol., 2016, 29:075006.

\* cited by examiner

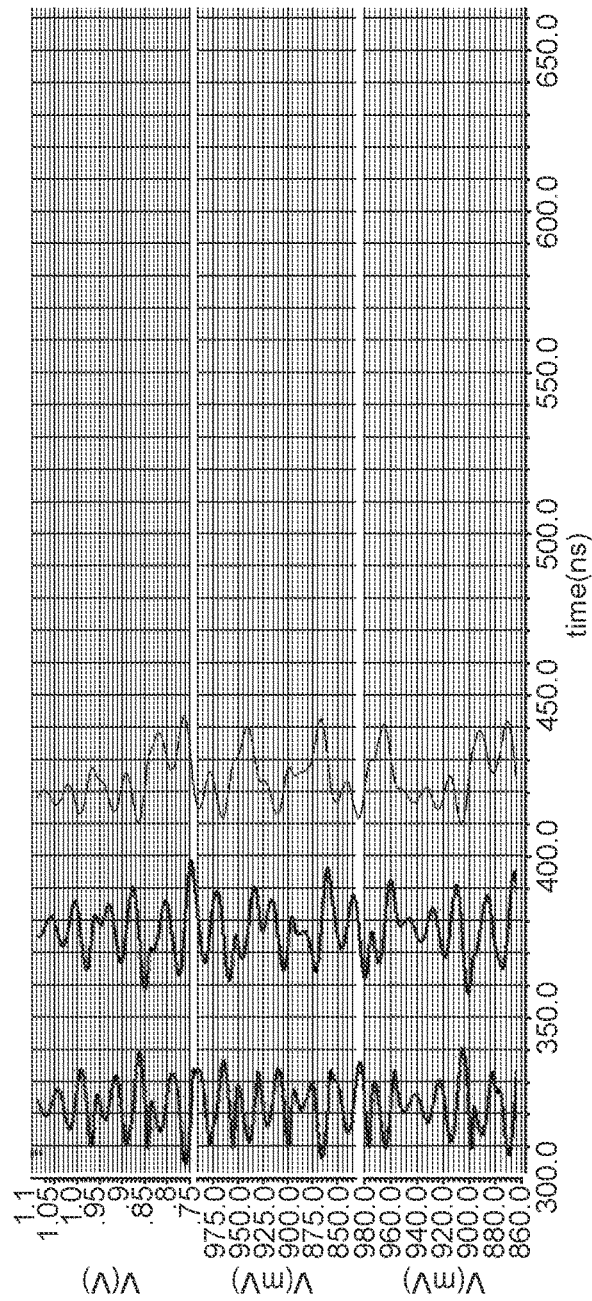
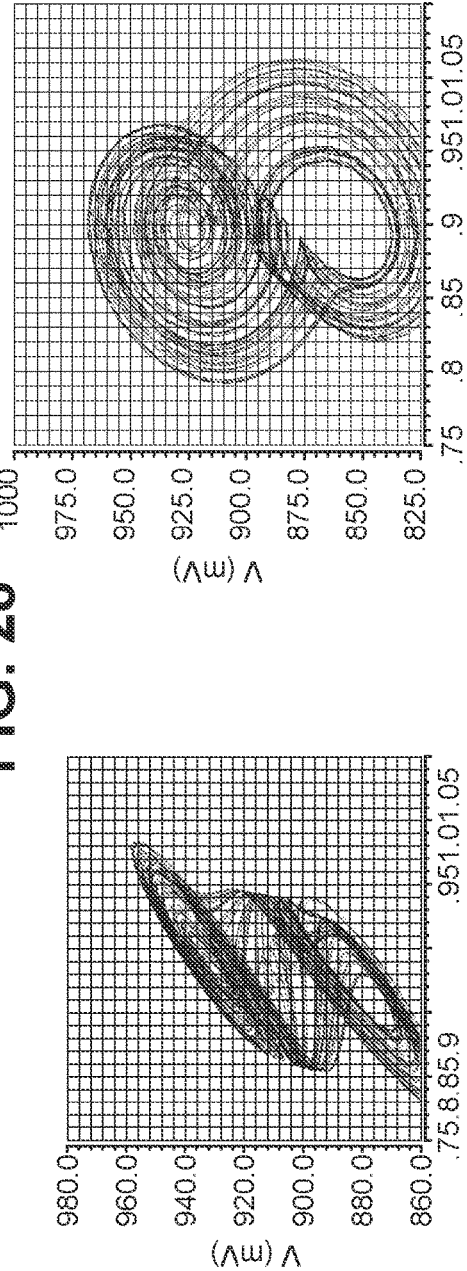
FIG. 28
FIG. 29
FIG. 30

OBSERVED INSTRUCTION SET

| n/$c_1c_2c_3c_4$ | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 1 | (13,1.00) | (8,1.00) | (9,1.00) | (8,1.00) | (5,1.00) | (1,1.00) | (1,1.00) | (0,1.00) | (13,1.00) | (0,0.50) | (1,1.00) | (0,1.00) | (5,1.00) | (1,1.00) | (5,1.00) | (1,1.00) |
| 2 | (3,1.00) | (4,1.00) | (4,1.00) | (4,1.00) | (1,1.00) | (6,1.00) | (2,1.00) | (6,1.00) | (3,1.00) | (6,1.00) | (2,1.00) | (6,1.00) | (5,1.00) | (2,1.00) | (2,1.00) | (6,1.00) |
| 3 | (0,1.00) | (5,1.00) | (0,1.00) | (5,1.00) | (8,1.00) | (8,0.57) | (12,1.00) | (13,1.00) | (8,1.00) | (12,1.00) | (12,1.00) | (13,1.00) | (2,1.00) | (12,1.00) | (10,1.00) | (12,1.00) |
| 4 | (9,1.00) | (10,1.00) | (11,1.00) | (2,1.00) | (6,1.00) | (9,1.00) | (1,1.00) | (8,1.00) | (5,1.00) | (0,1.00) | (5,1.00) | (0,1.00) | (12,1.00) | (13,1.00) | (1,1.00) | (9,1.00) |
| 5 | (4,1.00) | (8,1.00) | (9,1.00) | (8,1.00) | (0,1.00) | (3,1.00) | (2,1.00) | (2,1.00) | (10,0.99) | (3,1.00) | (2,1.00) | (2,1.00) | (0,1.00) | (1,1.00) | (4,1.00) | (3,1.00) |
| 6 | (1,1.00) | (1,1.00) | (4,1.00) | (8,1.00) | (9,1.00) | (0,1.00) | (12,1.00) | (0,1.00) | (1,1.00) | (14,1.00) | (2,1.00) | (11,1.00) | (3,1.00) | (0,1.00) | (8,0.900) | (0,1.00) |
| 7 | (10,1.00) | (2,0.99) | (0,0.56) | (6,1.00) | (6,1.00) | (4,1.00) | (1,0.99) | (5,0.61) | (12,1.00) | (8,1.00) | (9,1.00) | (4,1.00) | (8,1.00) | (14,1.00) | (2,0.54) | (4,1.00) |
| 8 | (5,1.00) | (4,1.00) | (2,1.00) | (1,0.99) | (0,1.00) | (15,1.00) | (2,1.00) | (14,1.00) | (2,1.00) | (1,1.00) | (4,1.00) | (4,1.00) | (0,1.00) | (0,1.00) | (1,0.99) | (12,0.93) |
| 9 | (0,1.00) | (13,0.99) | (13,0.58) | (0,0.98) | (9,1.00) | (10,1.00) | (2,0.93) | (8,1.00) | (4,1.00) | (4,1.00) | (0,1.00) | (8,1.00) | (7,1.00) | (5,0.96) | (9,0.66) | (11,1.00) |
| 10 | (10,1.00) | (3,0.90) | (0,0.99) | (10,1.00) | (6,1.00) | (4,1.00) | (0,0.51) | (1,0.624) | (1,0.99) | (4,1.00) | (11,1.00) | (2,1.00) | (8,0.99) | (11,0.56) | (11,0.76) | (5,0.91) |

FIG. 45

| C1 | C2 | I1 | I2 | Out |
| --- | --- | --- | --- | --- |
| 1 | 1 | 1 | 1 | 0 |
| 0 | 1 | 1 | 1 | 1 |
| 1 | 0 | 1 | 1 | 1 |
| 0 | 0 | 1 | 1 | 1 |
| 0 | 0 | 0 | 1 | 0 |
| 0 | 0 | 0 | 0 | 0 |
| 0 | 0 | 1 | 0 | 1 |
| 0 | 1 | 0 | 0 | 0 |
| 1 | 0 | 0 | 0 | 0 |
| 1 | 1 | 0 | 0 | 0 |
| 1 | 1 | 1 | 0 | 1 |
| 1 | 1 | 0 | 1 | 0 |
| 0 | 1 | 0 | 1 | 1 |
| 1 | 0 | 1 | 0 | 1 |
| 0 | 1 | 1 | 0 | 0 |
| 1 | 0 | 0 | 1 | 1 |

FIG. 46

| C1 | C2 | Out |
| --- | --- | --- |
| 0 | 0 | 1 |
| 0 | 1 | 1 |
| 1 | 0 | 1 |
| 1 | 1 | 0 |

FIG. 47

| C1 | C2 | Out |
| --- | --- | --- |
| 0 | 0 | 0 |
| 0 | 1 | 1 |
| 1 | 0 | 1 |
| 1 | 1 | 1 |

FIG. 48

| C1 | C2 | Out |
| --- | --- | --- |
| 0 | 0 | 0 |
| 0 | 1 | 1 |
| 1 | 0 | 1 |
| 1 | 1 | 0 |

FIG. 49

| Operand 1 | Operand 2 | Output |
|---|---|---|
| 00 | 00 | 000 |
| 00 | 01 | 001 |
| 00 | 10 | 010 |
| 00 | 11 | 011 |
| 01 | 00 | 001 |
| 01 | 01 | 010 |
| 01 | 10 | 011 |
| 01 | 11 | 100 |
| 10 | 00 | 010 |
| 10 | 01 | 011 |
| 10 | 10 | 100 |
| 10 | 11 | 101 |
| 11 | 00 | 011 |
| 11 | 01 | 100 |
| 11 | 10 | 101 |
| 11 | 11 | 110 |

FIG. 50

| Control bits (C1, C2, C3, C4) | Functions |
|---|---|
| 0000 | 13 |
| 0001 | 8 |
| 0010 | 9 |
| 0011 | 8 |
| 0100 | 5 |
| 0101 | 1 |
| 0110 | 1 |
| 0111 | 1 |
| 1000 | 13 |
| 1001 | 1 |
| 1010 | 9 |
| 1011 | 0 |
| 1100 | 5 |
| 1101 | 1 |
| 1110 | 5 |
| 1111 | 1 |

FIG. 51

INTEGRATED CIRCUIT WITH A DYNAMICS-BASED RECONFIGURABLE LOGIC BLOCK

CROSS REFERENCE TO RELATED APPLICATIONS

This application is a U.S. national phase of International Application PCT/US2017/049177 filed Aug. 29, 2017, which claims the benefit of priority of U.S. provisional Application No. 62/380,891, titled "Integrated Circuit with a Dynamics-Based Reconfigurable Logic Block" and filed on Aug. 29, 2016, each of which is hereby incorporated by reference in its entirety.

GOVERNMENT LICENSE RIGHTS

This invention was made with government support under grant numbers N00014-14-C-0033 and N00014-16-1-3056 awarded by the Office of Naval Research. The government has certain rights in the invention.

TECHNICAL FIELD

The present disclosure relates generally to improving the power and speed of processing devices, and more particularly (although not necessarily exclusively), to an integrated circuit design for a dynamics-based reconfigurable logic block.

BACKGROUND

Despite the success of binary hardware and computers, there are specific areas in which a binary computer can struggle to meet the demanded specifications and requirements. A binary computer can include massive arrays of binary switches (e.g., transistors). The number of available transistors that can fit on a chip may be limited based on the size of the transistors, but transistors are already available in submicron sizes. The number of available transistors that can fit on a chip may be limited by the power consumption and heat generated by the transistors. In some aspects, such as embedded systems and mobile applications low power computation can be a major limiting factor.

BRIEF DESCRIPTION OF THE DRAWINGS

FIG. 28 is a screenshot of an example of a time sequence of desired voltage signals generated by the circuit in FIG. 27 according to one aspect of the present disclosure.

FIG. 29 is a screenshot of an example of a double scroll attractor based on the circuit in FIG. 27 according to one aspect of the present disclosure.

FIG. 30 is a screenshot of another example of a double scroll attractor based on the circuit in FIG. 27 according to one aspect of the present disclosure.

FIG. 45 is a table listing example two-input, one-output, combinational digital functions that can be implemented by a dynamics-based logic block according to one aspect of the present disclosure.

FIG. 46 is a table listing output from a dynamics-based logic block in response to various control signal combinations according to one aspect of the present disclosure.

FIG. 47 is a table listing example two-input, one-output data for a NOT AND logic according to one aspect of the present disclosure.

FIG. 48 is a table listing example two-input, one-output data for a OR logic according to one aspect of the present disclosure.

FIG. 49 is a table listing example two-input, one-output data for a XOR logic gate according to one aspect of the present disclosure.

FIG. 50 is a table listing example operands and outputs for an addition operation according to one aspect of the present disclosure.

FIG. 51 is a table listing an example instruction set obtained for a single column architecture with four reconfigurable gates according to one aspect of the present disclosure.

DETAILED DESCRIPTION

Figure 1:
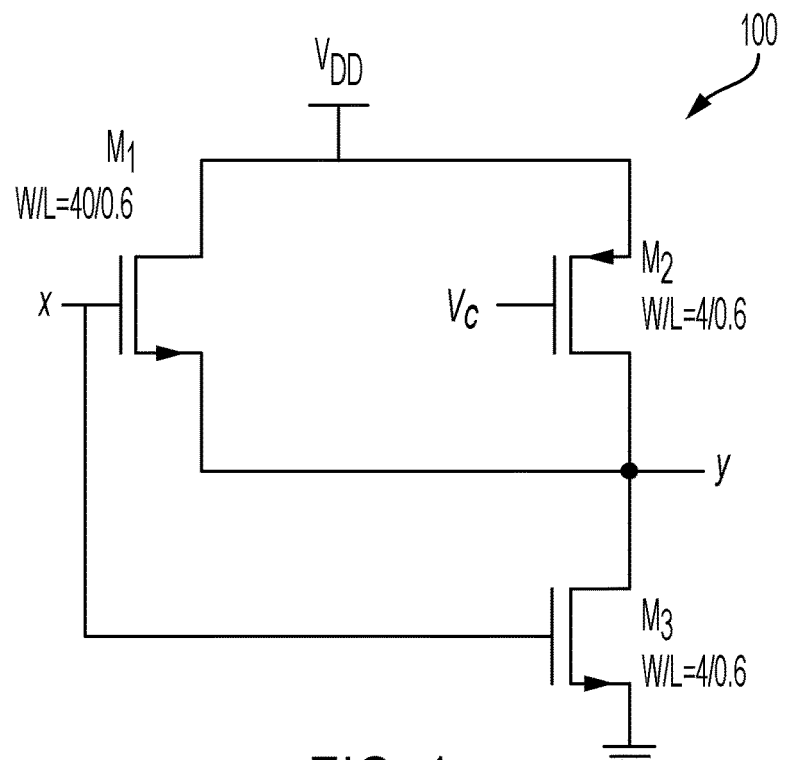
FIG. 1 is a circuit diagram of a three-transistor circuit that exhibits complex dynamics according to one aspect of the present disclosure.

Certain aspects and features relate to an integrated circuit with a dynamics-based reconfigurable logic block. A logic block can receive one or more inputs and output one or more results based on a specific operation (e.g., an AND, XOR, or NAND) performed on the inputs. A reconfigurable logic block can adjust the type of operation performed. A dynamics-based reconfigurable logic block can perform different types of operations (e.g., a signal processing operation, a logic operation, an arithmetic operation, or an analog-to-digital conversion) based on a change in an initial controlling input or a change in parameters. The reconfigurable logic block can include a dynamics-based nonlinear circuit that can perform an infinite number of different operations.

In some aspects, the number of different operations that a nonlinear or chaotic circuit can implement can exponentially increase the longer that a circuit processes the input (or the more iterations that are performed by the circuit). The number of these exponentially increasing operations a circuit can perform can be characterized with an exponent entitled "computing exponent." The computing exponent can be determined based on the dynamics of a circuit. A nonlinear, dynamics-based approach to computation can allow for implementing extremely slim, low-power circuits that are capable of performing many different types of operations or functions. In some examples, the input can include a signal represented by current, voltage, charge, inductance, or any other electrical or mechanical variable.

Moore's law predicts that the density of transistors on an integrated circuit will double every two years. The exponential growth in the number of transistors on an integrated circuit has historically ensured that computer hardware can provide the exponentially increasing performance anticipated by applications. Today, it has become increasingly difficult to continually increase the density of transistors on an integrated circuit at Moore's predicted rate. One of the possible solutions to increase the performance of computers without increasing the number of transistors is to get more out of the limited available number of transistors, which is sometimes called "More Moore."

A transistor circuit can perform reconfigurable digital computation, where the nonlinear dynamics and the inherent complex behavior of the circuit are used for reconfigurable computation. In some aspects, nonlinear dynamics can be exploited to implement reconfigurable computations. The dynamics can be observed and considered as a function, which can map the initial state of the dynamical system to future states. A nonlinear dynamical system can exhibit different behaviors by changing the parameters of the system, or by perturbing the initial state of the system. As a result, by properly changing the parameters or perturbing the initial states of a nonlinear dynamical system, the dynamical system can be programmed to implement a desired mapping and function. Furthermore, by encoding the digital data inputs as an initial condition of the dynamical system, and decoding digital outputs from the final state of the dynamical system, a digital function can be implemented. By using techniques such as parameter changing or perturbing initial conditions, the nonlinear dynamical system can be programmed to implement many different digital operations.

In some examples, a simple nonlinear circuit can contain an infinite number of different operations, and the circuit can be dynamically programmed to implement essentially any logical function. As a result, a single circuit can be programmed to implement different operations, rather than having different circuits implementing different operations. This can enable the possibility of obtaining a greater variety of computation from a fixed number of transistors. The ability to perform more operations with a fixed number of transistors may allow for Moore's law to be upheld by gaining more computational power and speed from the same size integrated circuit.

In some aspects, a dynamics-based nonlinear circuit can perform an infinite number of different operations by adjusting an initialization signal or a number. Since a small change to an initialization signal for a dynamics-based nonlinear circuit can result in significant changes in the output of the dynamics-based nonlinear circuit, In some examples, the different operations can include arithmetic computations, logical operations, and analog-to-digital conversions. In additional or alternative examples, coupling the output of nonlinear circuits in parallel can improve the accuracy of the operation by reducing the noise at the output.

In some aspects, the dynamics-based nonlinear circuit can also be discrete. A discrete circuit can provide a new output every clock cycle based on the value at the input of the discrete circuit. A discrete dynamics-based nonlinear circuit can include a feedback loop such that the output of the discrete dynamics-based nonlinear circuit is fed to the input of the discrete dynamics-based nonlinear circuit every clock cycle. Each time the output of the discrete dynamics-based nonlinear circuit is fed back to the input can be referred to as an iteration. A linear increase in the number of iterations performed by the discrete dynamics-based nonlinear circuit can result in an exponential increase in a number of operations that can be performed by the discrete dynamics-based nonlinear circuit. A discrete dynamics-based nonlinear circuit can perform a specific operation based on an initialization signal and checking the output of the discrete dynamics-based nonlinear circuit after a specific number of iterations.

In additional or alternative aspects, the dynamics-based nonlinear circuit can be a continuous-time circuit. A continuous-time circuit can produce new outputs continuously over time and without regard to the clock cycle. In some examples, a linear increase in time can result in an exponential increase in a number of operations that can be performed by the continuous-time dynamics-based nonlinear circuit. As a result, a continuous-time dynamics-based nonlinear circuit can perform a specific operation based on an initialization signal and checking the output of the continuous-time dynamics-based nonlinear circuit after a specific amount of time.

In some aspects, the dynamics-based nonlinear circuit can be part of a dynamics-based logic block used by a computing system to perform complex operations. For example, the dynamics-based logic block can be used by a computing system to perform a signal processing operation, a logic operation, an arithmetic operation, or an analog-to-digital conversion. The dynamics-based logic block can be controlled by a processing device executing machine code. In some examples, a compiler can be designed for compiling program instructions (e.g., a line of C++) into machine code. The processing device can determine from the machine code a set of control signals to apply to the dynamics-based logic block to reconfigure the dynamics-based logic block to execute a specific instruction.

The illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but should not be used to limit the present disclosure.

A Dynamics-Based Nonlinear Circuit can Perform an Infinite Number of Different Computations In some aspects, a higher granularity of computation can be implemented and realized within a transistor circuit. The nonlinear dynamics of the transistor circuits can be used to implement digital functions. A circuit of three transistors can contain an extremely large number of different combinational digital functions that can be extracted from the circuit. A simple nonlinear system can produce complicated effects with universal features. An infinite number of different functions can coexist within the nonlinear dynamics of a nonlinear circuit.

FIG. 1 shows a three-transistor circuit 100 that exhibits complex dynamics when its output is fed back to its input. In this example, the input, output, and control signals are described as a voltages, but the signals can be represented by any type of electrical or mechanical variables. The input voltage x is given to the circuit as the gate voltage of transistors $M_1$ and $M_3$, and the output y is measured as the drain voltage of the transistor $M_3$. The bias voltage $V_c$ (which is the gate voltage of $M_2$) functions as a parameter and changes the response of the circuit 100. The outputs of the circuit 100 for different input values are plotted in FIG. 2 when different values of $V_c$ are applied to the circuit 100.

Figure 2:
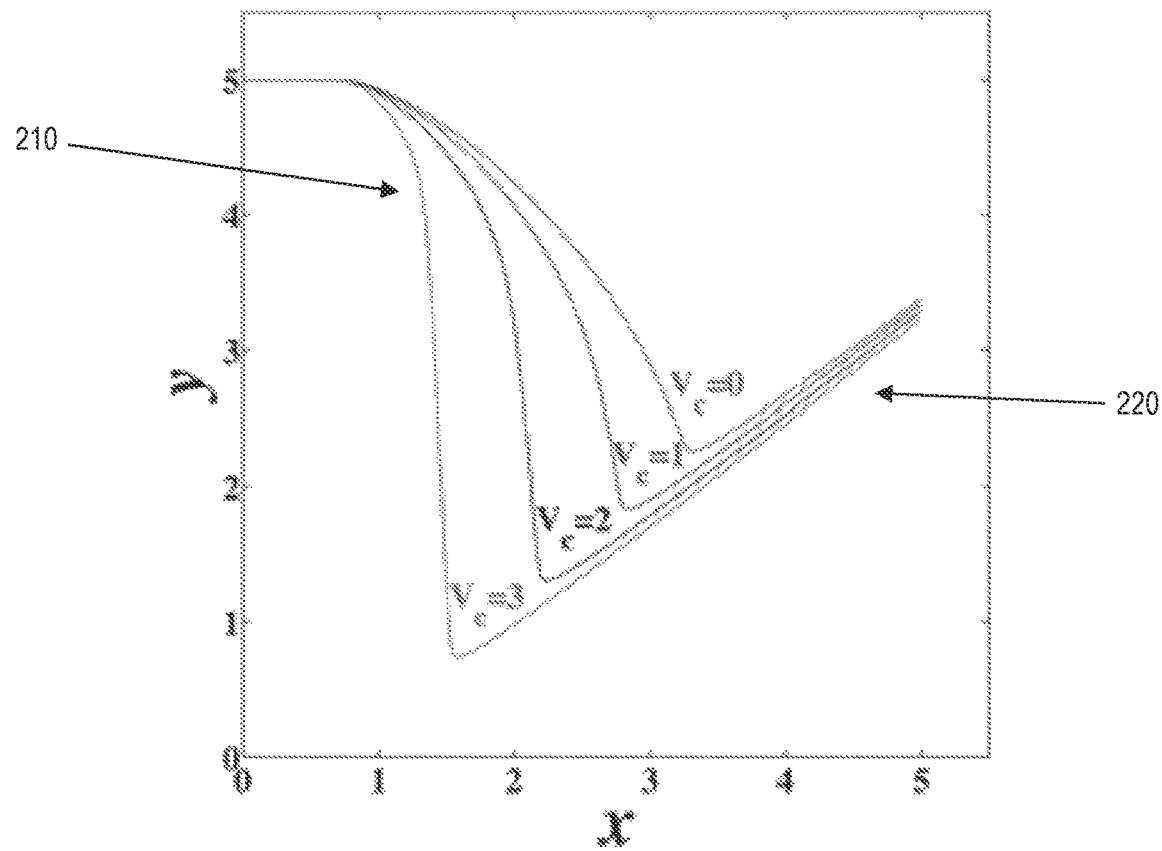
FIG. 2 is a graph of an example of the output y of the circuit in FIG. 1 for values of input values at parameter values according to one aspect of the present disclosure.

The V shape output of the circuit 100, which is shown in the graph in FIG. 2, has two regions: (1) the left region 210 with negative slope and (2) the right region 220 with positive slope. When the input x for circuit 100 is less than the threshold voltage of transistor $M_3$, the output y of the circuit 100 is at $V_{DD}$. When the input x increases and becomes larger than the threshold voltage of $M_3$, $M_2$ and $M_3$ transistors operate as an inverter, and create the left region 210 of the V shape output of the circuit 100. As the input x is increased, at some point gate source voltage of $M_1$ becomes larger than the threshold voltage of $M_1$ and $M_1$ starts to turn on. The right region 220 of the V shape characteristics of the circuit 100 is almost entirely defined and determined by the $M_1$ transistor, which is acting as a source follower.

From a mathematical point of view, the circuit 100 of FIG. 1 can be modeled as $$y = f_{V_c}(x) \quad (1)$$

where $f_{V_c}$ represents the parameterized mapping between the inputs and outputs. By feeding the output of the circuit 100 back to its input, a dynamical system can be built such that its dynamics is governed by:

$$x_{n+1} = f_{V_c}(x_n) \quad (2)$$

where the output of the circuit 100 is used as the next input of the circuit 100.

Figure 3:
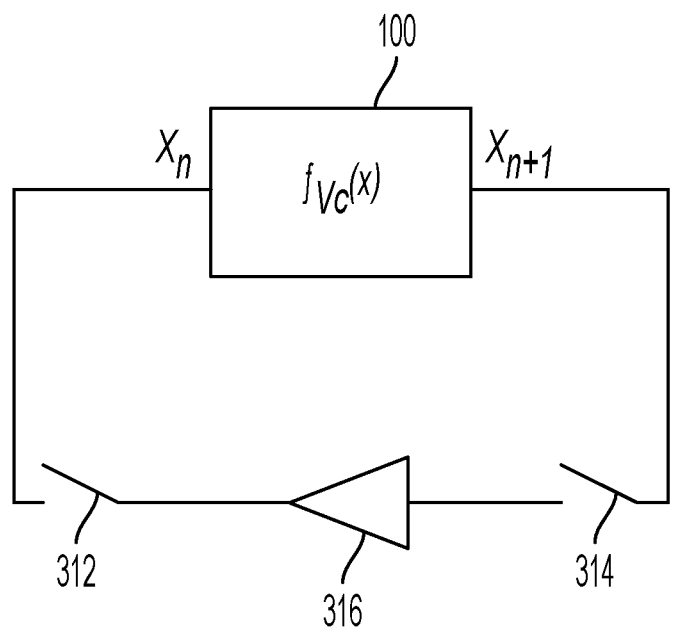
FIG. 3 is a schematic diagram of an example of the circuit in FIG. 1 with a feedback loop according to one aspect of the present disclosure.

FIG. 3 depicts circuit 100 with a feedback loop 310. Feedback loop 310 includes two switches 312, 314 and a buffer 316. Two complementary clock signals, $\varphi_1$ and $\varphi_2$, can alternatively switch the two switches 312, 314 open and closed to feed the output back to the input without creating any data hazard condition, such as write after read or read after write. The Spectre® simulation results when the output is fed back to itself is in FIG. 4.

Figure 4:
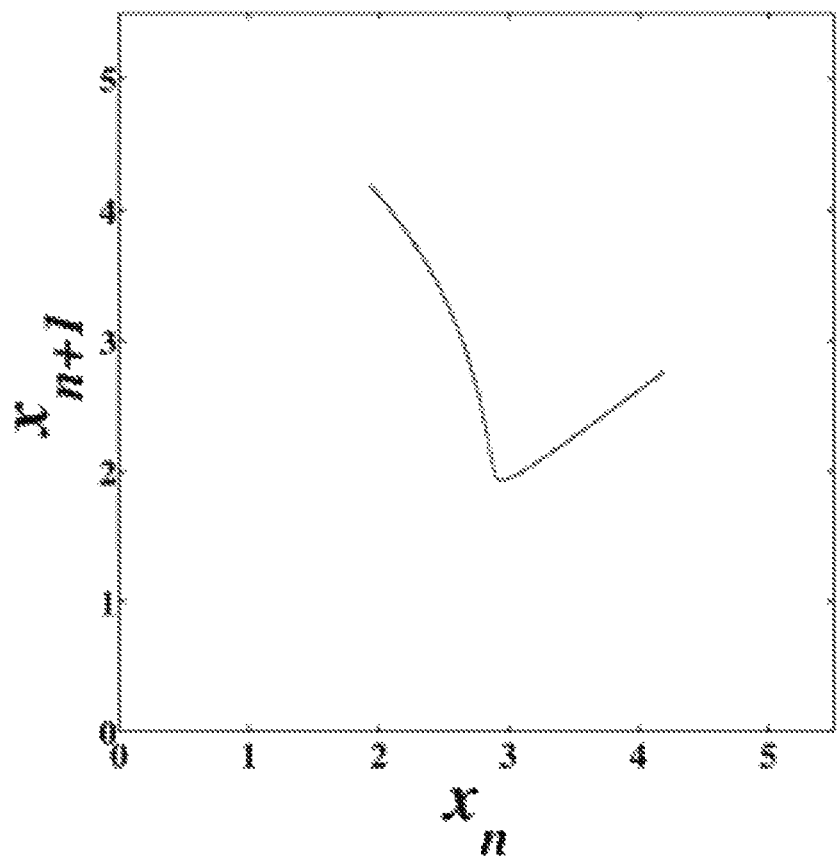
FIG. 4 is a graph of an example of the value of $x_{n+1}$ versus $x_n$ in the circuit in FIG. 3 when $V_c$=0.8 V according to one aspect of the present disclosure.

To obtain the plot in FIG. 4, the circuit simulation was run for 1000 iterations of the map to ensure that the transient behavior had elapsed, and then the next 5000 iterations were recorded. In the simulation, $V_c=0.8V$, where the nonlinear map is in chaotic regime. The chaotic attractor of the chaotic system is depicted in FIG. 4.

Figure 5:
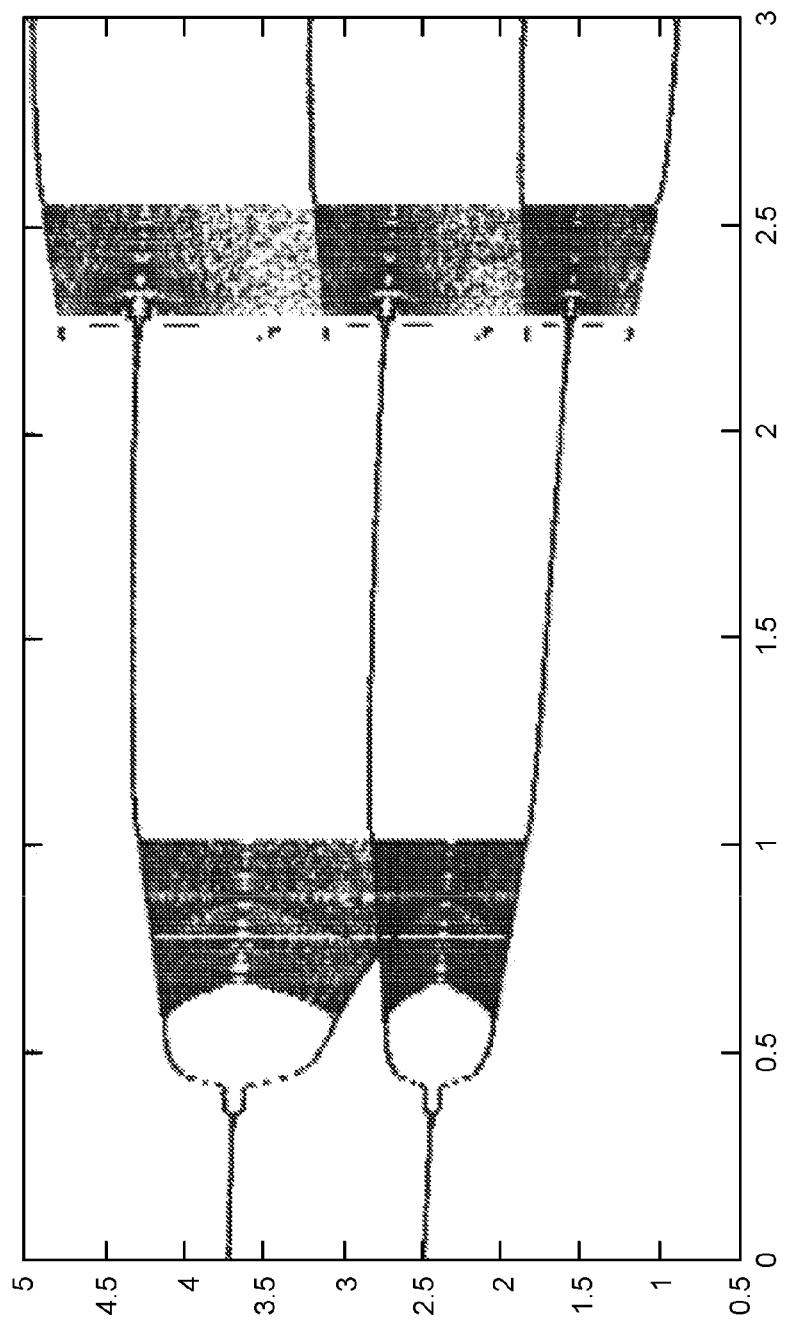
FIG. 5 is a graph of an example of a simulated bifurcation of the circuit in FIG. 3 for different bifurcation parameter values according to one aspect of the present disclosure.

The bias voltage $V_c$ can operate as a bifurcation parameter for the system of FIG. 3. The simulated bifurcation diagram of the circuit is shown in FIG. 5.

A dynamical system is a function that maps its initial condition to the future states. The intrinsic, dynamics-based function can implement a digital function as well. The digital data inputs as the initial condition of the dynamical system can be encoded, and the output of the computation from a future state of the dynamical system can be decoded. In some aspects, this is how the intrinsic dynamics implements digital computation.

Nonlinear dynamics can implement many different digital functions. Nonlinear dynamics contains many different intrinsic behaviors, each representing a function. Since each behavior can be dynamically selected, the nonlinear system can be dynamically programmed to select a different function. As a result, the nonlinear dynamical system can be observed as a programmable computing system that can be programmed to implement different functions.

Figure 6:
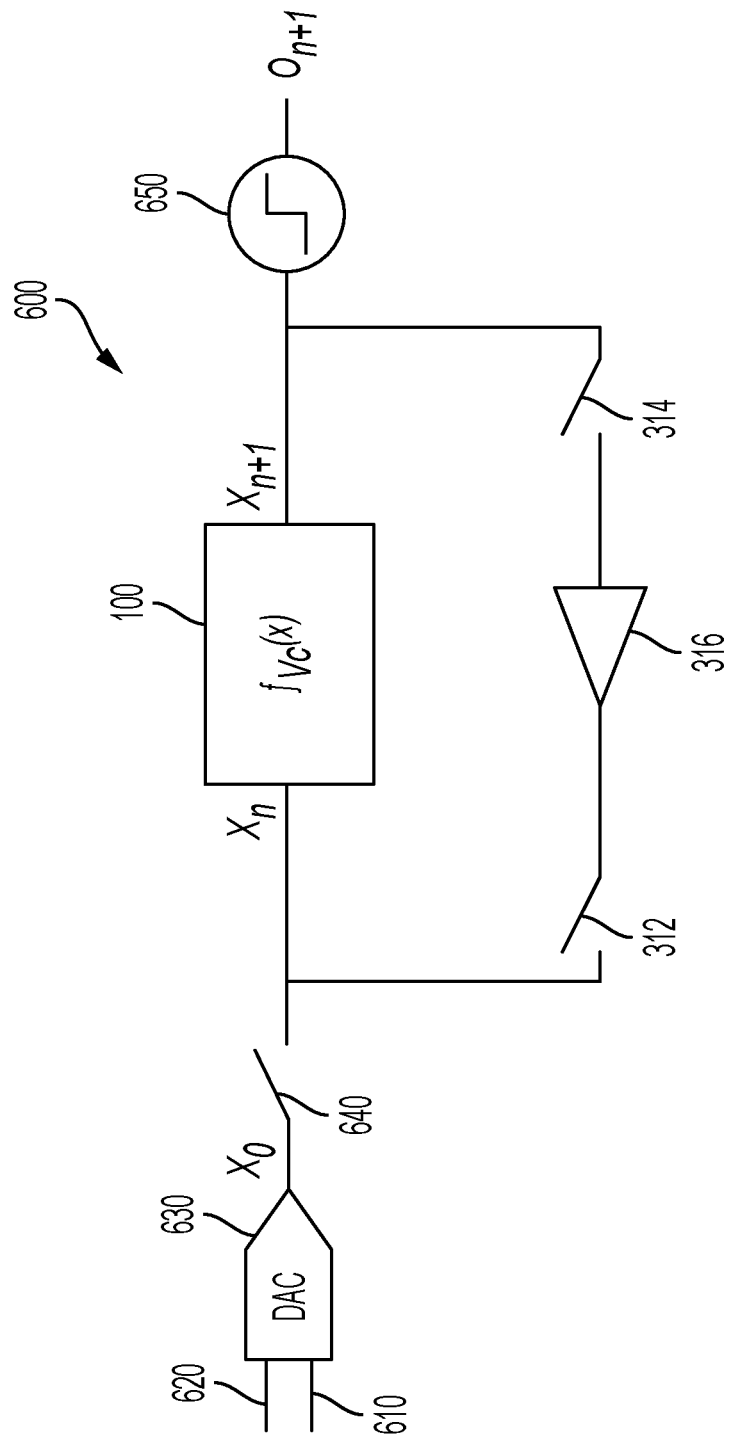
FIG. 6 is a schematic diagram of an example of the circuit in FIG. 3 with an input for an initial condition according to one aspect of the present disclosure.

An Analysis-by-Synthesis ("AbS") approach can be used to measure the amount of computation within a nonlinear circuit. In the AbS approach, an estimate about the amount of computation can be determined from counting the number of different observed digital functions after the nonlinear circuit is exhaustively programmed with different possible control inputs. Different techniques have been introduced to program a nonlinear system to implement a desired function. In some examples, the techniques can include programming the nonlinear dynamical system with initial condition selection, programing with bifurcation parameters, and programing with evolution time. FIG. 6 depicts a dynamical system 600 that includes the circuit 100 with a feedback loop that can be programmed with by a selection of an initial condition.

A control line 610 and a data line 620 accept input that programs the dynamical system 600 to select a function. Both data inputs and control inputs can be of any length. The data and control inputs are mapped to an initial condition for the nonlinear circuit 100. In this example, the mapping can be a standard digital-to-analog convertor ("DAC") 630, but other implementations are possible and any other map that maps the digital inputs to an initial condition can be used as an encoder here. A switch 640 can be controlled by a clock signal, $\varphi_3$, and control when an initial condition is to be fed to the dynamical system 600. The dynamic range of the input x can be 0V to 5V.

The output of the nonlinear map can be fed to a threshold circuit 650, which can create a single bit output. The system 600 of FIG. 6 is capable of implementing digital functions with one-bit outputs. A multilevel threshold can allow for functions to be implemented with more than one output. Nonlinear systems can be sensitive to the initial conditions. The control inputs can change the initial condition of the iterated circuit. As a result, different control inputs can result in implementing different functions.

Without loss of generality, in some examples the goal can be to implement a four-input, one-output digital functions, and define:

$$\sigma_{V_c}: f_{V_c} \to N \quad (3)$$

$$N = \left\{0, 1, 2, \ldots 2^{2^4}\right\}$$

as a metric that assigns an integer value, N, as the number of different four input, one-output functions that the nonlinear circuit at bias voltage $V_c$ implements. There are $2^{2^4}=65536$ different four-input, one-output combinational digital functions. That is why $\sigma_{V_c}$ assigns a number between 0 and 65536. To implement four input functions, data given to the DAC 630 in FIG. 6 is to be a four-digit binary number:

$$\text{Data}=D_1D_2D_3D_4$$

$$D_i \in \{0,1\} \quad (4)$$

There are $2^{2^4}$ different four-input, one-output functions. As a result, control input is composed of $2^4$ control inputs so that the nonlinear map can be programmed to obtain up to $2^{2^4}$ different functions:

$$\text{Control}—C_1C_2C_3 \ldots C_{16}$$

$$C_i \in \{0,1\} \quad (5)$$

The DAC 630 of FIG. 6, can receive twenty bits (four bits of data and sixteen bits of control) and map the bits to an analog value between 0, 5 as follows:

$$x_0 = 5 \times \frac{\sum_{j=1}^{16} 2^{j-1} + \sum_{i=1}^{4} 2^{i+16-1} D_i}{2^{20}} \quad (6)$$

$$x_0 \in [0, 5]$$

Here, the first bit of the control input, $C_1$, is the least significant bit and $D_4$ the most significant bit.

The output from the final state is produced by a threshold mechanism. More specifically, the state space of the dynamical system is partitioned to two partitions. Each partition is assigned a symbol and any state that falls within any partition receives the same symbol that is assigned to the partition:

$$O_{n+1} = \begin{cases} 0 & x_{n+1} < \tau \\ 1 & \tau \leq x_{n+1} \end{cases} \quad (7)$$

In practice, one can select any threshold value t for partitioning and producing of output; however, not all of threshold values suit the dynamics-based computing equally well. A suitable partitioning is a partitioning that preserves the amount of entropy in the system after symbolizing the states. Entropy can equal information according to Shannon's communication theory. One-dimensional discrete dynamical systems (e.g., maps), using the critical value of the map as the threshold value for partitioning, can preserve the Kolmogorov-Sinai entropy of the dynamical system. Based on FIG. 2, the critical (or minimum) value of the map that the nonlinear circuit 100 of FIG. 1 builds depends on the bias voltage $V_c$. In some examples, 2.5V can be a good average value for threshold value over different $V_c$ values such that the threshold value can be set to 2.5, τ=2.5.

Following the AbS approach, different control inputs of Eq. (5) can be applied exhaustively and a number of observed different functions for each $V_c$ can be counted. The result can be referred to as $\sigma_{V_c}$. The nonlinear circuit 100 can be simulated based on computing system 600 of FIG. 6 in a hybrid environment of C++ and Cadence® Spectre®. The nonlinear circuit 100 can be simulated in Spectre® using model files. The rest of the system 600 can be implemented as an ideal, perfect C++ simulator.

The C++ simulation can calculate the initial condition for the given Data and Control inputs, and pass the initial condition to Spectre®. Spectre® can receive the inputs to the nonlinear circuit, calculate the output of the nonlinear circuit, and passes the results to the C++ simulation. Then the C++ simulation can produce the binary output based on the output of the nonlinear map that was received from Spectre®, and then pass the output of the nonlinear map as the input to Spectre® again. And the loop can repeat.

The evolution time (e.g., the number of loop iterations) is a technique for programming the nonlinear circuit to implement different functions. In a nonlinear circuit, if the circuit is in chaotic regime, or is in a periodic regime with a long periodicity, the observed output at each iteration of the loop $O_{n+1}$ can be different from the previous iteration. As a result, different functions can be implemented at different iteration number n, and consequently $\sigma_{V_c}$, the number of different functions that can be implemented from the nonlinear circuit can depend on the iteration number as well. In a continuous-time analog circuit, the number of observed functions can depend on the continuous time evolution.

To evaluate which digital function is selected with a particular control input and a particular iteration number n, the association of a control input with a logic function can be noted and then all possible combinations of data inputs can be enumerated to construct the truth table of the function for the particular control input. By changing the control input and repeating the procedure, a second digital function, which is likely to be different from the first one, can be observed. By exhaustively applying all possible control inputs, the type of function that the nonlinear circuit implements can be determined after iterating for n times for each control input. At the end, the number of different functions observed at each iteration number n can be counted and this can be $\sigma_{V_c}(n)$. The process can be repeated for different bias voltage values $V_c$, and the results are shown in FIG. 7 in a semi-logarithmic scale for a set of bias voltage values.

In a semi-logarithmic scale, $\sigma_{V_c}(n)$ can linearly increases with iteration number and the slope is a function of the bias voltage. At some point $\sigma V_c(n)$ can reach a plateau due to a limited number of control inputs and a limited number of four-input, one-output functions. But, there is still a large dynamic range to observe and estimate the slope. An extended scale can be obtained by counting the number of five-input, one-output functions that the circuit can implement. This can suggest that the amount of intrinsic computation that any nonlinear circuit or system can implement can be characterized by an exponent $\psi_{V_c}$, which can be referred to as a computing exponent:

$$O_{n+1} \propto e^{\psi_{V_c} n} \quad (8)$$

Figure 7:
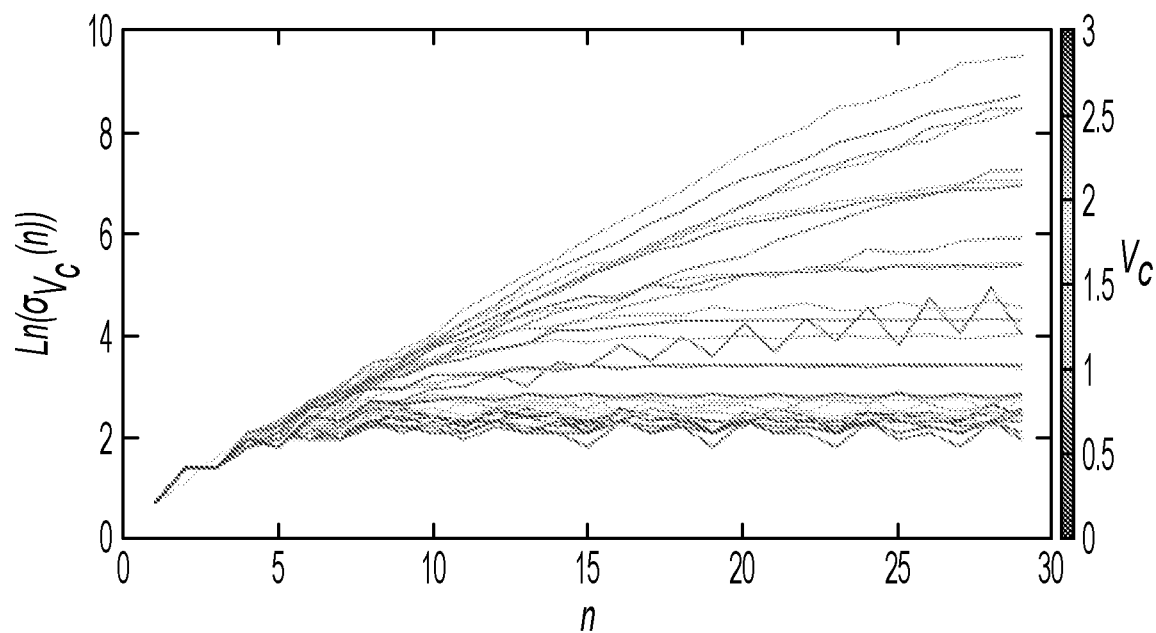
FIG. 7 is a graph of an depicting a number of functions observed as being performed by the nonlinear circuit at each iteration in a semi-logarithmic scale for select bias voltage values according to one aspect of the present disclosure.

$\psi_{V_c}$ is the slope of the straight lines in FIG. 7, which are plotted in semi-logarithmic scale. In FIG. 7, the exponentially increasing number of functions can reach a plateau due to the limited number of four-input, one-output functions and limited control inputs, $2^{2^4}$, not because of limitations of intrinsic computation of the nonlinear circuit. By implementing m-input, one-output functions, where m→∞, the exponentially increasing number of observed functions may never reach to a plateau, and $\sigma_{V_c}(n) \to \infty$ as n→∞.

Furthermore, there is a subtle connection between computing exponent of a nonlinear circuit and Lyapunov exponent of the circuit. The Lyapunov exponent can be a measure to characterize chaos and quantify the average divergence of nearby orbits and sensitivity to initial conditions. For a one-dimensional system, do can be the difference between two close initial conditions $x_0$ and $x_0+dx_0$, $d_0=|x_0-x_0-dx_0|=|dx_0|$ and $d_i$, i=1, 2, . . . , n, can be the subsequent difference between the two points after the points are both iterated i times. In a chaotic system, on average, $d_i$ exponentially increases over time, i, $d_n \approx d_0 e^{\lambda n}$. The Lyapunov exponent λ is defined as:

$$\lambda = \lim_{n \to \infty} 1/n Ln(d_n/d_0) \quad (9)$$

A positive Lyapunov exponent can mean that the system is chaotic, it is sensitive to initial conditions, and there are an infinite number of unstable periodic orbits ("UPOs"), within the system. The Lyapunov exponent can characterize the average rate of exponential divergence of nearby orbits, whereas the computing exponent represents the exponential increase of number of functions, programmed by perturbing initial condition of a nonlinear map by control inputs. If a nonlinear circuit is not sensitive to the changes of its initial conditions, it means that 1) Lyapunov exponent is zero or negative and 2) the nonlinear circuit is not flexible enough to implement different functions. If a nonlinear circuit is sensitive to changes of initial condition, 1) the Lyapunov exponent is positive, 2) nonlinear circuit can implement many different functions via initial condition selection, and 3) in terms of numerical value, the Lyapunov exponent, which characterize exponential divergence of close-by orbits, can be the same as, or at least close to computing exponent of the same circuit.

Figure 8:
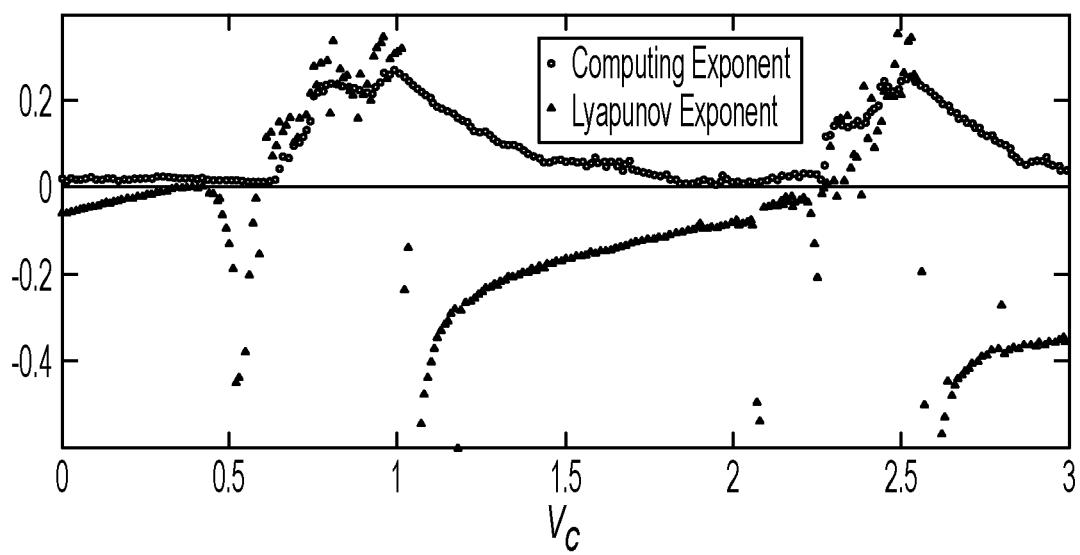
FIG. 8 is a graph depicting examples of the computing exponent and the Lyapunov exponent of the nonlinear circuit in FIG. 1 for different bias voltage values according to one aspect of the present disclosure.

In FIG. 8, the computing exponent and the Lyapunov exponent of the nonlinear circuit in FIG. 1 can be plotted for different bias voltage values $V_c$ to examine the cases. A simulation setup similar to FIG. 6 can be used to calculate the Lyapunov exponent of the nonlinear circuit. The circuit can be simulated in Cadence® Spectre®, whereas the Lyapunov exponent can be calculated in a C++ program based on Eq. (9). The bifurcation diagram of FIG. 5 can be useful to understand the dynamics, and interpret the result in FIG. 8.

For small bias voltages $V_c$, the dynamics can be periodic, the Lyapunov exponent can be negative, and the number of functions that the nonlinear circuit can implement over time may not exponentially increase and therefore the computing exponent can be zero. After a period-doubling cascade, the nonlinear circuit can enter to a chaotic regime, where the Lyapunov exponent can be positive, the number of functions that the nonlinear circuit can implement can exponentially increase over time (iterations), and numerically the computing exponent can be close to the Lyapunov exponent. As the bias voltage $V_c$ increases, a periodic window can appear in the bifurcation diagram. In a periodic window, there can be a stable periodic orbit, and the Lyapunov exponent can be negative due to it. But, within the periodic window, the computing exponent can maintain a positive value. The phenomenon can be attributed to the existence of many unstable periodic orbits, and long transient time of orbits before the orbits converge to the stable period orbit. The existence of the complex transient behavior can provide the nonlinear map with enough variability in dynamics to implement many different functions over time. Upon further increase of bias voltage $V_c$, a cascade of periodic doubling can occur, which eventually leads to full chaos and then another periodic window can appear. The Lyapunov exponent and the computing exponent can behave similarly to during the first set of cascade bifurcation, chaos, and periodic window.

A computing exponent for nonlinear circuits and systems, can be defined as characterizing the amount of computation within a nonlinear circuit or system. This can be similar to existence of infinite number of UPOs within a chaotic circuit. A chaotic system can contain an infinite number of UPOs, although in practice not all of the UPOs are accessible or observable. Similarly, chaotic circuits or systems can contain an infinite number of functions, although in practice not all of functions are accessible or observable.

A large, complex circuit may not be necessary to implement many different functions, rather a simple circuit with a rich complex dynamics can implement many different types of functions. The amount of computation can be connected within a nonlinear circuit to its dynamical features.

An integrated circuit with a dynamics-based logic block can be designed and fabricated to implement different two-input, one-output digital functions. In theory, a simple nonlinear circuit can contain an infinite number of different functions. The inherent complex dynamics of a nonlinear circuit and its intrinsic infinite number of unstable periodic orbits can represent an infinite number of different functions to map inputs to outputs. However, due to nonidealities such as noise, not all such functions are accessible in practice. A nonlinear integrated circuit can be designed and fabricated so that its rich, complex dynamics can be utilized to perform computation. More specifically, the integrated circuit is dynamically programmable to implement different types of two-input, one-output, combinational digital functions. The main advantage of the fabricated integrated circuit is that the same circuit can implement different functions in each cycle, without any need to halt in between for programing.

A nonlinear integrated circuit can be programmed to implement all possible two-input digital functions. A block diagram for a dynamical system can implement a function and can be programmed to implement different digital functions. A dynamical system can evolve continuously over time, or in discrete steps. The former is called a continuous time, dynamical system, and the latter is named a discrete time, dynamical system, or simply an iterated map. An iterated nonlinear map can be used for reconfigurable computation. To have an iterated nonlinear map, the output of the map can be fed back to its input.

Figure 9:
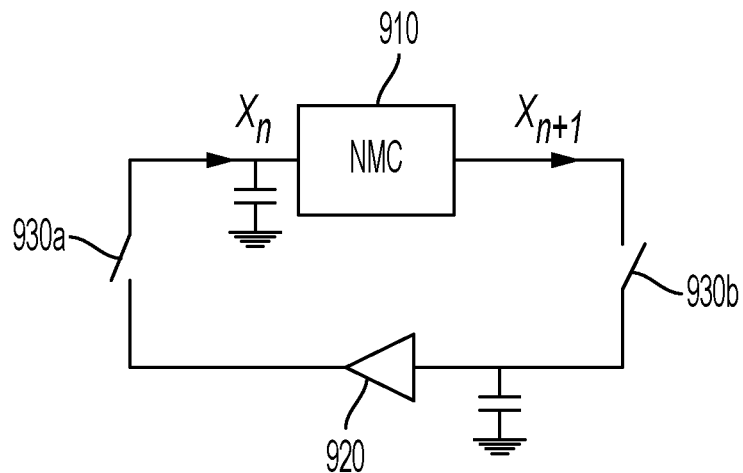
FIG. 9 is a block diagram of an example of a single nonlinear map circuit ("NMC") where its output is fed back through a buffer according to one aspect of the present disclosure.
Figure 10:
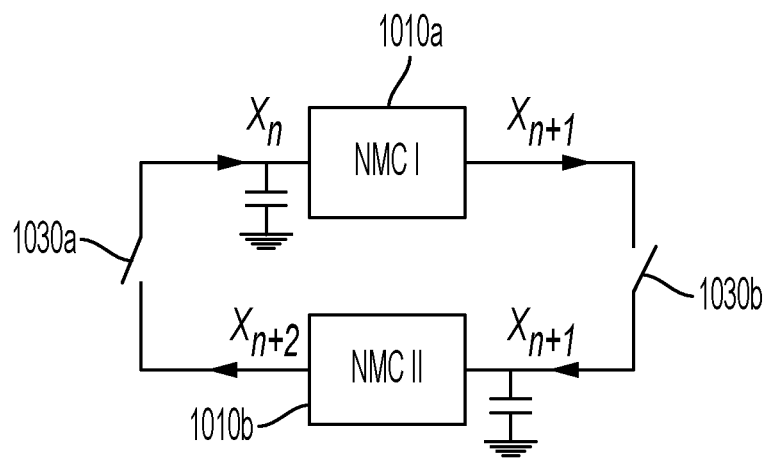
FIG. 10 is a block diagram of an example of two NMCs chained together according to one aspect of the present disclosure.
Figure 11:
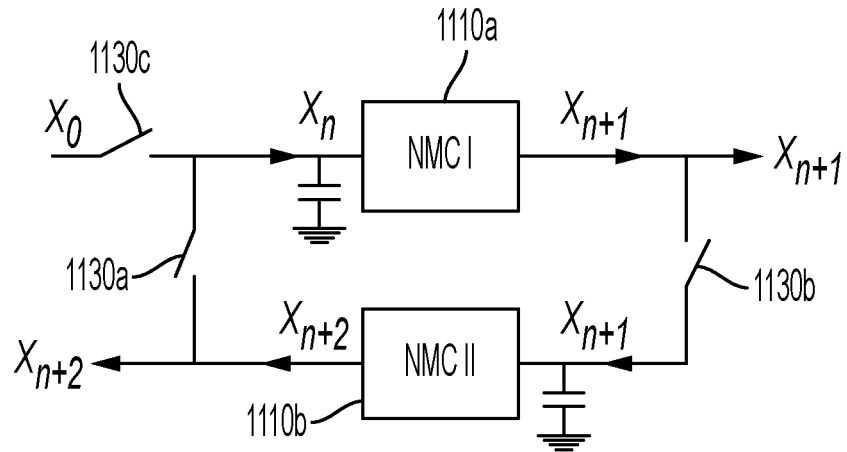
FIG. 11 is a block diagram of an example of two NMCs with a third switch to externally initialize two NMCs according to one aspect of the present disclosure.
Figure 12:
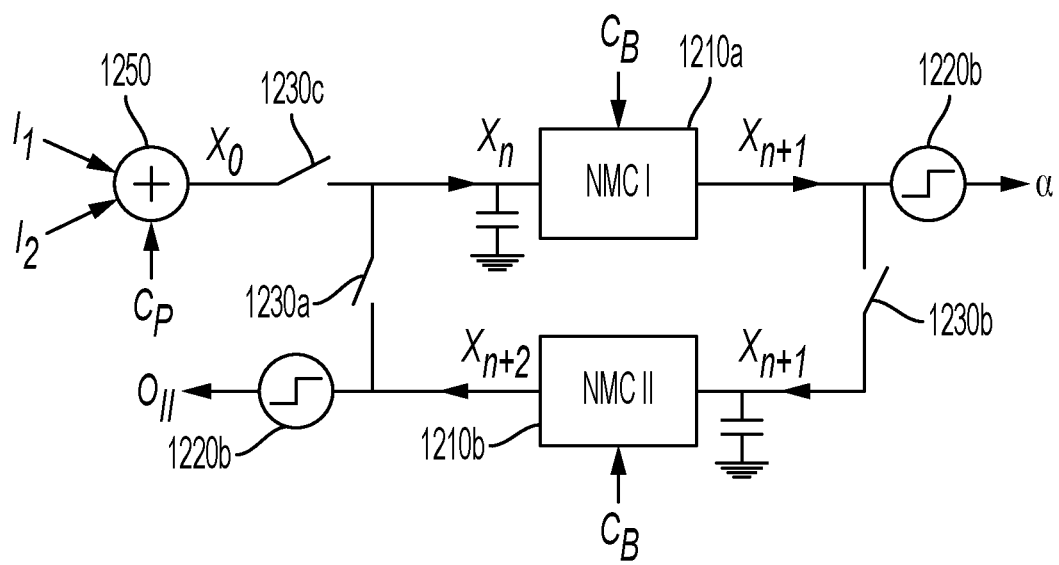
FIG. 12 is a block diagram of an example of two NMCs with data inputs encoded as the initial condition and two control inputs to program the block diagram to implement different types of functions according to one aspect of the present disclosure.

FIGS. 9-12 are block diagrams of dynamics-based nonlinear circuits. FIG. 9 is a block diagram for a single nonlinear map circuit ("NMC") 910 where its output is fed back to input through a buffer 920 and two alternating switches 930a-b. FIG. 10 depicts two NMCs 1010a-b chained together where their outputs are fed to the inputs of each other. In this example, a buffer is not used but two switches 1030a-b control when the output of one of the NMCs is fed to the input of the other. FIG. 11 depicts two NMCs 1110a-b with three switches 1130a-c to externally initialize the two NMCs 1110a-b. FIG. 12 depicts data inputs encoded as the initial condition, binary outputs $O_I$ and $O_{II}$ produced from the outputs of each of two NMCs 1210a-b using two threshold mechanisms 1220a-b, three switches 1230a-c, and two control inputs, $C_P$ and $C_B$, to program the block diagram to implement different types of functions.

FIG. 9 depicts a block diagram of the NMC 910 where its output is fed back to its inputs via two switches 930a-b that are turned on and off alternately, and buffer 920. A feedback with a single switch can result in read-after-write, or write-after-read race conditions. As a result, the two switches 930a-b with the buffer 920 in between can be used to prevent such race conditions. An alternate design, shown in FIG. 10, uses two of the same NMC 1010a-b instead of a buffer. The replacement of the buffer with a second NMC thereby doubles the rate of iteration of the map, because at each loop of the feedback mechanism, two NMCs 1010a-b can be evaluated rather than one. NMC I 1010a maps $x_n$ to $x_{n+1}$, and then NMC II 1010b receives $x_{n+1}$ as the input and maps it to $x_{n+2}$ During the next loop, NMC I 1010a receives $x_{n+2}$ as the input and the same scenario repeats. This architecture can be used to create an iterated map.

A function can map incoming inputs to outputs. And the dynamical system can map its initial condition to future states. Therefore, the block diagram for a dynamical system that is supposed to implement a function, can receive inputs as its initial condition. FIG. 11 includes three switches 1230a-c, the third switch 1230c can allow initialization of the iterated map with the incoming input, and has two outgoing ports, which read the outputs of the circuit maps over time. Non-maskable interrupts ("NMIs") can be used, meaning that their state variables are analog. As a result, the block diagram for a discrete time dynamical system can map analog inputs to analog outputs, and therefore implement an analog function. But, FIG. 11 can also implement digital functions if the binary inputs are converted to analog inputs, and then convert the analog outputs to binary outputs.

FIG. 12 includes an encoder 1250 for converting binary inputs to analog inputs, and two decoders 1220a-b for converting analog outputs of the maps to digital outputs. Two additional control inputs, $C_P$ and $C_B$, are included for programing the block diagram to implement different functions. The control input $C_P$ is the perturbations that can be applied to the initial condition of the dynamical system to program the block diagram. Nonlinear circuits and systems can exhibit sensitivity to initial conditions, meaning that small changes in initial conditions of the system result in dramatic changes of the final state. The behavior is called chaos, and as a method for programing the circuits, the initial conditions give to the circuit can be perturbed to change the mapping between inputs and outputs. The control input $C_B$ changes the bifurcation parameter of the NMCs 1210a-b and thus their behavior. Unlike linear circuits and systems, the dynamics and behavior of nonlinear circuits and systems qualitatively change with the changes of the parameters of the circuit. The phenomenon is called bifurcation, and can be used as a mechanism to alter the dynamics of the nonlinear map circuits to program the way the nonlinear map circuits map inputs to outputs.

Figure 13:
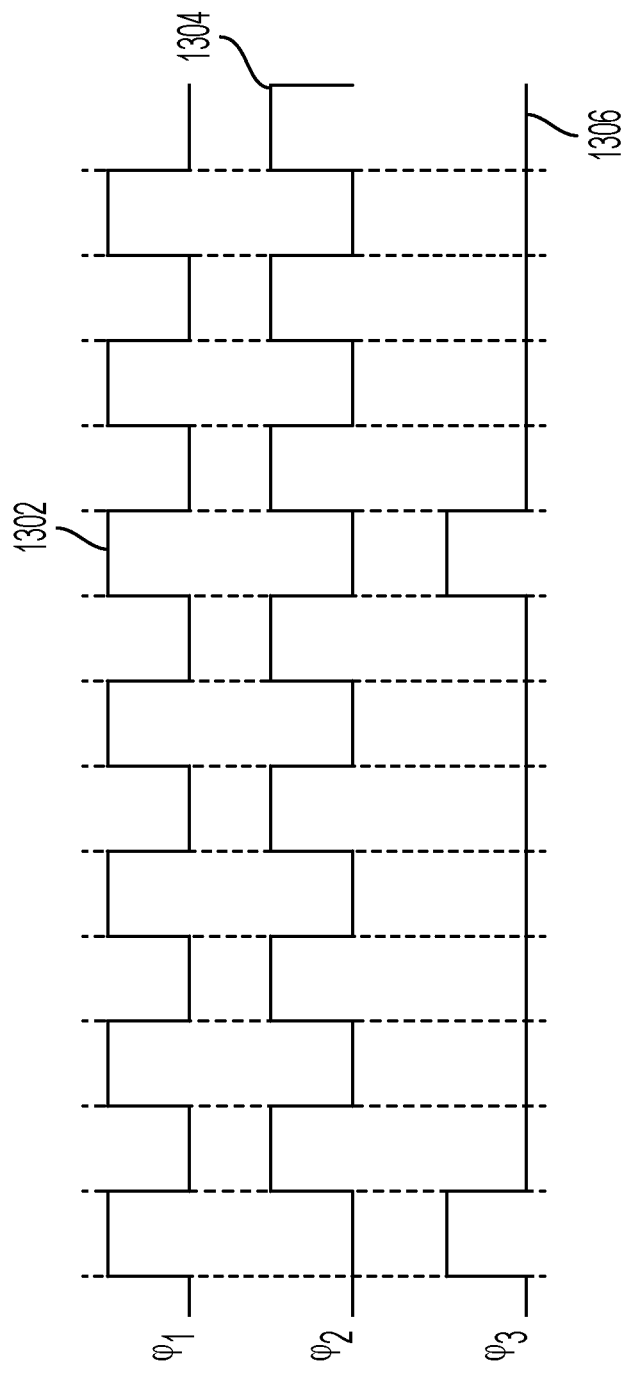
FIG. 13 is a diagram depicting an example of three clock signals for driving the block diagram in FIG. 12 according to one aspect of the present disclosure.

Three individual clocks can drive the block diagram of FIG. 12. An example of three clock signals 1302, 1304, 1306 are depicted in FIG. 13.

Clock signals 1302, 1304 denoted by $\varphi_1$ and $\varphi_2$ respectively, are a two-phase non-overlapping digital clock used to control the feedback in the loop composed of NMCs 1210a-b of FIG. 12 by controlling switches 1230a-b. The third clock signal 1306 initializes the loop to an initial condition by controlling switch 1230c. After setting the initial condition during the active phase of $\varphi_3$, the two nonlinear circuits 1210a-b iterate, and at each iteration, the two nonlinear circuit 1210a-b produce an output. When nonlinear circuit 1210a-b are in a chaotic regime, the outputs do not repeat themselves, and at each iteration, a set of outputs is produced. As a result, iteration count is another method that can be used to program the integrated circuit to implement different functions.

The circuits 1210*a-b* can be designed using a 0.6 μm, 5 volts On-Semi C5 process, and the MOSIS Service can be used to fabricate the circuits 1210*a-b*. Any nonlinear map contains a large number of functions, and under ideal conditions the number of different intrinsic functions that are contained in a simple nonlinear circuit approaches infinity.

Figure 14:
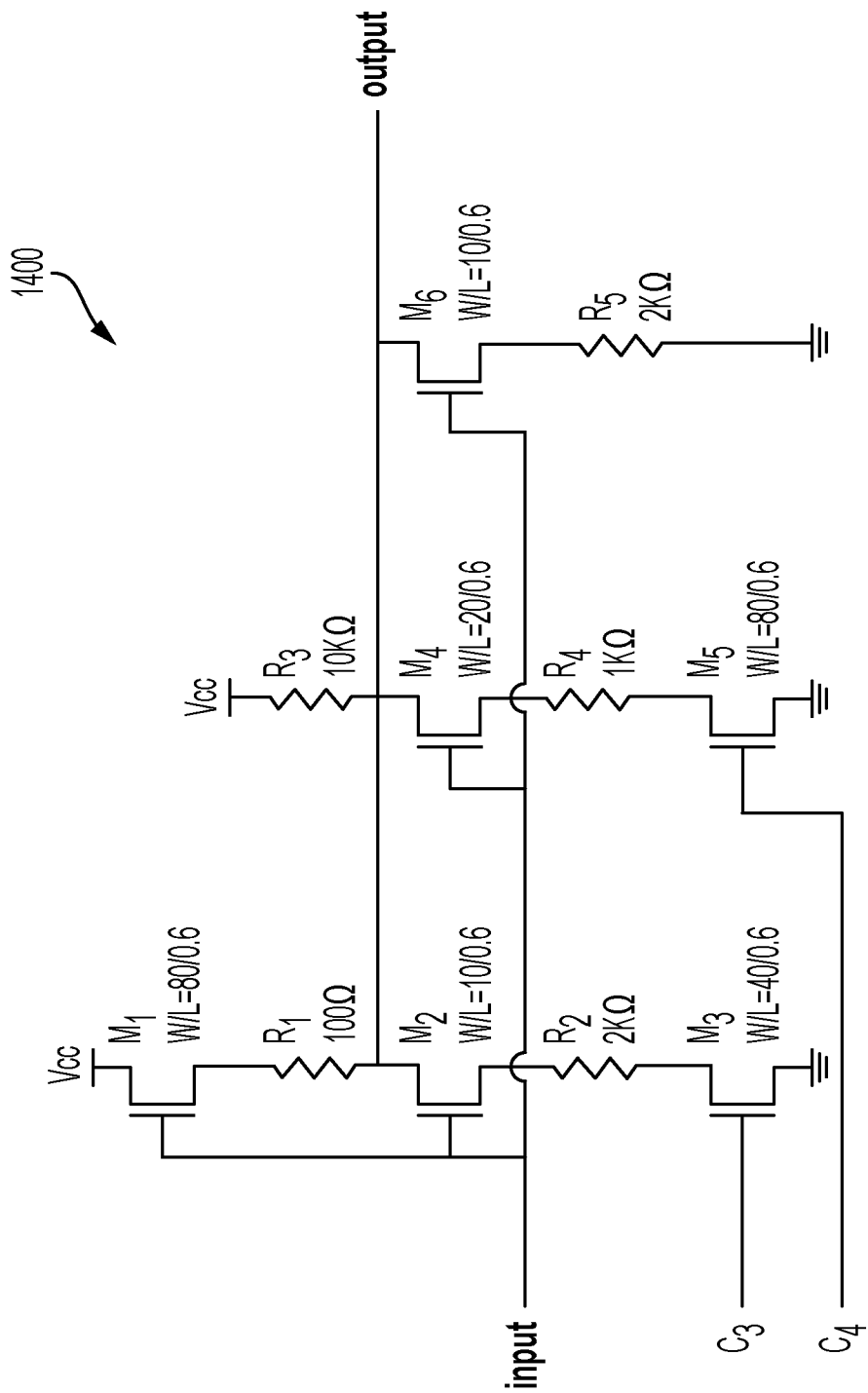
FIG. 14 is a circuit diagram of a nonlinear map circuit according to one aspect of the present disclosure.
Figure 15:
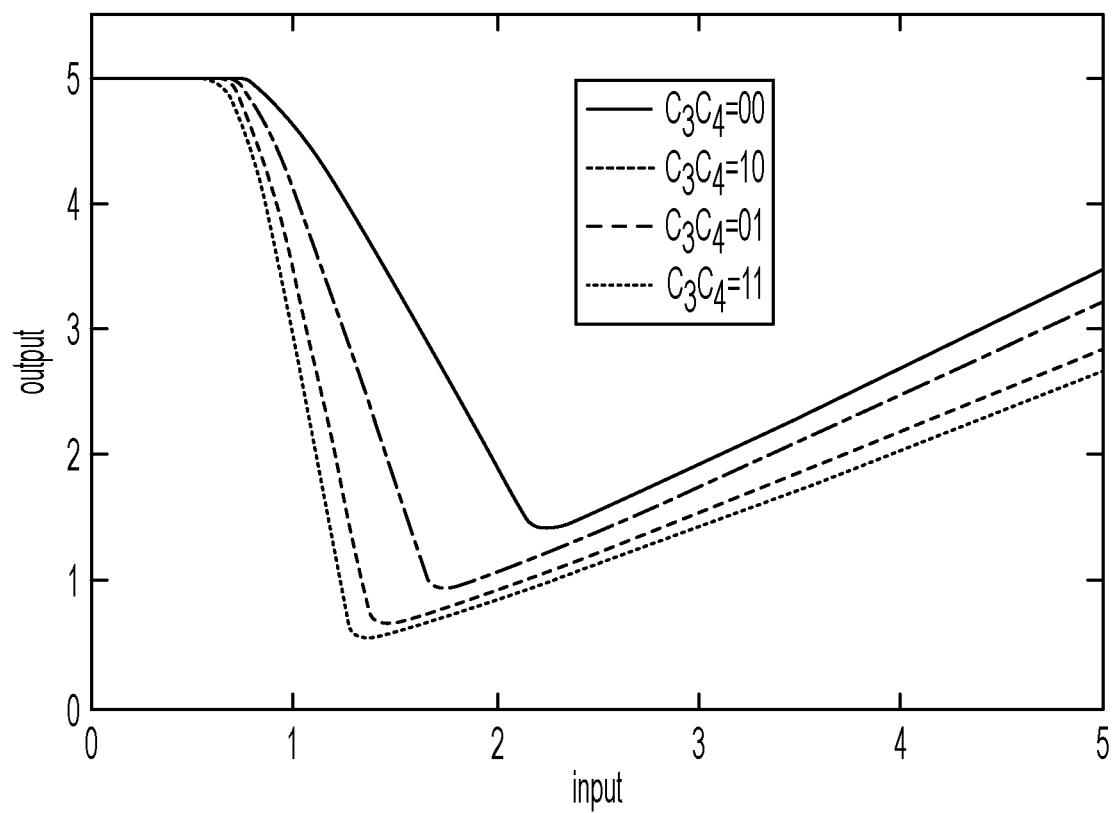
FIG. 15 is a graph depicting an example of outputs of the circuit in FIG. 12 for different binary control inputs according to one aspect of the present disclosure.

FIG. 14 depicts an example of a nonlinear map circuit 1400. The values of the transistors and resistors can be as follows: $M_1$=80 μm/0.6 μm, $M_2$=10 μm/0.6 μm, $M_3$=40 μm/0.6 μm, $M_4$=20 μm/0.6 μm, $M_5$=80 μm/0.6 μm, and $M_6$=10 μm/0.6 μm; and the resistance of resistors are $R_1$=100Ω, $R_2$=2KΩ, $R_3$=10KΩ, $R_4$=1KΩ, and $R_5$=2KΩ. The resistors can be ideal and can be modeled by resistance values. In the actual integrated circuit design, "hy" (high resistance polysilicon) devices can be used for resistors. The output of the integrated NMC is plotted in FIG. 15 for different binary control inputs $C_3$ and $C_4$. The binary control inputs operate as bifurcation parameters $C_B$ in the block diagram in FIG. 12, and change the shape of the input-output characteristics of the NMC. The bifurcation parameters in many previously reported NMCs are typically analog values, but a reconfigurable logic block can be designed and fabricated wherein all inputs and outputs are digital. Therefore, an auxiliary circuitry can be used to map the binary control inputs to an analog bifurcation value. The control can be integrated into the NMC, as illustrated in FIG. 14, enabling it to directly receive the binary control inputs that shape its input-output characteristics. Different values of control inputs $C_3$ and $C_4$ put the NMC in a different dynamical regime and thus alter its input-output characteristics and therefore the type of functions that it will implement.

To understand the behavior of the circuit in FIG. 14, first assume $C_3$ and $C_4$ are both 0, therefore both the $M_3$ and $M_5$ transistors are off. During the negative sloped portion of the circuit response illustrated in FIG. 15, the transistor $M_1$ is off because output is greater than (input−$V_{th}$). The current flowing through $R_3$ resistor can be estimated as:

$$I_{R_3}=(V_{cc}-\text{output})/10K \quad (10)$$

The current flowing through $R_5$ can be estimated as:

$$I_{R_3}=(\text{input}-V_{th})/2K \quad (11)$$

and since $I_{R_3}=I_{R_5}$:

$$\text{output}=V_{cc}-5(\text{input}-V_{th}) \quad (12)$$

The $M_3$ and $M_5$ transistors can be turned on in response to $C_3$ and $C_4$ changing. $C_3$ and $C_4$ changing can change by changing the value of the lower resistor, and thus the slope. To understand the positive slope of the V shape behavior of the circuit, again first assume $C_3$ and $C_4$ are both 0, therefore both the $M_3$ and $M_5$ transistors are off. During the positive slope, the $M_1$ transistor is on, $M_6$ is in linear region, and therefore by ignoring $M_6$:

$$\text{output}=(\text{input}-V_{th})R_5/(R_5+R_1)=20/21(\text{input}-V_{th}). \quad (13)$$

A linear dependence can form with the value of the slope set by a ratio of resistors and different values of $C_3$ $C_4$ can only change the resistor ratio. Equations (10)-(13) can be simplistic models of the circuit to understand the overall V shape behavior of the circuit. There can be other factors, such as the transistors' intrinsic resistance, that have been omitted from the simple analysis. Such factors can be properly modeled during the circuit design phase using circuit simulation software, and result in the circuit response curves illustrated in FIG. 15.

Figure 16:
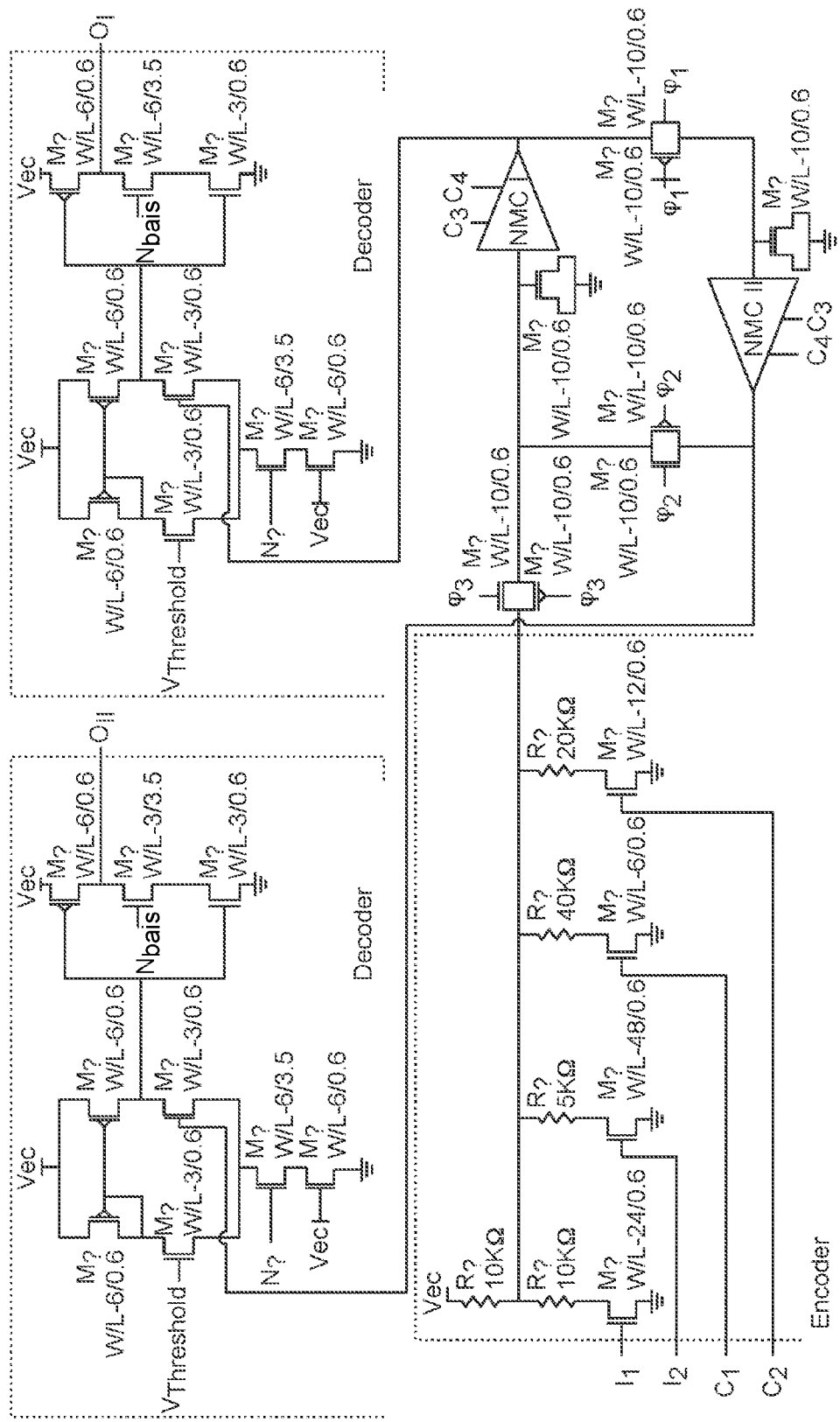
FIG. 16 is a circuit diagram of an example of two of the circuits in FIG. 14 coupled together according to one aspect of the present disclosure.

As discussed above, two examples of the same NMC can be included in a loop. In FIG. 16, the two examples of the NMC in FIG. 14, labeled by NMC I and NMC II, can be connected together using two transmission gates. The gate capacitances of the transistors used in the map circuit are employed as the sample and hold capacitors. Here, to improve the precision of the sample and hold mechanism, transistors, $M_{41}$ and $M_{42}$, are biased to operate as a capacitance.

The digital data inputs, $I_2$, $I_2$, together with control inputs $C_1$ and $C_2$, are used to determine an initial condition for the NMCs. A 4-bit digital-to-analog circuit can be used to map the four binary inputs to a voltage value. The sub-circuit in FIG. 16 labeled "Encoder" performs the operation. The $M_{13}$-$M_{16}$ transistors are turned on or off based on the data input values $I_1$, $I_2$, $C_1$, $C_2$. The transistors modify the effective resistor ratio, thus producing a voltage approximately proportional to the digital input value provided on ($I_2$, $I_2$, $C_1$, $C_2$).

The two additional inputs, C1, and C2, going into the encoder, are treated as control inputs that represent the role of CP in the block diagram in FIG. 12. The two additional inputs program the logic block to implement different operations by perturbing the initial condition produced by the encoder. The encoder circuit does not need to be an exact, perfect digital-to-analog convertor; any map that maps different data inputs to unique and distinct values (with enough distance between the produced values) can be used to encode the input data as the initial condition of the NMC. The distinct initial conditions under nonlinear dynamics can produce distinct and different orbits that result in different outputs. To assign a symbol to the analog output state of an NMC, the state space of the NMC is divided into two parts, and each part is assigned a symbol, 0 or 1. A decoder circuit produces Vcc (5 volts) or 0 volts, representing the symbols 1 or 0 respectively, depending on the output voltage of the map. Any threshold voltage can be chosen to delineate the digital value of the outputs, but a specific point of the V shape map is a good boundary value for symbols 0 and 1. The specific point depends on C3 and C4 control inputs because the control inputs change the shape of the V-shape input-output characteristics of the NMC. For simplicity, Vcc/2 can be selected as the threshold voltage for the output translation. In FIG. 16, two decoder circuits are shown. Each decoder can decode a binary output from the output of a NCM. VThreshold is internally biased to 2.5 volts.

After initializing the NMCs based on I1, I2, C1, and C2, the two NMCs can evolve by toggling the $\varphi_1$ and $\varphi_2$ clocks alternatingly. The outputs of the NMCs and their decoded digital outputs, can, and usually are, different from each other, and, furthermore, the outputs normally change after each iteration, especially if the NMC is in a chaotic regime. As a result, the circuit implements two parallel operations, and at different iterations, it implements different functions. The nonlinear dynamics-based logic block can be programmed to implement different functions by adjusting how many times $\varphi_1$ and $\varphi_2$ should toggle before the outputs are read the decoders.

The iteration number cannot be arbitrarily large because the impact of noise effectively limits the maximum iteration number. There is a fine line between iterating the NMCs long enough to allow nearby orbits to diverge from one another, but not so long that noise can degrade the reliability of the result.

FIG. 45 includes a table that lists the two-input, one-output, combinational digital functions that the fabricated dynamics-based logic block can implement for different control inputs, $C_1$, $C_2$, $C_3$, and $C_4$, at different iterations, n.

Sixteen different binary, two-input, one-output combinational functions can be obtained. The functions can be labeled and present in the table in FIG. 45 with 0, 1, ..., 15, based on the outputs. For example, a digital function that produces all 0 output is function 0; a digital function that produces all 1 output is function 15, and the rest are sorted in between.

Furthermore, since NMCs can be unstable and sensitive to noise, the reliability and repeatability of the observed functions can be monitored. As a reliability measure, the circuit can be tested 1000 times and observed the implemented functions, and counted the number of times that the circuit implements the same function again. The reliability ratio can be defined as the number of the times that the same function is observed, divided by the total number of trials. A reliability ratio of 1 for a specific observed function means that the function is robust to noise, and lower reliability ratios mean that the observed functions are not reliable. Different functions can, and do, have different reliability ratios, because different $C_3$ and $C_4$ control inputs put the NMCs in different dynamical regimes, and $C_1$ and $C_2$ control inputs perturb the initial conditions to different parts of the state space. If a set of control inputs put the NMCs in a chaotic regime, the reliability values can be lower, or if a set of control inputs guide the orbits close to the threshold value, 2.5 volts, then the binary output can be more sensitive to noise.

The experimental results can be reported as a couple. The first element of the couple represents the label of the function, which ranges from 0 to 15. The second element represents the reliability ratio of the function. Rows represent the iteration number, and columns represent different control inputs. For example, at iteration number 1, n=1, when control inputs are all 0, $C_1C_2C_3C_4$=0000, the observed function is function number 13, and its reliability ratio is 1.00. According to FIG. 12, when n is odd, the functions are implemented by NMC I. And when n is even, the functions are implemented by NMC II.

According to some examples, a circuit can be programmed to implement different digital functions by adjusting the initial state of the NMCs by changing their bifurcation parameters, or by varying evolution time. The control and programing mechanisms are integrated into the design, so that the circuit has a fully digital interface for programing, which is done using four binary control inputs that select different functions.

Rather than distinct, separate designs for each function, one circuit can be dynamically programmed to implement different functions. The concept opens the door for designing more compact, energy efficient circuits.

Furthermore, a dynamics-based circuit may not require halting for programing, rather programing can be instantaneous. As opposed to some FPGAs, there can be no internal memory element to load with programing bits. The nonlinear dynamics-based logic block receives control bits and data bits simultaneously, and control bits can be different from cycle to cycle. As a result, the logic block can implement a different operation at each clock cycle.

A Dynamics-Based Nonlinear Circuit can Perform an Analog-to-Digital Conversion

Figure 17:
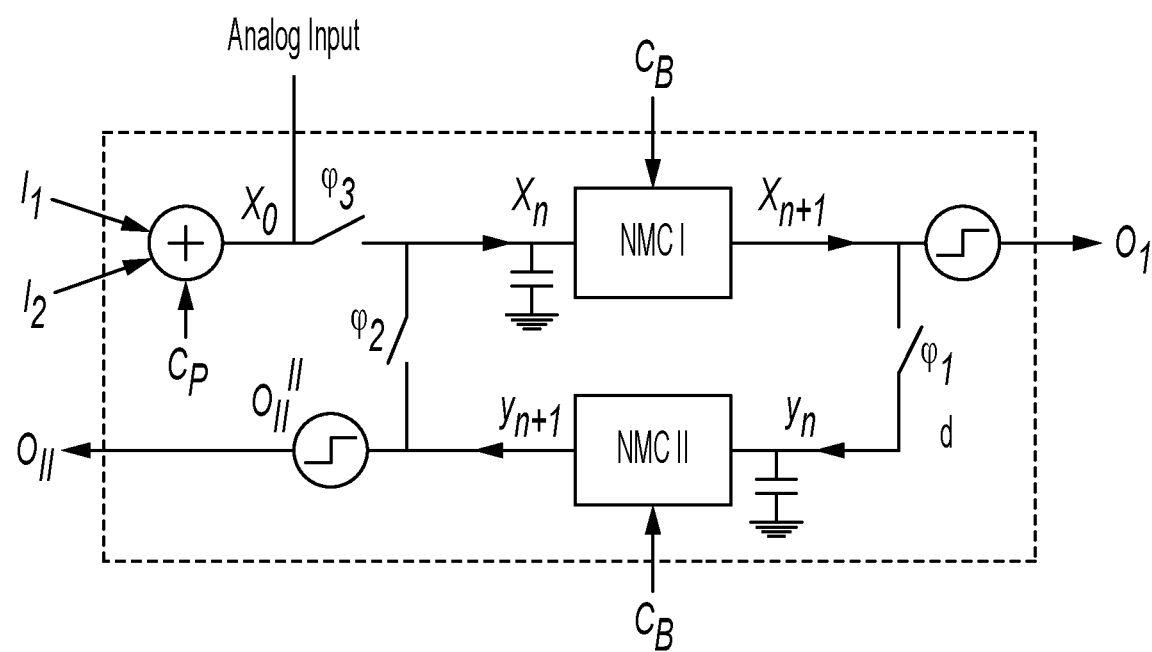
FIG. 17 is a block diagram of an analog to digital converter using two NMCs according to one aspect of the present disclosure.

In some aspects, a fabricated chaos-based logic block can perform analog-to-digital conversion, in addition to performing digital computation. FIG. 17 depicts a block diagram of a fabricated block, similar to FIG. 12. For test and verification purposes, multiple extra pads and access points can be added at intermediate points in the circuit. The analog input line in FIG. 17 shows one of the extra pins of the fabricated circuit. The pin can allow for manual initialization of NMC I and NMC II to an externally provided analog value.

In some examples, the mechanism can allow for the fabricated logic block to convert analog voltages to digital binary codes. An analog voltage that is to be decoded to digital bits can be provided and a sequence of bits can be read from the outputs. The sequence of binary bits can represent a digital binary code for the given analog voltage.

When a dynamical system has regular, stable dynamics, different orbits starting from different initial conditions can converge to the same steady states, such as a stable periodic oscillation, or a steady state fixed point. As a result, the time evolution of the dynamical system can be identical for different initial conditions, except for the short transition time from the given initial condition to the stable steady states. Therefore, an external observer cannot know the initial condition that the dynamical system has started from by observing the time evolution of the dynamical system.

In contrast to dynamical systems with stable, regular dynamics, there is no steady state solution for chaotic dynamical systems. Different initial conditions have different time evolutions that never settle to a steady state condition, such as a stable period orbit. By symbolizing time evolution of a chaotic dynamical system, a sequence of symbols that represents the analog initial condition can be obtained. The state space of the dynamical system can be partitioned into two disjointed sets using a threshold value, T, with each partition assigned a symbol, and thus any state that falls within a partition receives the same symbol that is assigned to that partition:

$$S_i = \begin{cases} 0 & x_i < \tau \\ 1 & \tau \le x_i \end{cases} \quad (14)$$

As a result, the symbolic time evolution of a dynamical system, $s_0$, $s_1$, $s_2$, ... where $s_i \in \{0,1\}$, can be considered as a digital representation of the analog initial condition.

The fabricated hardware and the dynamics-based logic block circuit can also implement an analog-to-digital conversion method as well. The analog value can be provided that can be intended to digitalize to the analog input line in FIG. 17. Then the digital outputs $O_i$s can be observed.

To perform Analog to Digital conversion slightly different clock signals are used than in FIG. 13. For analog to digital conversion, $\varphi_2$ and $\varphi_3$ clocks are high at the beginning, allowing the threshold mechanism of the NMC II produce the first digital bit directly from the analog voltage, and then $\varphi_1$ and $\varphi_2$ toggle alternatively to produce the rest of the bits from the threshold outputs of the NMC I and NMC II as the circuit iterates.

The longer the system iterates, the more number of digital bits that can be obtained to represent the analog value, which results in more precise digital representation of the analog value. However, in practice, there is noise present, which can limit the number of iterations. Iterate too many times and noise can be allowed enough time to evolve and blur the outputs. Experimental studies can suggest that the circuit as is, without any further upgrade or improvement, can convert an analog value (given to it as an initial condition) to a string of 8 bits. Optimizing and enhancing the circuit, having the side application in mind, can result in more efficient circuits that can produce more precise digital-to-analog conversions.

A designed and fabricated circuit for dynamics-based logic blocks can also perform analog-to-digital conversion. Logic blocks can be programmed to perform analog-to-digital conversion, in addition to digital computation. This can be useful in applications in which the computing system interfaces with devices outside the analog world by sensing some variables, converting the variables to digital values, and performing computation on the digital values. The same circuitry can perform analog-to-digital conversion along with digital computations.

Figure 18:
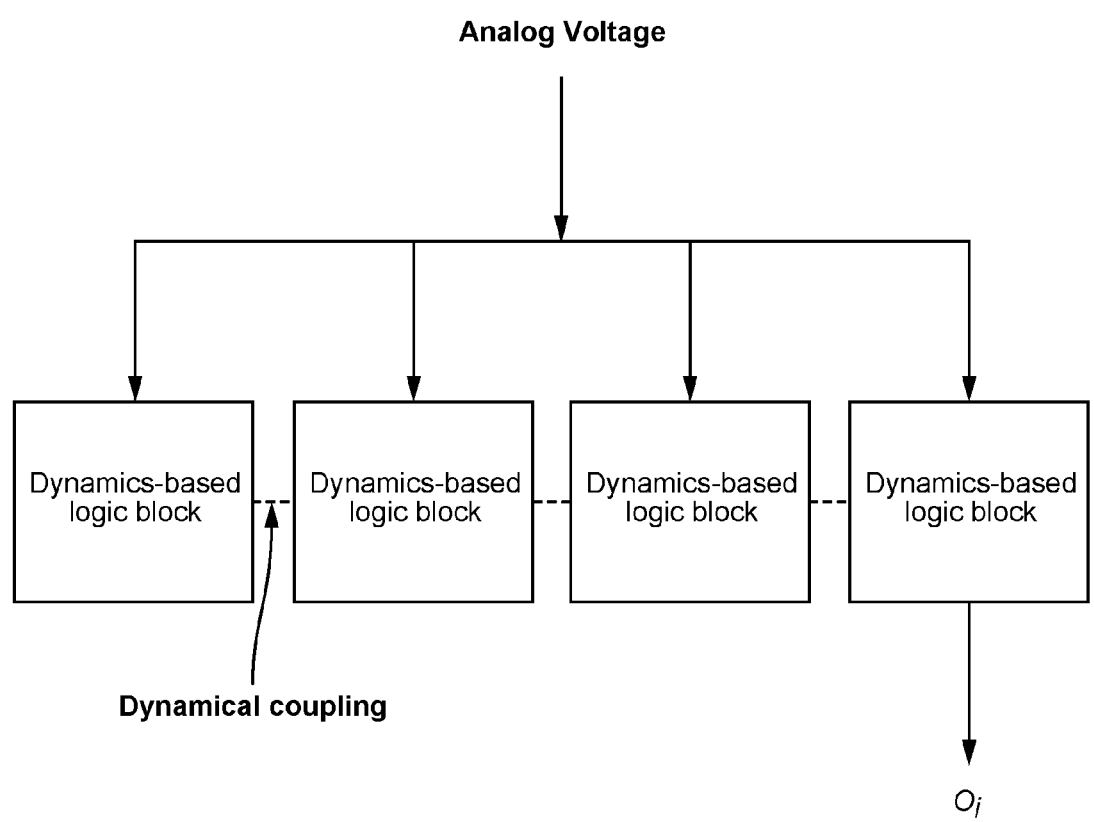
FIG. 18 is a schematic diagram of an example of multiple circuits being dynamically coupled together to obtain a more robust to noise analog-to-digital conversion according to one aspect of the present disclosure.

Dynamical coupling can be a method to enhance noise robustness of nonlinear dynamics-based computing. The same method can also be applied to enhance noise robustness of nonlinear dynamics-based analog-to-digital conversion. One example of the concept is schematically depicted in FIG. 18. Multiple circuits of FIG. 17 are dynamically coupled together, for example through a resistor, and the circuits receive the same analog voltage. And since the circuits are dynamically coupled, the coupled dynamics can preserve the signal, here the time evolution from the analog voltage, but incoherent noise is averaged out among the coupled circuits. As a result, the circuits can iterate for a higher number of iterations without being smeared by noise, producing a higher number of bits to represent the analog voltage.

By dynamically coupling multiple nonlinear dynamics-based logic blocks, which also can perform analog-to-digital conversion, a more robust analog-to-digital conversion can be obtained, which can produce a higher number of digital bits for a given analog value. A higher number of digital bits can result in a more precise digital representation of the analog value.

An Iterating Nonlinear Dynamical Circuit can be Unrolled for Increased Reliability Unrolling an iterating circuit can increase the reliability of the circuit. The architecture in FIG. 12 can enable the dynamics-based logic block to evolve for any arbitrary time before reading the output, and the iteration number itself can be used as a method to program the logic block to implement different types of computation. Different iteration numbers results in different outputs and types of functionality. The architecture can contribute a great amount of flexibility to the logic block to implement different types of functions; however, it adds to the complexity of the design. Furthermore, there are some inherent errors induced by switched capacitor circuits that were used to chain the NMCs together.

Figure 19:
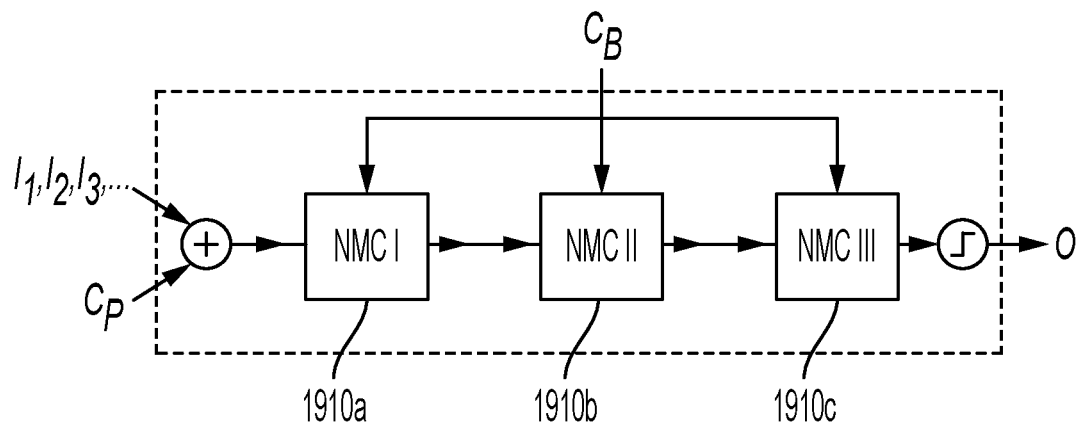
FIG. 19 is a block diagram of an example where the loop of NMCs is unrolled. according to one aspect of the present disclosure.

FIG. 19 shows a block diagram where the loop of NMCs is unrolled. Three NMCs 1910a-c, which are iteration of NMCs in the loop architecture, or simply n=3 where n represents the number of iterations are shown. One advantage of the architecture is that the switched capacitor mechanism is deleted. But, the mechanism cannot iterate for any arbiter number, rather it can do for only the number of physical NMCs that are cascaded one after the other. This can gain simplicity and a higher degree of stability and reliability.

Figure 20:
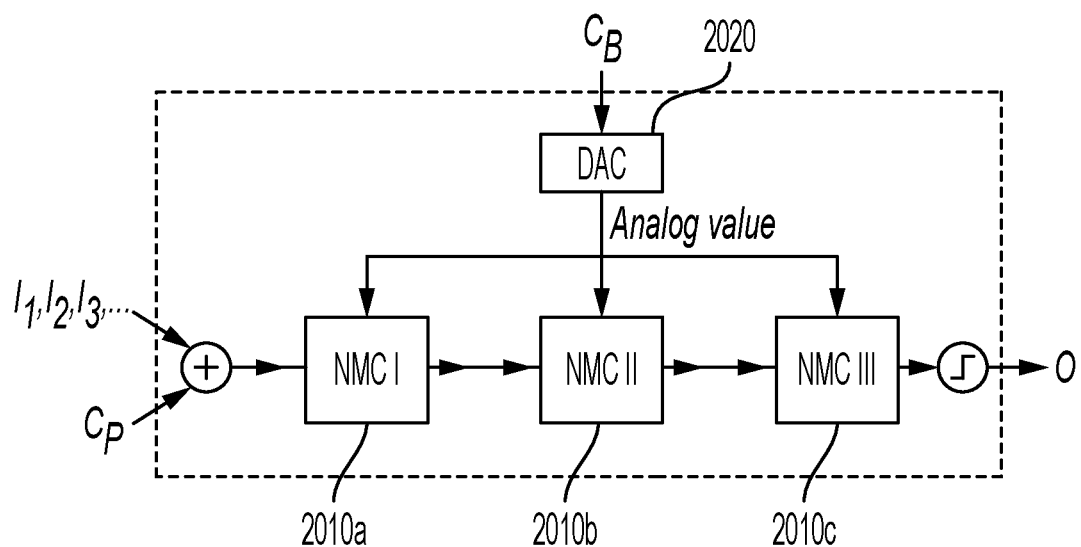
FIG. 20 is a block diagram of an example in which a digital-to-analog converter is used to convert the digital control bit to an analog value to be used as bifurcation parameter by multiple NMCs according to one aspect of the present disclosure.

In FIG. 19, multiple examples of NMC are shown. Each NMC 1910a-c has an internal mechanism to receive digital control input CB and convert it to an analog value that is usable by the NMC as the bifurcation parameter. In FIG. 20 a DAC 2020 is used can be used to convert the digital CB to the analog value to be used as bifurcation parameter by all examples of the NMCs 2010a-c. This can further simplify the design of NMCs 2010a-c.

Figure 21:
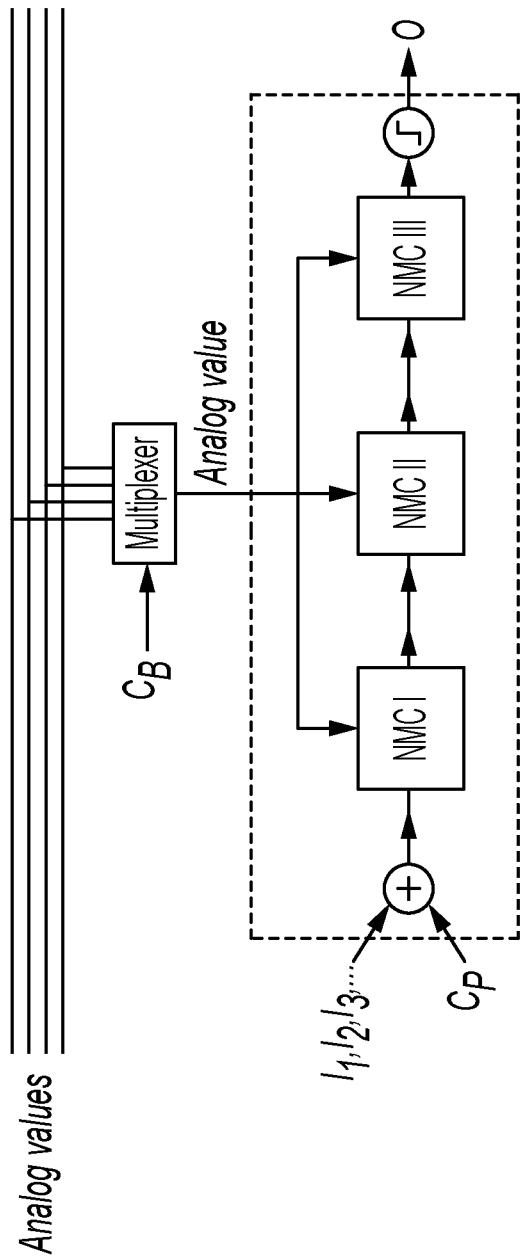
FIG. 21 is a schematic diagram of an example in which multiple different analog signals can be routed in the circuit according to one aspect of the present disclosure.

Furthermore, rather than using the DAC 2020 to convert a digital control bit to analog values, multiple different analog signals can be routed in the circuit, and use digital control bits to select different analog values and use the different analog values as the analog control signal. This architecture is depicted in FIG. 21. One advantage is that a DAC can be sensitive to temperature variations. Constructing a robust DAC can use a large area. In previous version of dynamics-based logic blocks, each logic block and each NMC had its own DAC. As a result, a circuit with thousands of NMCs can have thousands of the DACs. It may not be possible to use a more robust, but larger DAC because there are so many of DACs on the circuit. By creating theses analog values once for the entire circuit, and routing the analog values around the circuit and selecting different analog values digitally, the problem can be resolved.

Figure 22:
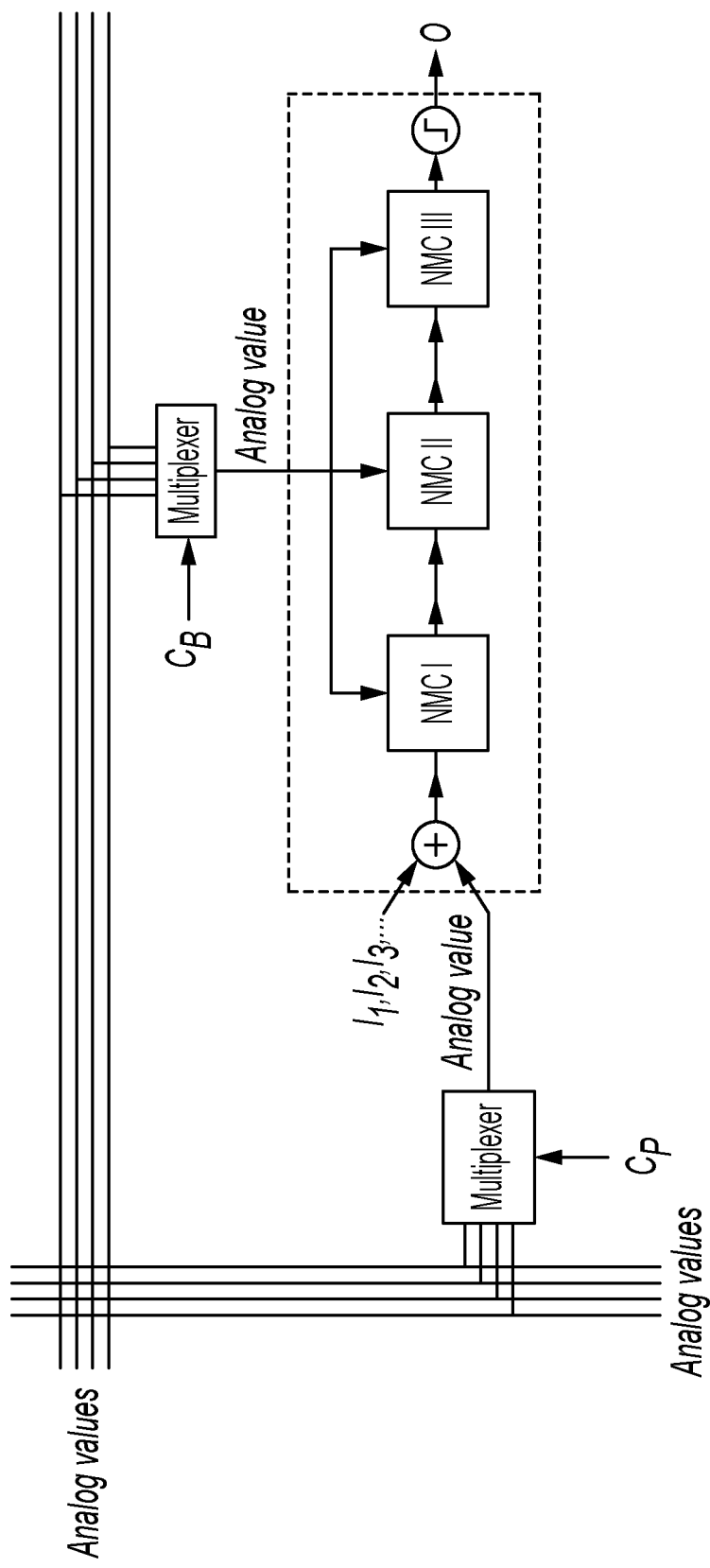
FIG. 22 is a schematic diagram of another example in which multiple different analog signals can be routed in the circuit according to one aspect of the present disclosure.

In FIG. 21 the analog values can be created once, and as a result, a larger more complex circuitry can be used to produce the analog values precisely and robustly. In the block diagram, there is another control input, $C_P$, which goes through a similar DAC system. Similar to $C_B$, the $C_P$ can be similarly implemented by creating different analog signals for the entire integrated circuit and multiple logic blocks for once, and routing the analog values across the circuit, and then digitally selecting different analog values as the $C_P$ control input. Some advantages of the mechanism are similar to $C_B$ case: more robust to temperature circuits without any substantial increase in size or complexity of the NMCs. The architecture is shown in FIG. 22.

Dynamic Coupling of Dynamics-Based Nonlinear Circuits can Reduce Noise

Figure 23:
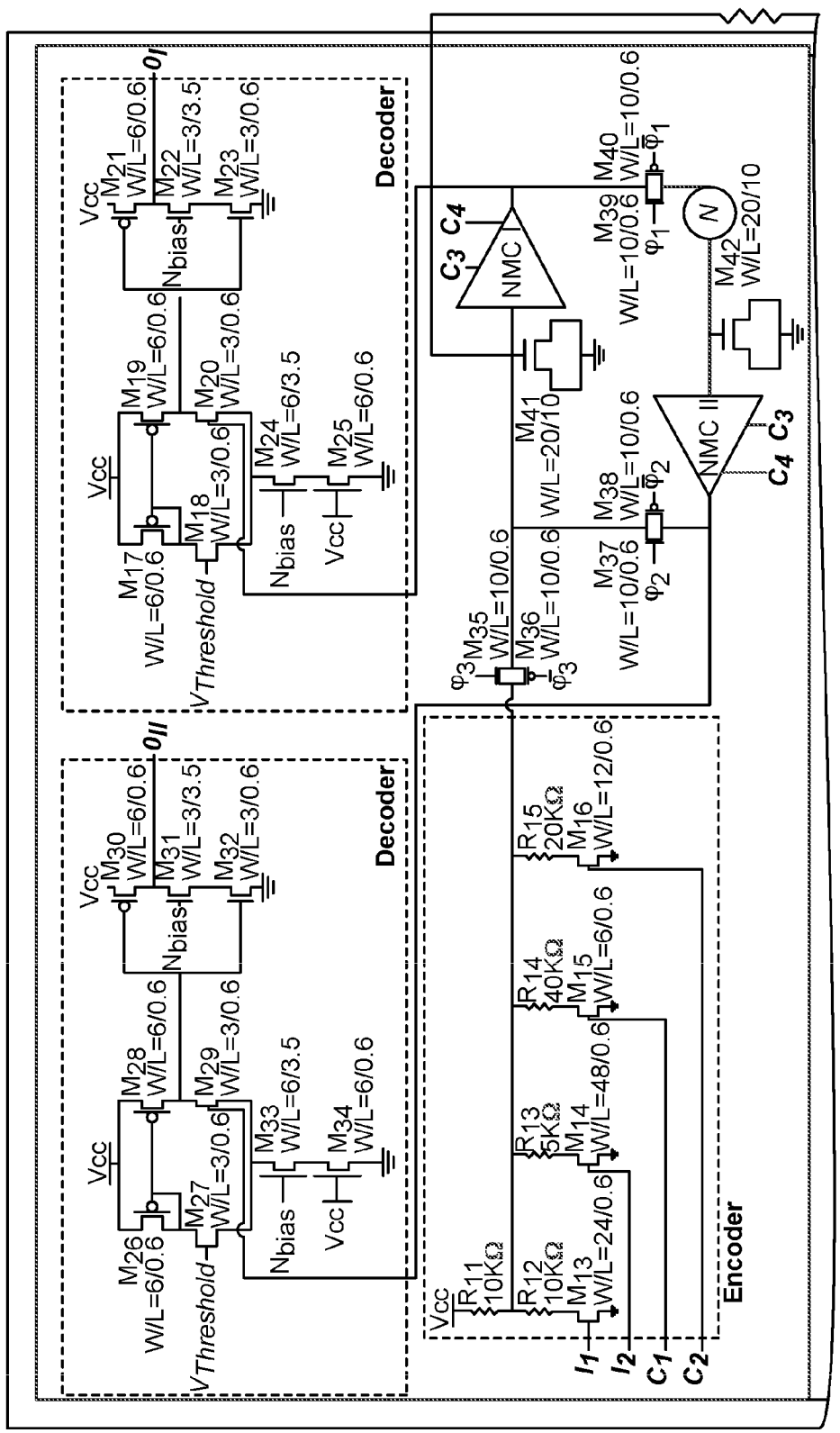
FIG. 23 is a circuit diagram of an example in which four dynamics-based computing circuits are coupled together according to one aspect of the present disclosure.
Figure 23:
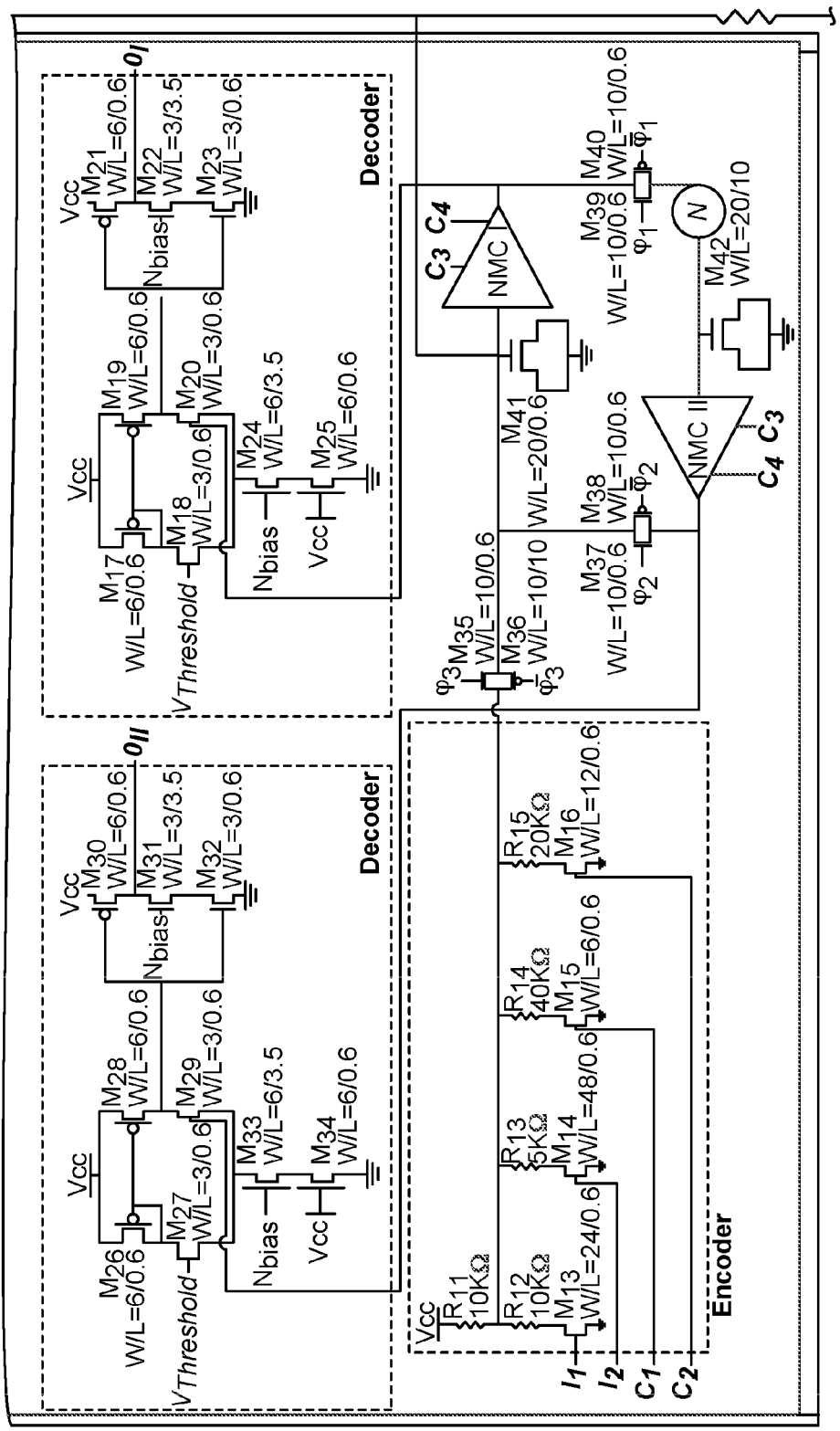
Figure 23:
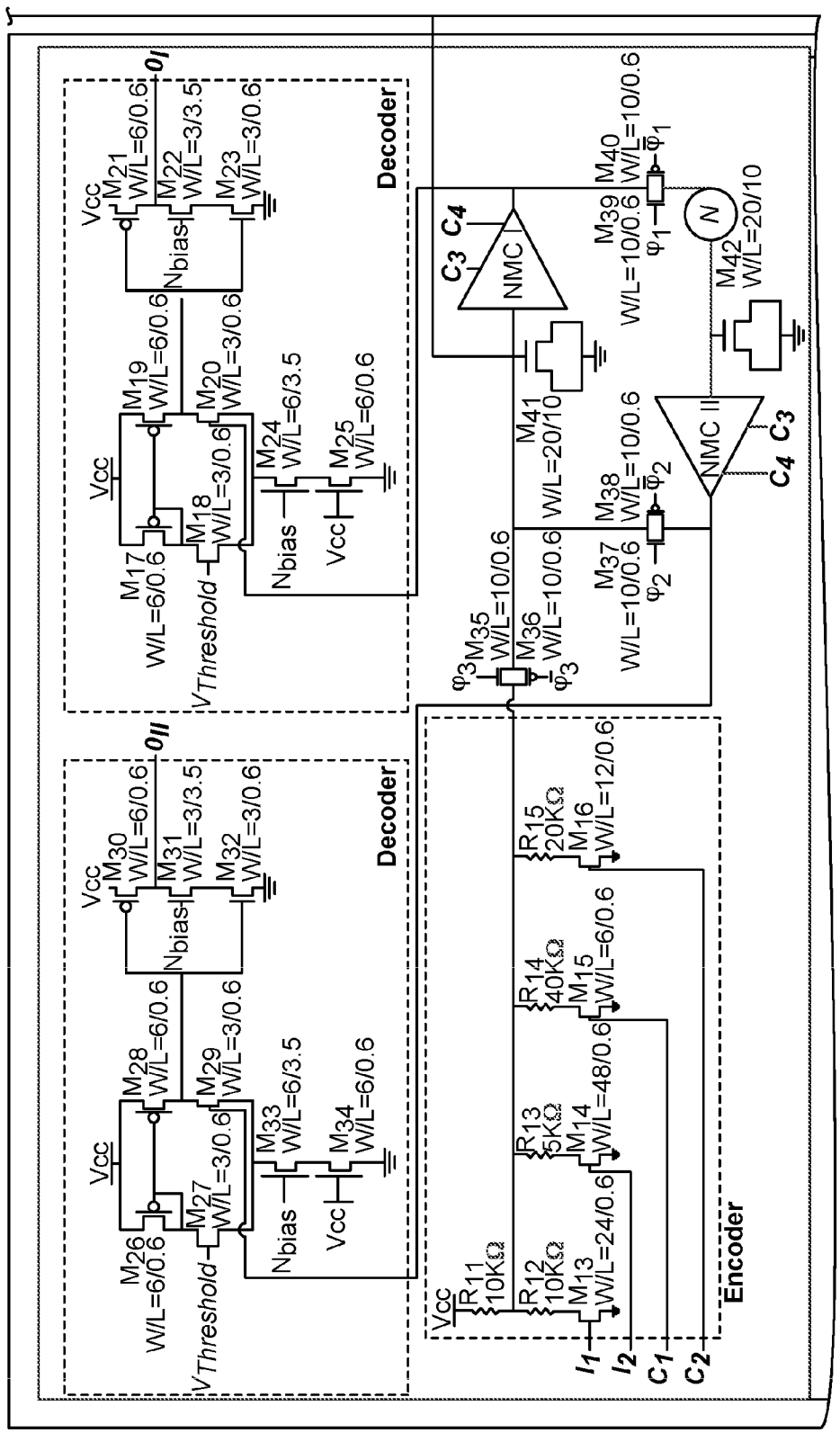
Figure 23:
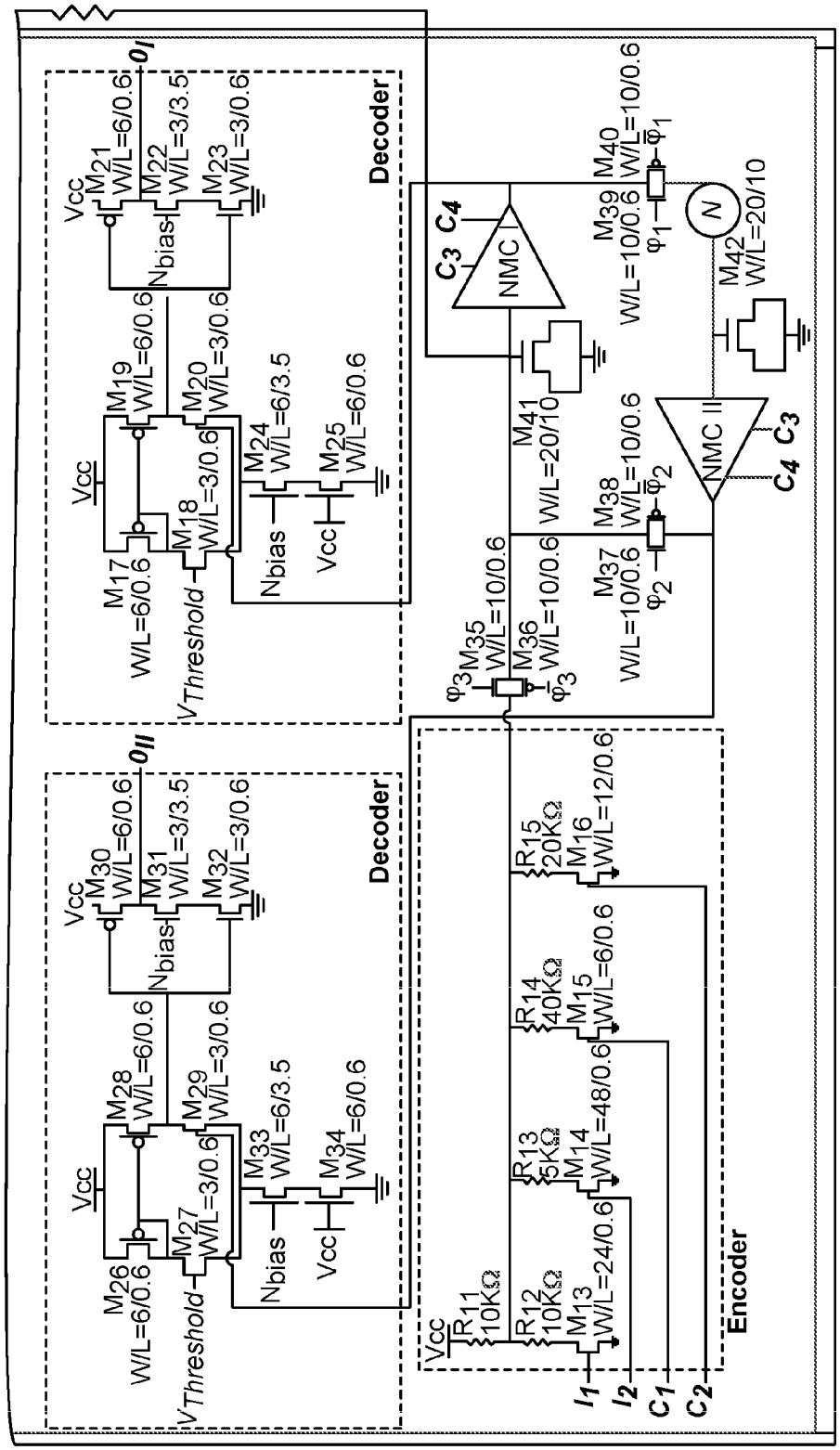

In some aspects, dynamic coupling of dynamics-based nonlinear circuits can reduce noise in the circuits. In some examples, the dynamics based computing circuits can be connected at a proper point, and using a proper resistance value of the resistor for an effective coupling. FIG. 23 shows the locations of the circuits that can be chosen to couple by resistors. FIG. 23 depicts four examples of the same nonlinear dynamics-based resistance value of the resistors is 10KΩ in the simulation.

The circuits in FIG. 23 can be designed in Cadence® Virtuoso® design environment and simulated using Cadence® Spectre® circuit simulator. The circuit simulation environment can be almost an ideal environment in the sense that there is no environmental noise, except some numerical noise such as truncation, etc. As a result, a noise source can be added in the circuit simulation to model the noise that is present in the real world and to investigate how the coupled circuits behave against the added noise. In FIG. 23, four noise sources can be included, referred to as Noise 1, Noise 2, Noise 3, and Noise 4. The noise sources provide noises that are statistically independent from each other. Also, the noise sources operate as additive noise in the sense that the noise sources introduce additive noise to state variables of the circuits.

Figure 24:
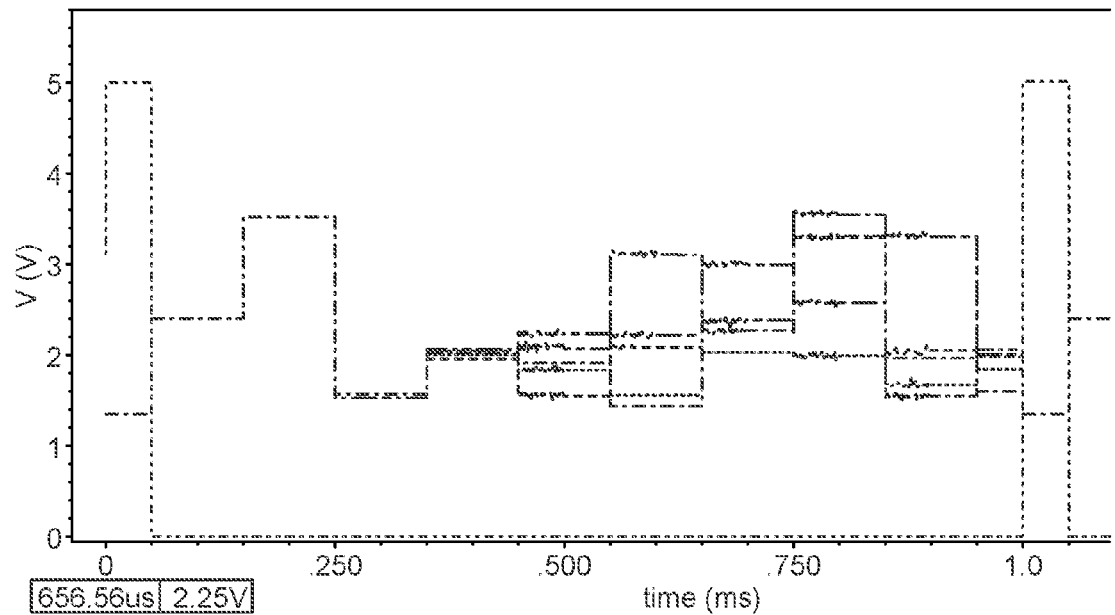
FIG. 24 is a screenshot of an example of an evolution of four noisy dynamics-based logic block circuits when there is no coupling according to one aspect of the present disclosure.

As a reference point, a single dynamics based computing circuit without any noise can be simulated. The black plot in FIG. 24 shows the result. Then four single circuits can be simulated when there is no coupling, and each circuit has its own independent noise source. Due to chaotic nature of the circuits, the additive noise rapidly changes the course of the orbits after a few first iterations.

But when the circuits are coupled, and the coupling is strong enough, the evolution of the circuits becomes synchronized. In chaos synchronization, with coupling circuits, the chaotic circuits are locked-in and synchronized together. The coupled, synchronized circuits may be less prone to local noise. In other words, coupled, synchronized circuits can contain less noise than independent circuits, and this can be used as a method to implement robust-to-noise systems.

Figure 25:
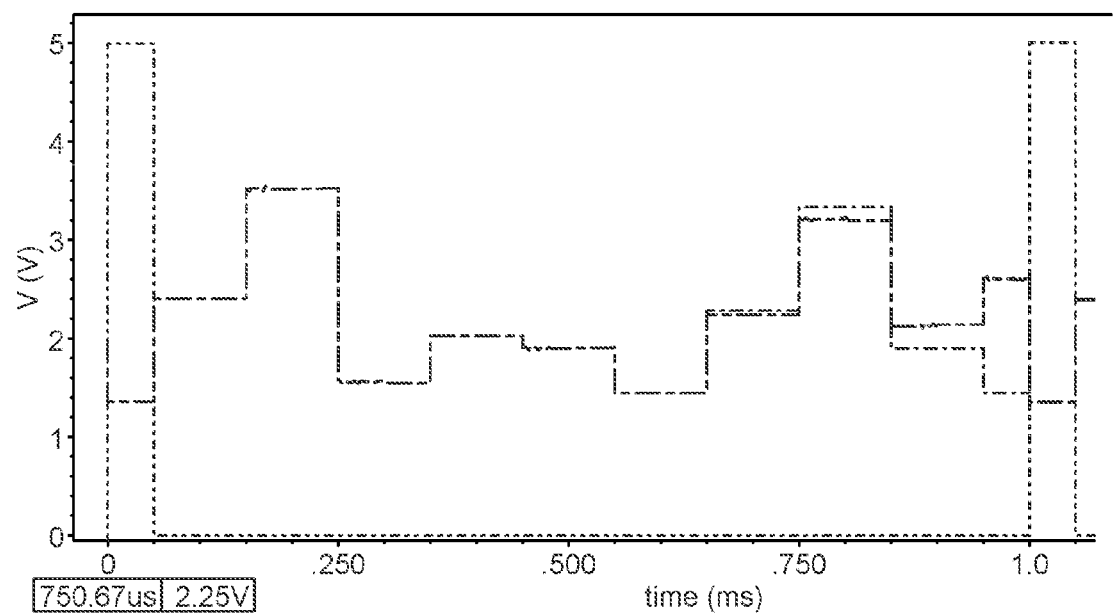
FIG. 25 is a screenshot of an example of an evolution of coupled dynamics-based logic block circuits according to one aspect of the present disclosure.

The simulation results when circuits are coupled are shown in FIG. 25. Again, a black plot represents the noise-free evolution as a reference point. And evolution plots of different circuits are color-coded. The circuits can be synchronized and the synchronized noisy evolution of the circuits can follow the noise-free evolution better than when the circuits were uncoupled from each other.

A series of identical dynamics based computing circuits can be coupled together to perform more robust to noise computation, or decoupled to perform parallel computation to improve performance. The decoupling/coupling mechanism can be implemented by inclusion of a simple pass transistor or transmission gates in series with the coupling resistors. Whenever these switches are connected, the circuits are coupled, and whenever these switches are disconnected the circuits are decoupled. The decoupling/coupling mechanism can allow the system to have two operation modes: (1) a robust to noise mode and (2) a high performance.

Dynamical coupling of circuits can reduce the effects of fabrication nonidealities. Different fabricated instances of the same circuit can vary from each other. Dynamical coupling of circuits can produce a circuit that behaves closer to the originally designed circuit. Dynamical coupling can average the effects of incoherent variations across the coupled circuits, and mitigate the effects of fabrication nonidealities. Noise or fabrication nonidealities can average out across the circuits and the result can be a more precise circuit and more precise computation.

Continuous Time Dynamics-Based Nonlinear Circuits

One advantage of a chaotic circuit over another circuit for logical operations can be the implementation of multiple logical functions from the same circuit. To obtain the feature, architectures can use an evolution of a chaotic circuit. As described above, chaotic circuits can evolve at discrete steps. In some aspects, chaotic circuits can be used that evolve continuously in time. Chaotic circuits that evolve continuously in time may not require switching capacitors, which can introduce noise and delay. By using an oscillator circuit that can continuously evolve in time with no need for sample and hold circuits to enforce iteration, a chaotic circuit can gain higher speeds, a lower error rate, and lower noise.

In some examples, a chaotic oscillator can be used with a double scroll attractor. The oscillator can be tested for the logical functionalities obtained when the initial conditions are kept within its chaotic boundaries. Examples of results are depicted in FIGS. 46-49.

Figure 26:
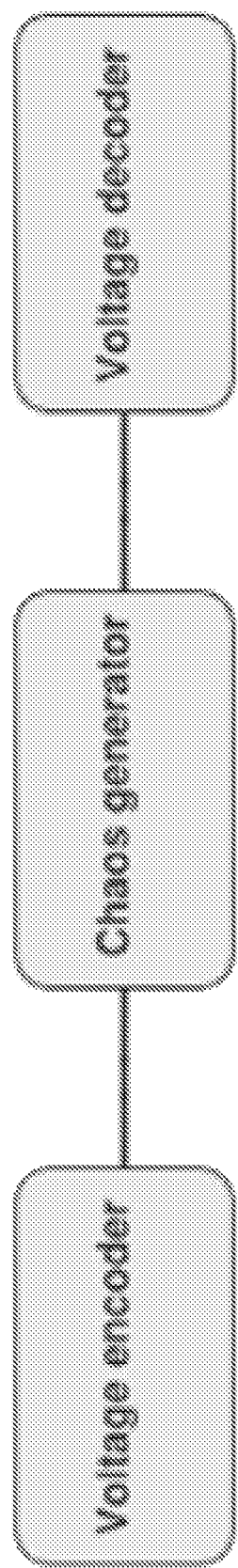
FIG. 26 is a block diagram of a chaos computing logic block according to one aspect of the present disclosure.

The system developed and shown in FIG. 26 can include three main components (1) a voltage encoder, (2) a chaos generator, and (3) a voltage decoder. Based on the input and control signals, the encoders can generate initial set of voltages, which are applied to the chaos generator as the initial condition of the oscillator, and once the system is operational the output is sampled at a fixed predetermined time and held. The voltage is then compared with a threshold voltage (here 900 mV) and based on the value of the voltage, the voltage is considered as a logical output of 0 or 1.

The circuit can realize a third-order nonlinear differential equation of which vx=Vx−Vdd/2 is a solution.

$$\frac{d^3 v_x(\tau)}{d\tau^3} =$$

-continued $$-\alpha \frac{g}{C} \frac{d^3 v_x(\tau)}{d\tau^3} - \alpha \left(\frac{g}{C}\right)^2 \frac{d^3 v_x(\tau)}{d\tau^3} - a\left(\frac{g}{C}\right)^3 v_x(\tau) + \alpha V_R \left(\frac{g}{C}\right)^3 \text{sign}(v_x(\tau))$$

where g is the transconductance of each inverter stage, $V_R = I_{cbg}/g$, $I_{cgb}$ is the bias current, and $\alpha = C/Cz$ and $C = Cx = Cy$. The oscillator can be found to operate within chaotic regime when a is between 0.4-0.78

Figure 27:
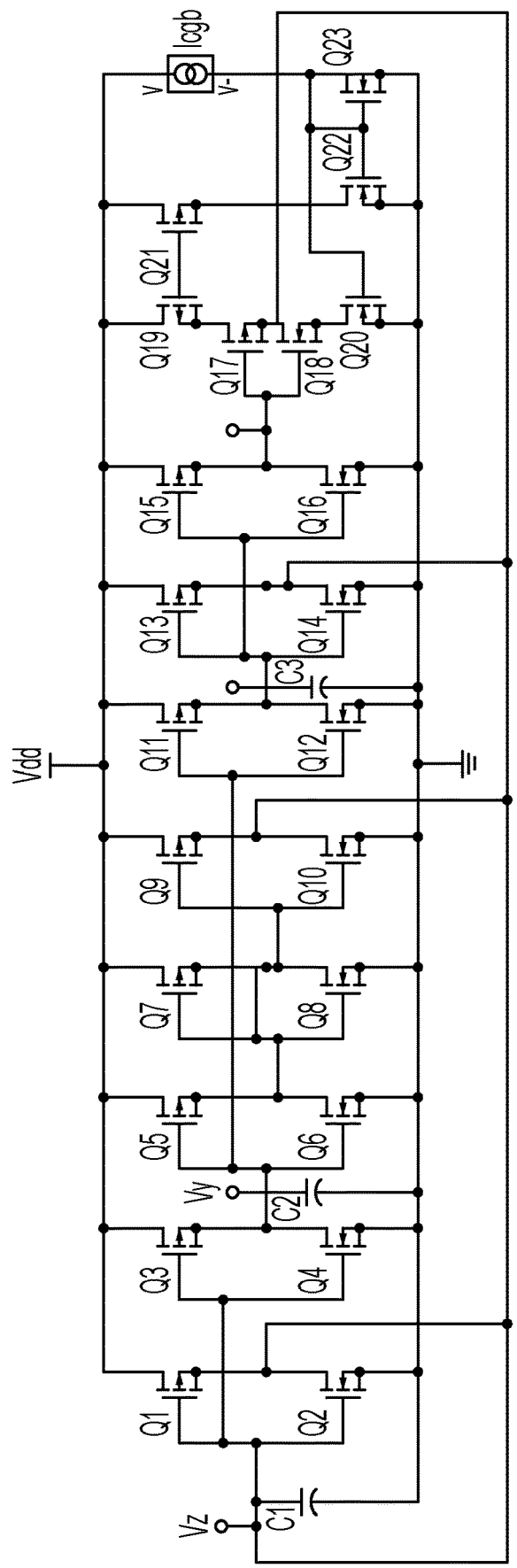
FIG. 27 is a circuit diagram of a chaotic oscillator according to one aspect of the present disclosure.

An example of a circuit implementing the oscillator is as shown in FIG. 27, followed by the time sequence of the desired voltage signals in FIG. 28, and with the double scroll attractor as shown in FIG. 29 and FIG. 30.

In one example, the circuit can be operated at $\alpha=0.45$, g=275 uS and Icgb=30 µA. The values can provide a good voltage swing and distribution of the attractor.

Figure 31:
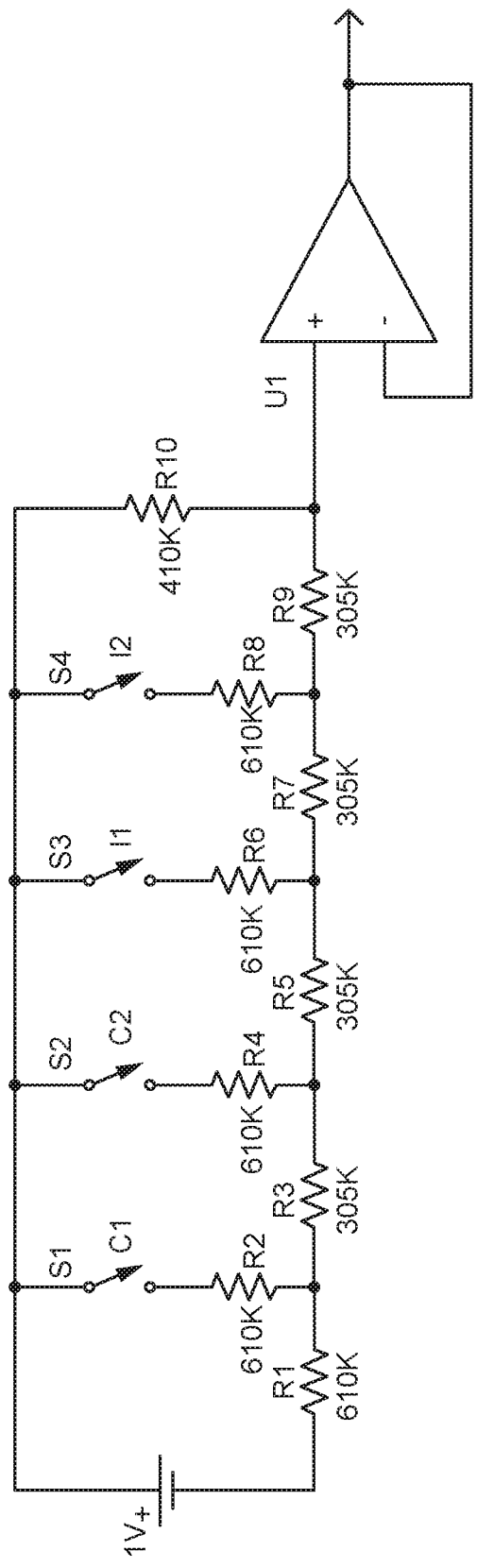
FIG. 31 is a circuit diagram of an example of a voltage encoder according to one aspect of the present disclosure.

The voltage encoder can be used to convert data and control signals into a voltage value that is used as the initial condition of the oscillator. I1 and I2 are data inputs, and C1 and C2 are control inputs to program the logic block to implement different types of two-input, one-output functions. The voltages are applied to the three capacitive nodes obtained in the design on third order nonlinear differential equation. The variations in the output of the chaotic circuits can be exploited based on different initial voltages as a method to obtain multiple different functions out of the same circuit. An R-2R ladder circuit can be used to give output voltages in the range of 820 mV-975 mV. The voltages were chosen based on the chaotic limits of the oscillator for a fixed value of a. The circuit is shown in FIG. 31.

The switches S1 through S4 are controlled by the input control signals C1, C2, I1, and I2. Once the oscillator is initialized at three nodes of the chaotic oscillator, the oscillator can oscillate freely, and a logical output can be obtained from the voltage of one of the nodes. In a voltage decoder, the voltage can be compared with a threshold value to obtain the binary output. As this is a continuous time oscillator, the output can be obtained at a fixed time. For example, the voltage at the Vx node on the oscillator can be sampled every 75 ns. The decoder can include a sample and hold circuit that samples the output at 75 ns and holds it while the following comparator compares the voltage to the reference voltage (e.g., Vdd/2, viz. 900 mV). If the sampled voltage is below the threshold voltage, the output is considered to be logical 0 and if the sampled voltage is above the threshold, it is considered to be logical 1.

Figure 32:
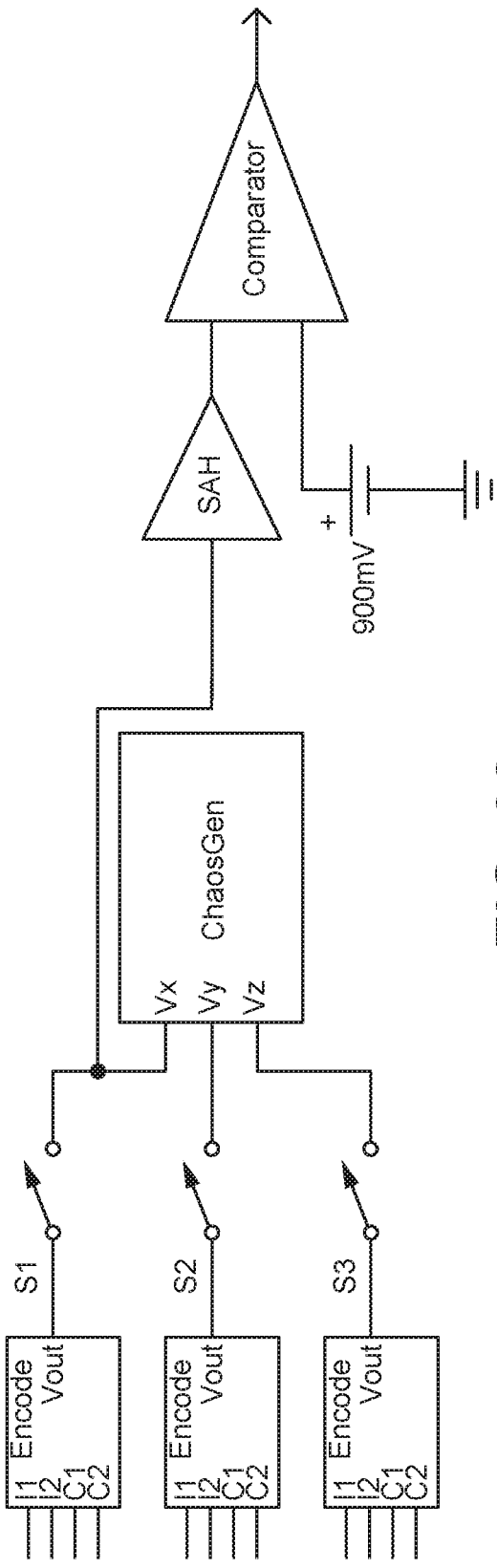
FIG. 32 is a schematic diagram of an example of chaotic oscillator based computing according to one aspect of the present disclosure.

The test schematic setup is shown in FIG. 32. The control signals C1, C2, I1, and I2 can be set as per the desired operation. The switches S1, S2 and S3 in FIG. 31 can be closed at the beginning to charge the capacitors at the nodes to initial voltages. The switches can be opened simultaneously and the oscillator can be allowed to oscillate. The logical operations can be obtained at the output at 75 ns when the sample and hold circuit is triggered. The output can be taken from Vx node. Once the output is obtained, the oscillator can be reset with a next set of control signals to get different logical operation at 75 ns.

For various control signal combinations the output obtained are listed in the table in FIG. 46. The outputs can be clubbed for pairs of control signals to give various logical gates. Some of the logical gates are tabulated in the tables in FIGS. 47-49.

System Level Reconfigurability Using Dynamics-Based Nonlinear Circuits

In some aspects, a specific architecture can preserve the reconfigurability of the logic blocks, while transforming the logic blocks from circuit level to system level. Here, system-level reconfigurability refers to reconfiguring a computing system composed of nonlinear dynamics-based logic blocks so that it can perform a different computation in which reconfigurability is executed by dynamically reconfiguring the logic blocks. The architectures may not require halting the computing system for reconfiguration; rather, reconfiguring the computing system can take place instantaneously. As a result, at each clock cycle the computing system can be reconfigured to perform a different computation.

Figure 33:
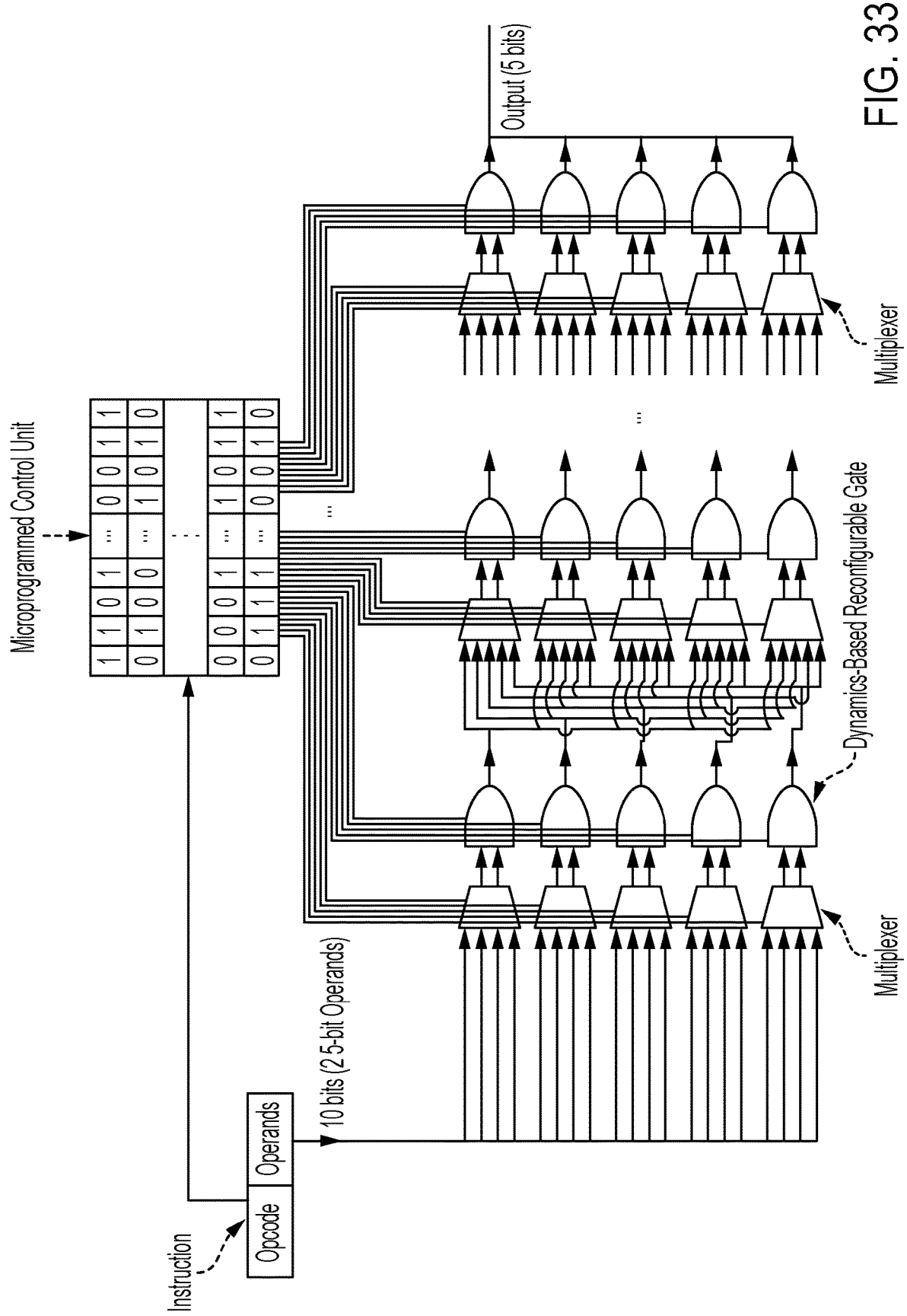
FIG. 33 is a schematic diagram of an example of a multiple-column architecture for nonlinear dynamics-based hardware according to one aspect of the present disclosure.

FIG. 33 discloses an example of architecture for nonlinear dynamics-based hardware. There can be five nonlinear dynamics-based logic blocks in each column of the lattice, but there could be any other number of logic blocks in a column. The size is arbitrary, and the architecture is scalable to facilitate any operand size. The first column of the lattice can be the input column, the last column can be the output column, and the rest of the columns can be the inner columns. The logic blocks of the input column can receive the operands or data inputs as their inputs. The rest of the columns can receive the outputs of the logic blocks in the previous column as their inputs. There can be multiplexers between columns to select which outputs go to the inputs of the logic blocks in the next column, and there can be multiplexers for the input column to select different operand bits as the inputs to different logic blocks of the input column.

Two categories of elements can be programmed: (1) the nonlinear dynamics-based logic blocks and (2) the multiplexers. A microprogrammed control unit can be used for the purpose, as shown in the architecture in FIG. 33.

The microprogrammed control unit can be an SRAM memory, where each row contains the control bits to program the nonlinear dynamics-based logic blocks and the multiplexers so that the lattice of FIG. 33 can implement a certain type of computation, e.g., an addition operation. Different rows of the SRAM can contain the programing codes for different functions. In some examples, the operation code, also known as "opcode," for an addition operation can be the memory address of the SRAM row that contains the control bits for an addition operation. Whenever the computer system fetches another instruction, the opcode of the instruction can be the address of the SRAM row that contains the control bits to program the architecture to implement that instruction.

The lattice of logic blocks in FIG. 33 can be pipelined in the sense that the signals propagate from one column to the next column step-by-step, one column per cycle. The pipelined architecture can maximize instruction throughput since multiple instructions can be executed at the same time. For example, during the first clock cycle, the first instruction is fetched, the first column is reconfigured to implement the first layer of the circuit for implementing the first instruction. Then the outputs of the first column flow to the second column and the second column can be reconfigured to implement the second layer of the circuit for the instruction. At the same time, the second instruction is fetched and the first column is reconfigured to implement the first layer of the circuit for the second instruction. During the following cycles, the instructions can propagate to the right, while newer instructions continuously fetched and filled into the lattice from the left.

In some pipelined architectures, there is just a flow of data, while the instructions are fixed and hardwired. Such architectures are called single instruction, multiple data ("SIMD") hardware. The architecture can have a continuous flows of data and instructions, meaning that at any moment there are multiple data and multiple instructions in the lattice. As a result, the architecture can be a multiple instructions multiple data ("MIMD") system, meaning that there are multiple instructions and multiple data in the system.

Figure 34:
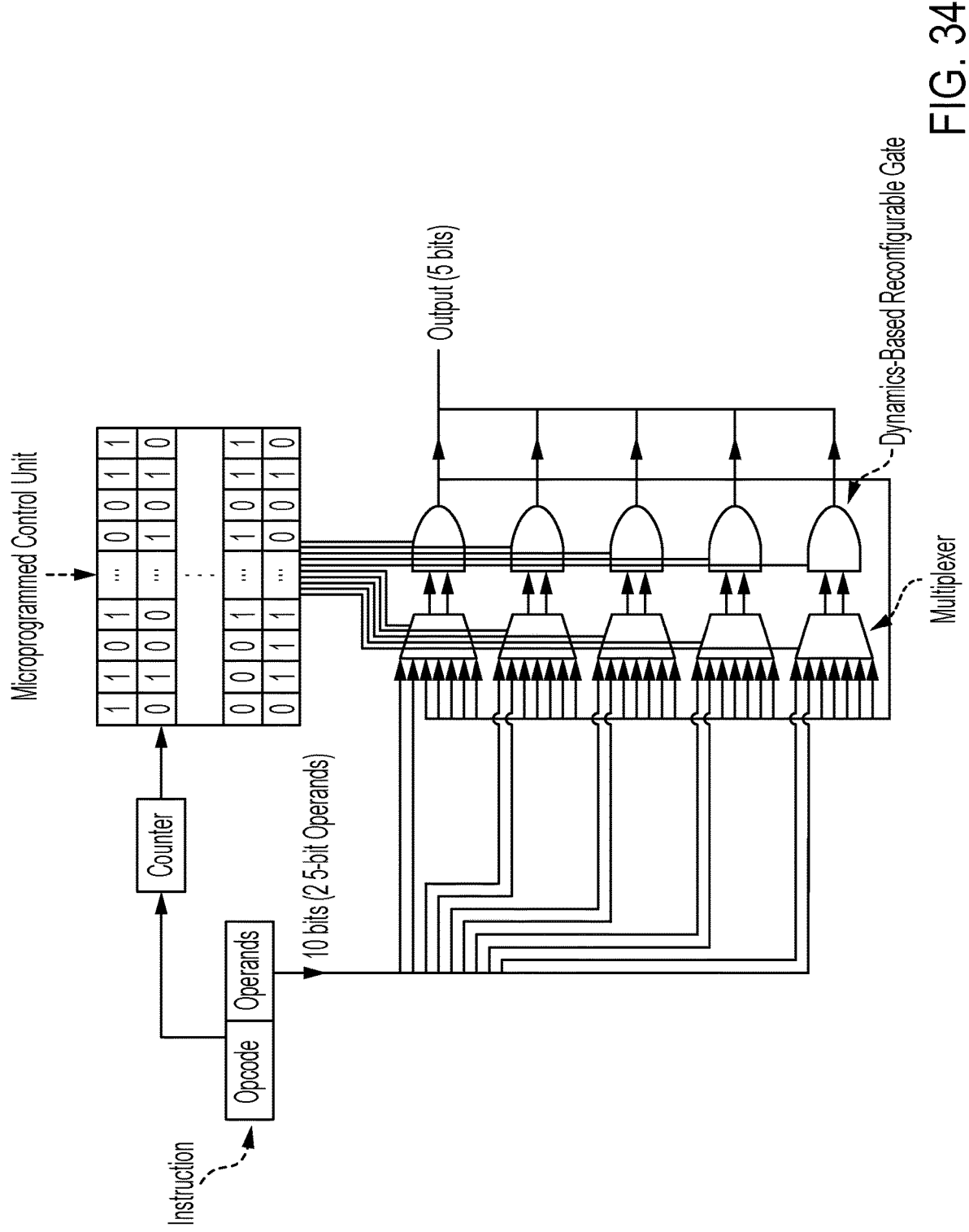
FIG. 34 is a schematic diagram of an example of a single-column architecture for nonlinear dynamics-based hardware according to one aspect of the present disclosure.

The lattice of logic blocks in the architecture in FIG. 33 is two-dimensional, in the sense that the logic blocks are arranged in rows and columns. The two-dimensional lattice of logic blocks can be further reduced to just a single column of logic blocks, where at each cycle the column is reconfigured to implement a different column of the two-dimensional lattice of logic blocks. The architecture is shown in FIG. 34.

During the first clock cycle, the column of logic blocks is reconfigured to implement the input column of the architecture in FIG. 33. In the cycle, the multiplexers are programmed so that the operand bits go to the logic blocks. During the second clock cycle, the column is reconfigured to implement the second column of the architecture in FIG. 33, and during the $i^{th}$ clock cycle, the column is reconfigured and implements the $i^{th}$ column. During the cycles, the outputs produced during the previous clock cycle are fed back to the inputs. This is equivalent to wiring the outputs of a column of logic blocks to the inputs of the next column in the architecture in FIG. 33. In the architecture in FIG. 34, the codes to program different columns are stored in consequent memory locations. The opcode of an instruction points to the codes for the first column. The address goes to a counter, which initializes the counter. Then at each clock cycle, +1 is added to the content of the counter. As a result, the counter points to the address of the next memory location, which stores the codes to program the next column of the lattice. In the architecture, the clock signals and timing are not shown.

In some examples, an addition operation, where each operand is two bits can be performed. An example of the truth table for the computation is shown in in FIG. 50. Various aspects can be applied to virtually any problem in the field of computer science and engineering.

In some examples, digital design techniques can be used to create a digital circuit to implement the table in FIG. 50, and then map the design to a reconfigurable dynamics-based computing system. The design can include both the connectivity—how the multiplexers in the architectures are to be programmed to create the desired connectivity, and the type of operation for each dynamics-based logic block—how the dynamics-based logic blocks are to be programmed. The control bits for multiplexers and logic blocks can be loaded to the row of the SRAM microprogrammed control unit to which the opcode for addition is pointing.

In additional or alternative examples, an adaptive learning technique can allow the computing system itself to learn how to implement the given problem and obtain the control bits. The approach can be referred to as "adaptive dynamics-based computing" in the sense that the system dynamically reconfigures itself, with no need for direct programing, to implement a given type of computation. For the sake of this example, the dynamics-based logic block's internal iteration number, n, can be fixed to 6. As a result, the highlighted row of in the table in FIG. 45 reports the type of two-input, one-output digital functions that the logic block implements for different $C_1C_2C_3C_4$ control bits.

Either the architectures introduced in FIG. 33 or FIG. 34 can be used in the example. The size of the lattice can be 5×5, with 5 logic blocks in each column, and there can be 5 such columns. This can be a 5×5 version of the architecture in FIG. 33, or a 5×1 version of the architecture in FIG. 34, where the systems cycles 5 times.

Figure 35:
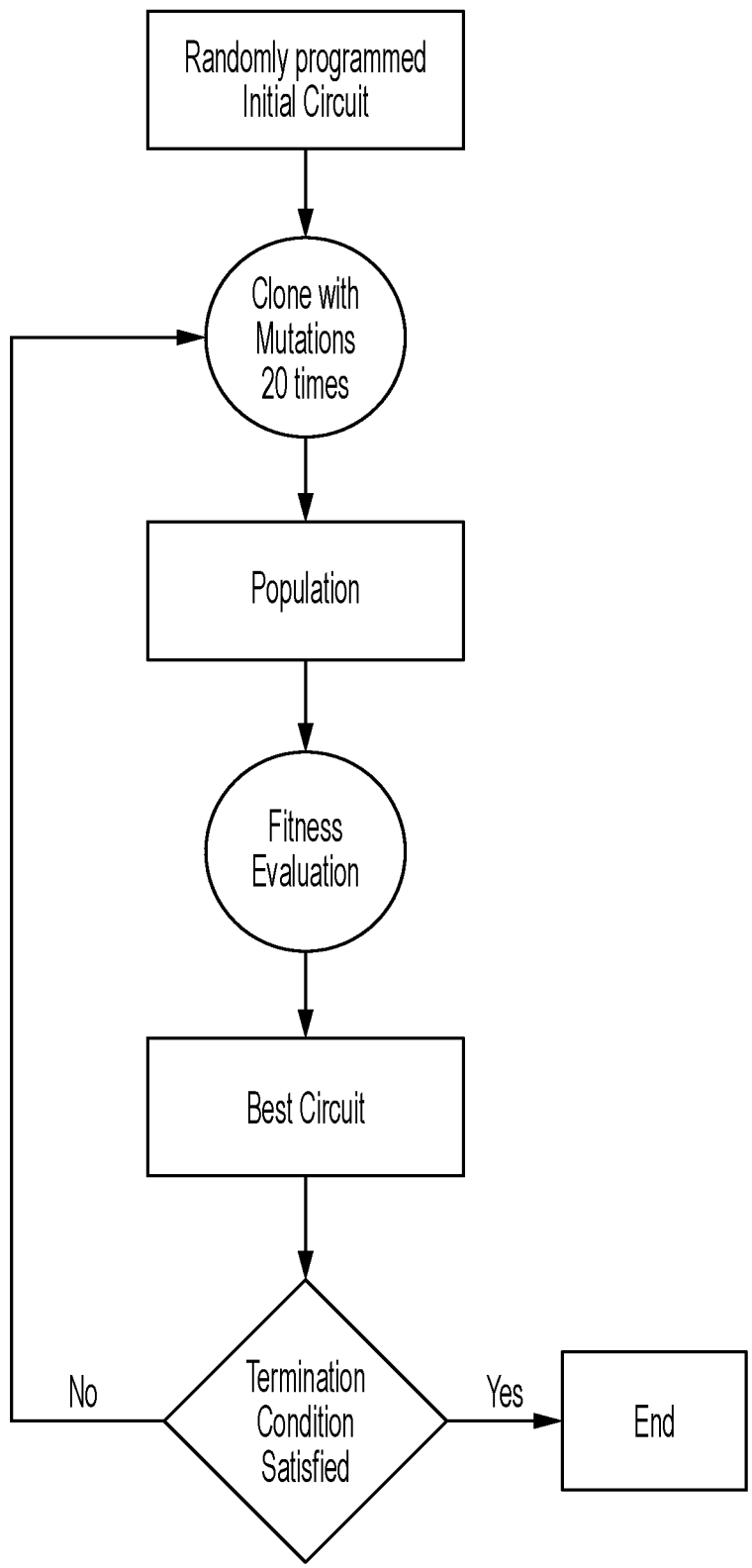
FIG. 35 is a flowchart of an example of a process for training the architecture in FIG. 34 to implement additional operations according to one aspect of the present disclosure.

An evolutionary algorithm can be used to train the architecture to implement an adder. The block diagram for an example of the evolutionary algorithm is shown in FIG. 35.

The evolutionary algorithm can start with randomly programing the architecture. This can be equivalent to loading the row of the microprogrammed SRAM, which the addition opcode is pointing to, with random 0/1 bits. The circuit can be cloned 20 times, and each clone can be mutated independently. To obtain a mutant clone, the architecture is mutated and cloned, then a few of its control bits that are stored in the SRAM are flipped, and the resulting control bits program and construct the mutant clone. The number of bits that are to be flipped can depend on how fitted or unfitted the current architecture is. In some examples, the number of bits to flip can be determined by:

$$\#\text{flipped} = \left\lfloor 1 - \frac{\text{fitness}}{\text{Max\_fitness}} \right\rfloor \times 10 \qquad (15)$$

Here, fitness is the fitness value of the current architecture, and Max_fitness is the maximum possible value of fitness. For example, in the adder example in FIG. 50, the maximum fitness value is 48. Equation (15) is a mathematical floor function. If the architecture from which clones are to be created is not fitted, then Equation (15) sets the number of bits to be flipped to a high number to create enough variety in the clones. If the architecture is relatively fitted, then Equation (15) reduces the number of bits that are going to be flipped to a lower number, so that the clones stay close to the relatively fitted current architecture, and a small number of mutations are performing fine-tuning for possible further fitness enhancement. In the example, during mutation control bits can be treated for connectivity (that program the multiplexers) separately from the logic bloc control bits, in the sense that both of the two groups of control bits are subjected to the same number of bit flipping as determined by Equation (15).

The truth table of a possible architecture can be obtained (by feeding different sets of the inputs and observing the outputs) and compare it with the table in FIG. 50 truth table for an adder. For every correct output bit, one point can be added to the architecture's fitness value. FIG. 50 has 16 columns of inputs and outputs, and each output is composed of three bits. Therefore, the maximum value of fitness that belongs to the adder is 48.

Figure 36:
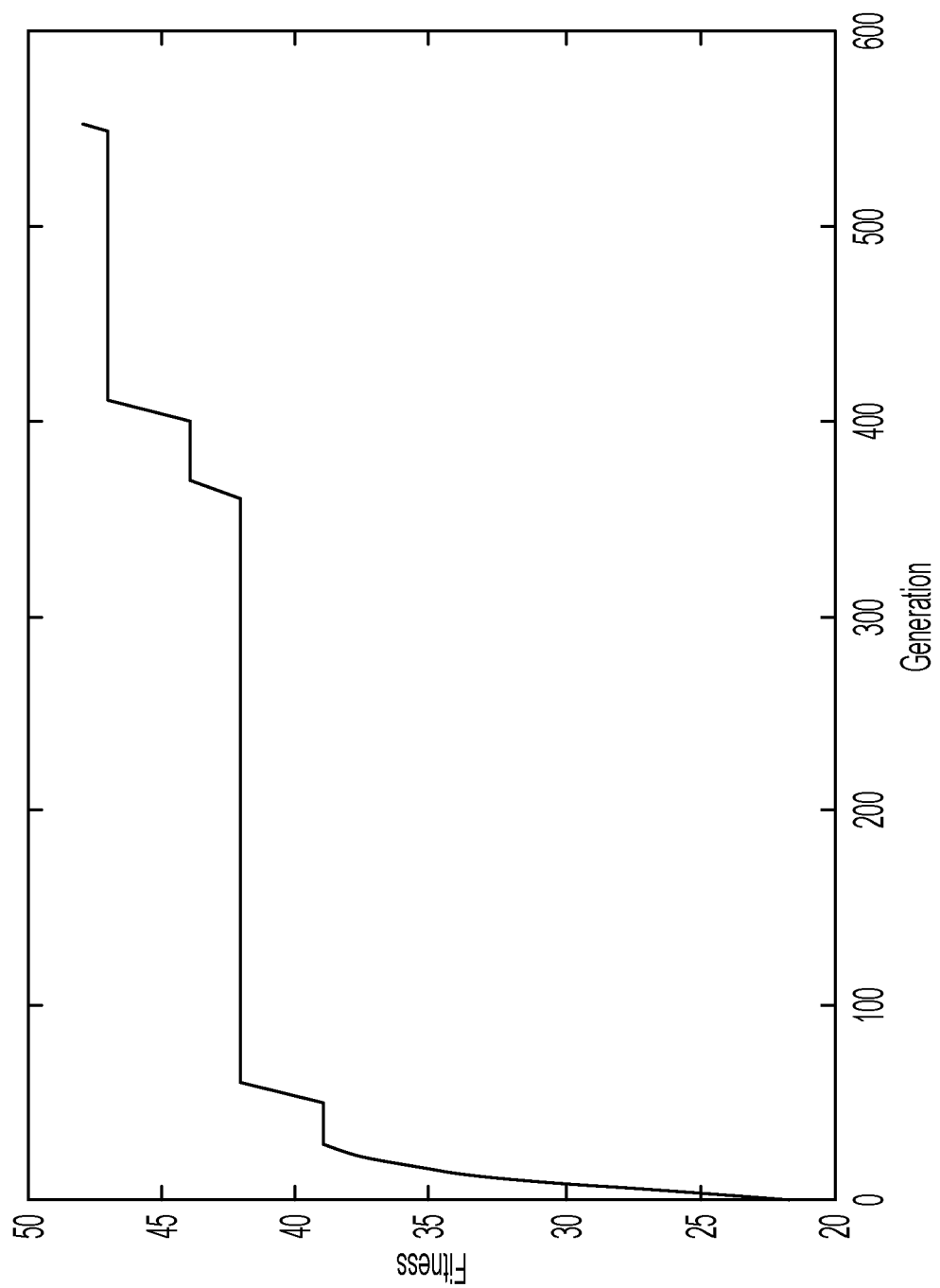
FIG. 36 is a graph depicting examples of fitness values of a programmed architecture at different generations according to one aspect of the present disclosure.

After 553 generations—i.e., loops of the FIG. 35 flowchart—the evolutionary algorithm converges, and the resulting architecture is programmed to implement an adder. The fitness of the best architecture at different generations is plotted in FIG. 36.

Figure 37:
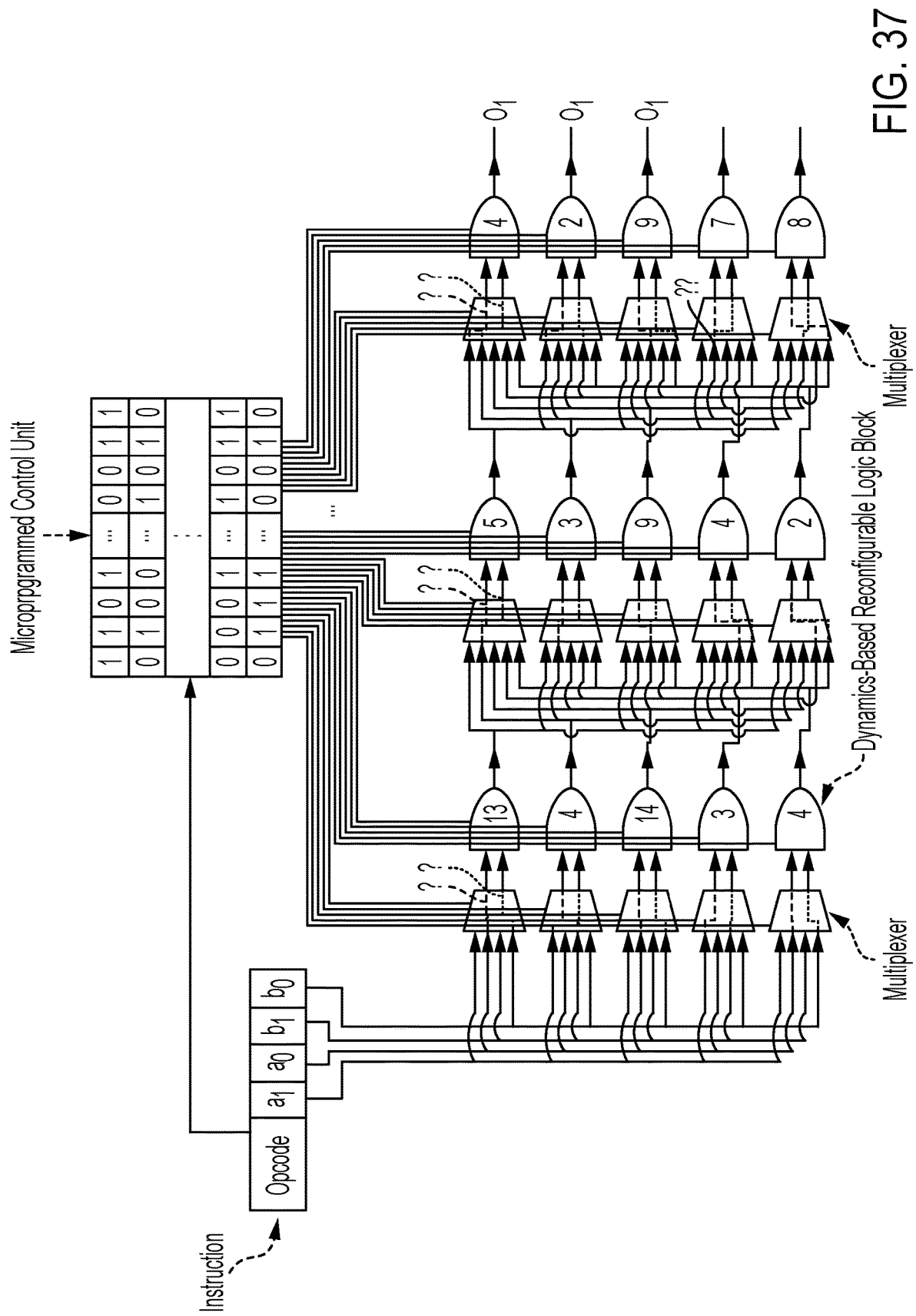
FIG. 37 is a schematic diagram of an example of a multiple-column architecture for implementing addition according to one aspect of the present disclosure.

Since the evolutionary algorithm is a stochastic method, different runs of the same program usually takes different number of generations until it converges to the optimal solution. The resulting programmed architecture to implement the addition operation is depicted in FIG. 37. Line 1 and Line 2 can show how multiplexers are programmed and what the inputs are to each logic block. And the numbers in each logic block can indicate an operation that each logic block is implementing. Sixteen different binary, two-input, one-output combinational functions can be shown. The logic blocks can be labeled with 0, 1, . . . , 15, based on the outputs the logic blocks produce. For example, a logic block that produces all 0 output is function 0, digital function that produces all 1 output is function 15, and the rest are sorted in between. Adaptive learning can allow the system to learn to recover from faults, or adapt to different operational conditions.

Compiler Design for Reconfigurable Logic Blocks

Certain aspects and features relate to interfacing dynamics-based reconfigurable hardware with a software layer and compiling a computer program to a machine code that is understandable by the dynamics-based reconfigurable hardware. In some aspects, the software interface and compiler can be designed to take advantage of the reconfigurability of the dynamics-based hardware. A software interface and compiler can enable the dynamics-based hardware to be connected efficiently with some software applications. In some examples, as a result, any computer program or software can use the advantages of the dynamics-based reconfigurable hardware.

The dynamics-based reconfigurable hardware introduced above can be used as a reconfigurable logic block that can be programmed at the hardware level. A hardware designer can include such reconfigurable logic blocks in the design, and then develop application specific hardware, or software to program the hardware, to perform as desired. The designer can directly program the dynamics-based reconfigurable hardware using the control input, and then provide the data input to the logic block, and read the output from the logic block.

In some aspects, the dynamics-based reconfigurable hardware can be available for everyday applications using a platform and interface that is usable by regular software/hardware designers and developers with little or no prior knowledge or experience with nonlinear dynamics-based hardware.

Figure 38:
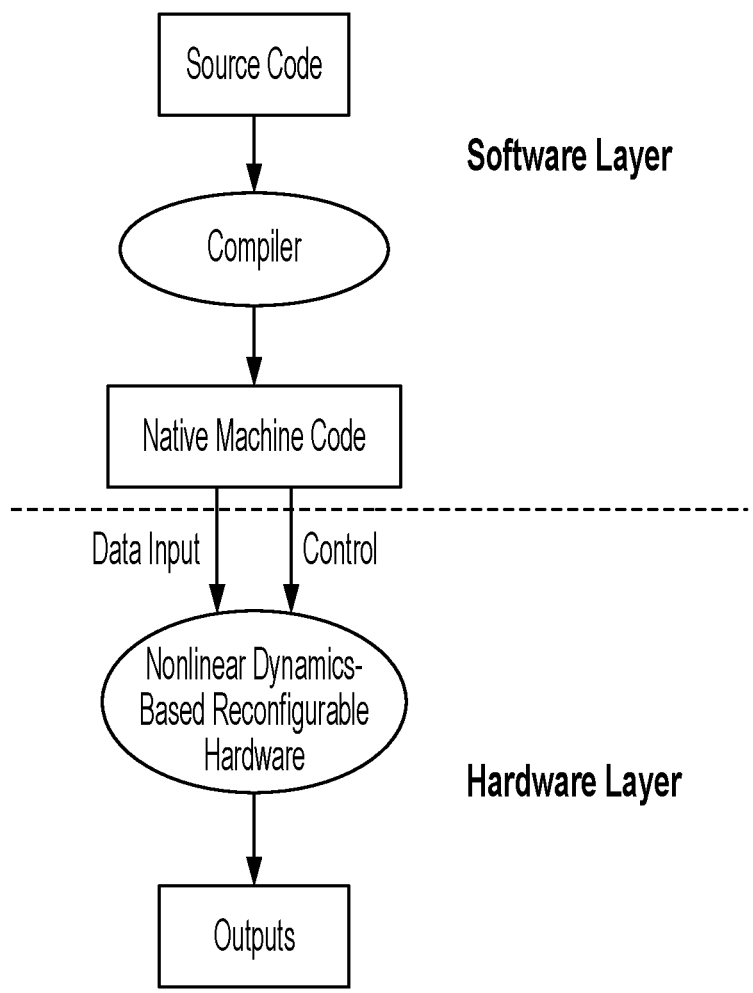
FIG. 38 is a flowchart of an example of a process for converting source code into instructions according to one aspect of the present disclosure.

A software interface and a compiler can be created for the dynamics-based reconfigurable hardware, making it more available for everyday use, where any software developer can write their own computer programs, and then use the compiler to translate their computer program to the native language of the dynamics-based reconfigurable hardware. In some examples, the interface and compiler can translate each instruction for the dynamics-based hardware so that the dynamics-based hardware becomes the direct implementation of the instruction. In some examples, there is no programing time in between the execution of different instructions in the program. The dynamics-based reconfigurable hardware can reconfigure itself and implement an instruction at each clock cycle. Dynamics-based reconfigurable computing can allow a single circuit to implement all the different instructions. The software-hardware interface and compiler can allow a dynamics-based reconfigurable circuit to reconfigure itself at each cycle to directly implement all instructions of the program one at a time. The flowchart for the scenario is shown in FIG. 38. A developer can write a program in any computer language (e.g., in C language) and then can use the compiler to translate the sequence of instructions in the computer language to the sequence of machine codes that reconfigure the dynamics-based reconfigurable hardware.

In general purpose microprocessors, the source code can be compiled to a series of machine instructions, where each instruction instructs the microprocessor to execute that specific instruction. In a microprocessor, there can be different circuits for different instructions. The execution of an instruction can be performed by routing the operands to the specific circuit that implements the instruction and reading the output from the specific circuit.

Figure 39:
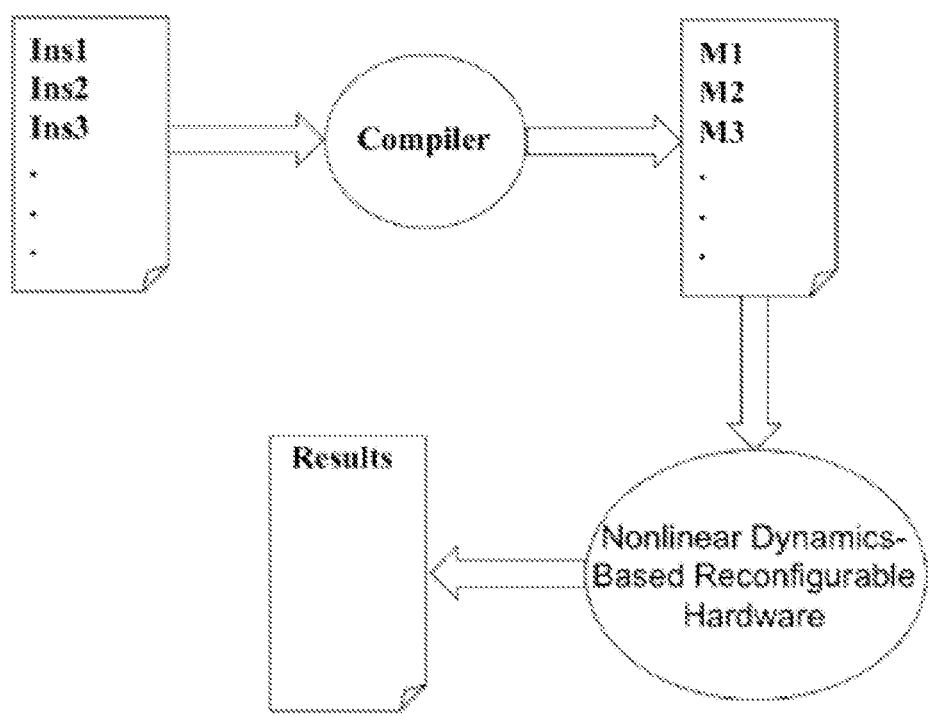
FIG. 39 is a flow chart of an example of a process for converting software instructions into control bits for reconfiguring the nonlinear hardware to implement the instructions according to one aspect of the present disclosure.

With the nonlinear dynamics-based hardware, the native machine code produced by the compilers can be control bits that reconfigure the nonlinear dynamics-based hardware so that the nonlinear dynamics-based hardware can implement the instruction. In some aspects, a nonlinear dynamics-based hardware can have one circuit that implements all functions. The compiler can allow the hardware to be reconfigured to implement all instructions in the program. The flowchart of FIG. 39 depicts the instructions in a program, Ins1, Ins2, Ins3, . . . , being translated to machine codes M1, M2, M3, . . . , where Mi represents the control bits to reconfigure the nonlinear dynamics-based hardware to implement instruction, Insi.

Figure 40:
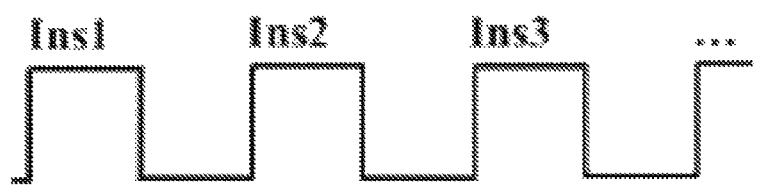
FIG. 40 is a diagram of an example of an instruction signal according to one aspect of the present disclosure.

The nonlinear dynamics-based reconfigurable hardware can reconfigure itself at each clock cycle, and implement a different instruction, Insi, at each clock cycle, as is depicted in FIG. 40. In some examples, the programmer writes the source code in a simplified version of C language. Then the compiler translates the C code to the native language of the nonlinear dynamics-based hardware. Each executable instruction of the program is translated to a set of binary code that reconfigures the nonlinear dynamics-based hardware to implement that instruction. In the example, a nonlinear dynamics-based reconfigurable hardware referred to as a "chaogate" can be used. The chaogate can be capable of implementing all two-input, one-output digital functions. This can provide an Arithmetic and Logic Unit ("ALU") that is capable of handling single-bit operands. As a result, in the version of the compiler, for simplicity but without loss of generality, the compiler can be designed and implemented for single bit operations. All variables in the source code can be single bit, and all operations are single bitwise operations. A screenshot of the LabVIEW interface is depicted in FIG. 41.

Figure 41:
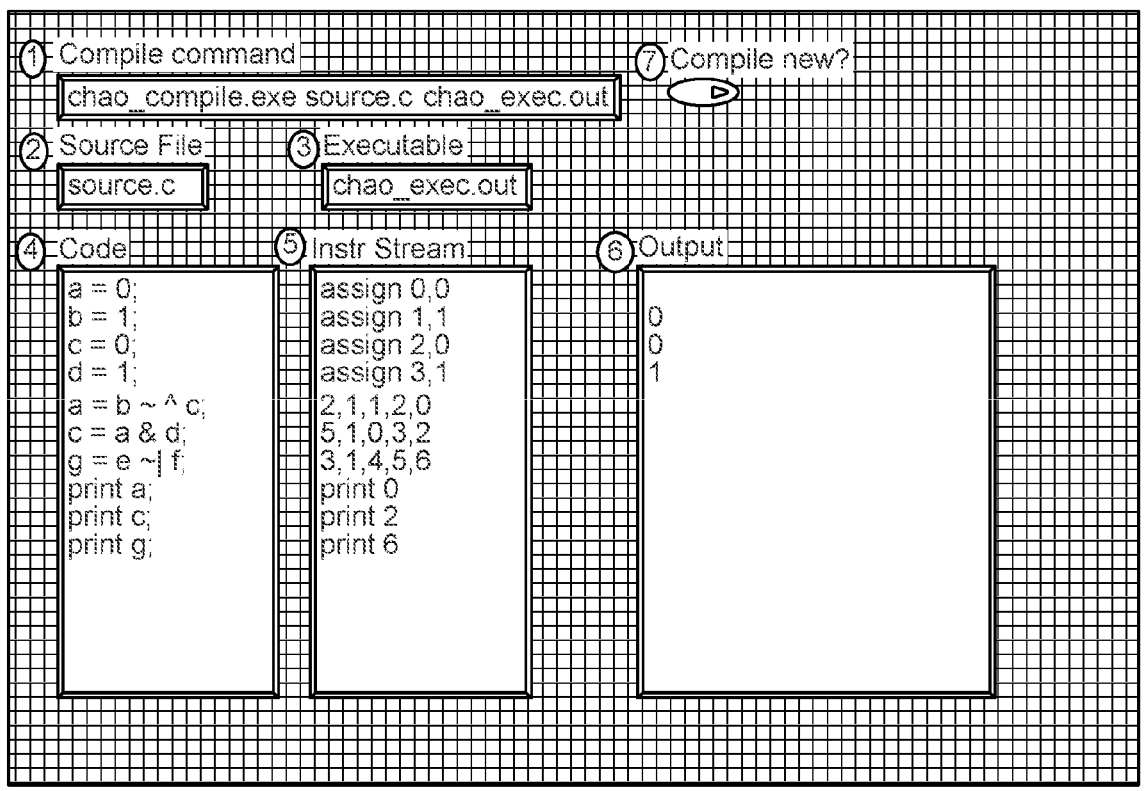
FIG. 41 is a screenshot of an example of a graphical user interface for compiling software to instructions for controlling a reconfigurable logic block according to one aspect of the present disclosure.

FIG. 41 includes a visual interface including a first input field 1, a second input field 2, a third input field 3, a fourth input field 4, an output field 5, an output window 6, and a compile button 7. A command to compile can be entered in the first input field 1. An input source file can be entered in the second input field 2. A name of the file to be generated can be input in the third input field 3. Source code can be input in the fourth input filed 4. Native machine code can be generated and displayed in the output field 5. The output of all operations can be displayed in the output window 6. The compile button 7 can be used to toggle between compiling the source code and using the source file in the second input field 2 to drive the chaogate.

The LabVIEW can provide a visual interface to run the compiler. LabVIEW and National Instruments DAQ can also electrically communicate with a fabricated chaogate.

To run the compiler directly without using LabVIEWs visual interface, the following command can be executed:
    chao_compile.exe
<input_source_file><output_executable_file>

The chaogate can implement the executable instructions. The instructions can perform operations on operands. The operands can be stored in a first location, and the results can be stored in a second location that is different than the first location. In some aspects, a microprocessor can include internal registers to hold the operands and the results. In additional or alternative aspects, the dynamics-based reconfigurable hardware can use simulated registers at the software level.

The source code can contain instructions to assign values to the registers and print the register value whenever a print statement is encountered. The instructions can be implanted at the software level as the instructions may not be executable instructions and can be used to assign initial values to the registers and show the content of the registers.

In the example of the compiler, a simplified version of C language is used. The compiler can recognize three types of operations: 1) the chaogate instruction (statements), 2) assign statements, and 3) print statements.

Chaogate statements can be of the type: <dest variable>=<src_reg1><operator><src_reg2>;

The compiler can convert the chaogate statement into instructions in the following format: <C1:C4>,<teration>, <src_reg1>,<src_reg2>,<dst_reg>

The mapping for the operator and <[C1:C4], Iteration> can be: &: bitwise AND to 5,1; ~|: bitwise NOR to 3,1; ~^: bitwise XOR to 2, 1.

The LabVIEW VI shown above has 26 software registers (one each mapped to the variables a to z). The compiler can take instructions in the above format, reads the src_reg1 and src_reg2 values, and can convert the instructions into the following format: <C1:C4>,<Iteration>,<operand1>,<operand2>

This is the machine code that then reconfigures the chaogate. And the output obtained is stored in the dst_reg software register.

An assign statement can have the format: <dest_reg>=<value>. In the compiler, this can be converted to: assign <dest_reg>,<value>. The instruction may not reach the chaogate, but can be used to assign values to the software registers in LabVIEW.

A print statement can have the format: Print <reg>. In the compiler, the instruction can be converted to: print <reg>. The instruction may not reach the chaogate, but can be used to print current software register values.

Figure 42:
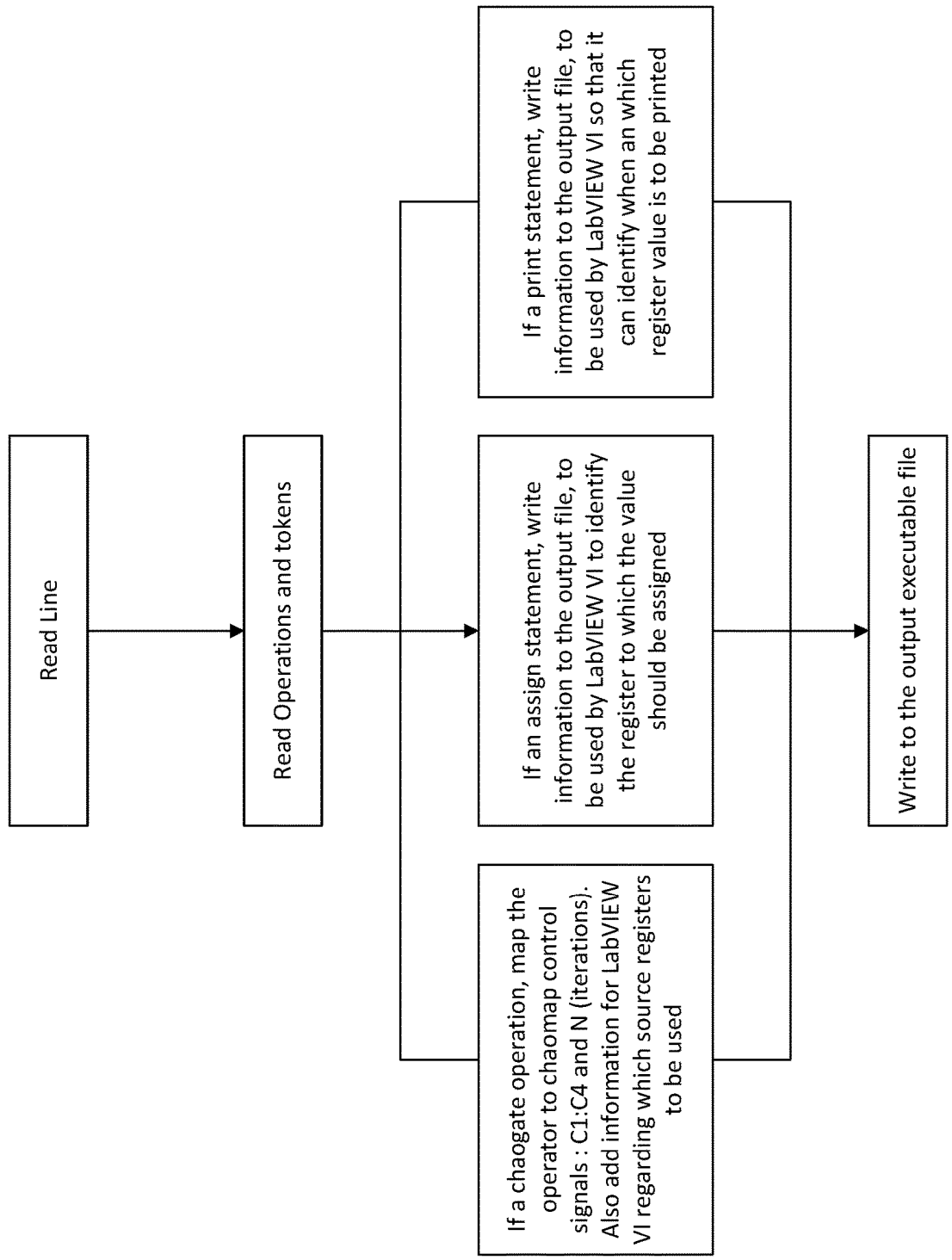
FIG. 42 is a flowchart of an example of a process for compiling instructions for a dynamics-based reconfigurable logic block according to one aspect of the present disclosure.

FIG. 42 depicts an example of a flow chart for compiling instructions for a dynamics-based reconfigurable logic block.

Figure 43:
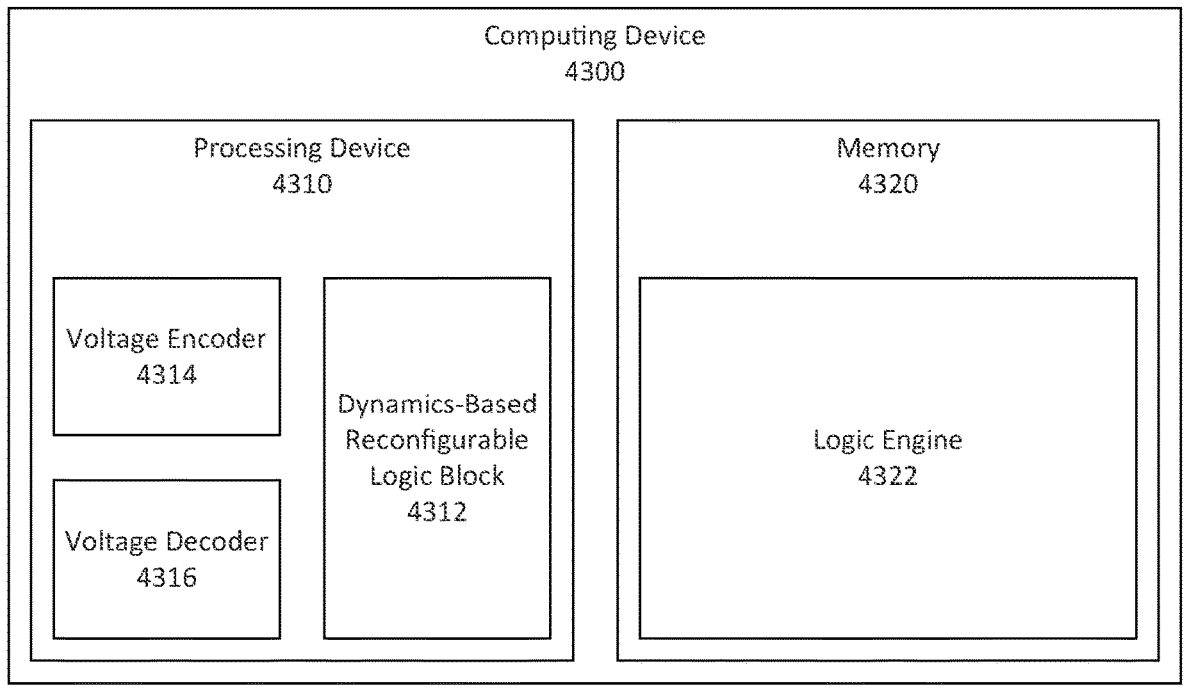
FIG. 43 is a block diagram of an example of a computing device for using a dynamics-based reconfigurable logic block according to one aspect of the present disclosure.

FIG. 43 is a block diagram of a computing device 4300 for using a dynamics-based reconfigurable logic block 4312. The computing device 4300 can include a processing device 4310 configured for executing program code stored in the memory 4320. Examples of the processing device 4310 can include a microprocessor, an application-specific integrated circuit ("ASIC"), a field-programmable gate array ("FPGA"), or other suitable processing device. The processing device 4310 can include the dynamics-based reconfigurable logic block 4312, a voltage encoder 4314, and a voltage decoder 4316. The voltage encoder 4314 can be conductively coupled to the dynamics-based reconfigurable logic block 4312 for applying an input voltage and a control voltage to the dynamics-based reconfigurable logic block 4312. The voltage decoder 4316 can be conductively coupled to the dynamics-based reconfigurable logic block 4312 for reading an output of the dynamics-based reconfigurable logic block 4312 to determine a result of an operation performed on the input voltage by the dynamics-based reconfigurable logic block 4312. Although FIG. 43 depicts the dynamics-based reconfigurable logic block 4312, voltage encoder 4314, and voltage decoder 4316 as included in the processing device 4310 other implementations are possible. For example, a voltage encoder and a voltage decoder can be independent components from a processing device and communicatively coupled to the processing device.

The processing device 4310 can include (or be communicatively coupled with) a non-transitory computer-readable memory 4320. The memory can include one or more memory devices that can store program instructions. The program instructions can include, for example, a logic engine 4322 that is executable by the processing device to perform certain operations described herein.

Immunity to Side-Band Attacks at the Gate Level

In some aspects, conventional gates and computing systems leak vital and critical information such as the data or the type of computation performed on this data through side bands. A vulnerability exists that could result in private information being obtained by monitoring the power consumption of a system. Different solutions have been proposed to guard and protect data against side-band attacks, but the approaches require an additional, relatively high power module to hide and mask the leaked signatures.

In some examples, using a chaotic systems can create immunity or increase immunity to side band attacks. Integrated circuits have been fabricated for chaos computing in which the same circuit implements different operations. As a result, chaos computing combined with its intrinsic ergodicity can result in a computing system that has the same averaged system characteristics regardless of which logic gate is controlled. The technology could be valuable to system engineers concerned with side-band attacks.

Stochastic Chaos Computing

Chaos computing circuits can be used outside of digital processing to include analog inputs and outputs. For example, chaos computing circuits can be used to convert analog inputs to digital inputs, remove noise from analog inputs, and convert digital signals to stochastic format. In a stochastic format, complex digital operations such as multiplication can be implemented using a single Boolean logic gate. In some examples, these tasks can be completed using just seven operational amplifiers, two switches, two capacitors, and a few resistors.

Signals within a computer system are digital. But, not all of these signals and values are originally digital in nature. For example, an embedded computer system in a coffee machine may monitor analog variables (e.g., temperature of the intake water, temperature of the coffee, and the steam pressure). These variables are digitalized to allow the embedded computer to process them. Chaos computing circuits can provide a smaller, slimmer data acquisition system where chaos based computing performs the tasks of multiple blocks in the chain, therefore saving power and silicon area.

Stochastic computing is a type of approximate computing. Numbers are assumed to be scaled in an interval [0, 1], and each number is encoded as a random stream of 0's and 1's, where the probability of the appearance of 1 in each location of the stream equals the number that the stream is supposed to represent:

$$\Im (\tau)=(\alpha_i)_{i=1,2, \ldots ,N} \text{ and } \alpha_i \in \{0,1\} \quad (16)$$

$$P(\alpha_i=1)=\tau$$

where $\tau$ is a real valued number that we intend to transform to the stochastic computing format, $\tau \in [0,1]$, $(\alpha_i)_{i=1,2, \ldots , N}$ is the produced bit stream in stochastic computing format, $\Im$ is the function that performs this transformation, and N is the arbitrary length of the stream.

As an example, the real valued number 0.5 could be encoded as a stream of, for example 100 0's and 1's, N=100, where the probability of 1 is 0.5. As a result, we expect that there will be about 50 1's in the stream and 50 0's. To decode the real valued number from the stream, we simply count the number of 1's in the stream.

If the process of encoding numbers to stochastic computing format is done using statistically independent random processes, then complex operations such as multiplication are easily executed using an AND gate. This feature is a simple corollary of probability of independent events in probability theory: $P(x \text{ AND } y)=P(x) \times P(y)$ This means that after encoding x and y to a stochastic computing format, the two streams can be feed into an AND gate, and the output stream of the AND gate represents the multiplication result.

Other complex operations such as addition can be implemented using stochastic computing. Implementing complex operations with simple gates can reduce the power consumption and area required by several orders of magnitude. The computation cost is in transforming the real valued number to the stochastic computing format.

Nonlinear dynamics and chaos computing can be used to perform stochastic computing and can convert real valued numbers to the stochastic computing format cheaply.

For example, when a real-valued input is used as a threshold value for partitioning the state space and producing the symbolic dynamics for a nonlinear oscillator, the resulting symbolic sequence could be the real-valued number in a stochastic computing format. In some aspects, piece-wise linear systems (e.g., a tent map system) can efficiently convert to the stochastic format. With the Tent map, the input $x_n$ can be mapped to the output $x_{n+1}$ as follows:

$$x_n + 1 = \begin{cases} 2x_n, & \text{if } x_n < 0.5 \\ 2 - 2x_n & \text{if } x_n \geq 0.5 \end{cases} \quad (17)$$

When $\tau$, $\tau \in [0,1]$ is used as a threshold value to symbolize an iterated Tent map as follows:

$$\alpha_i = \begin{cases} 1, & \text{if } x_i < \tau \\ 0 & \text{if } x_i \geq \tau \end{cases} \quad (18)$$

the resulting symbolic sequence $(\alpha_i)$ is the threshold value $\tau$ in the stochastic computing format.

In some aspects, a simple chaotic oscillator with a threshold mechanism can efficiently transform real-valued numbers to a stochastic computing domain, where multiplication can be executed with an AND gate. This can allow the advantages of stochastic computing to be accessible at minimal cost by using chaotic nonlinear circuits.

Figure 44:
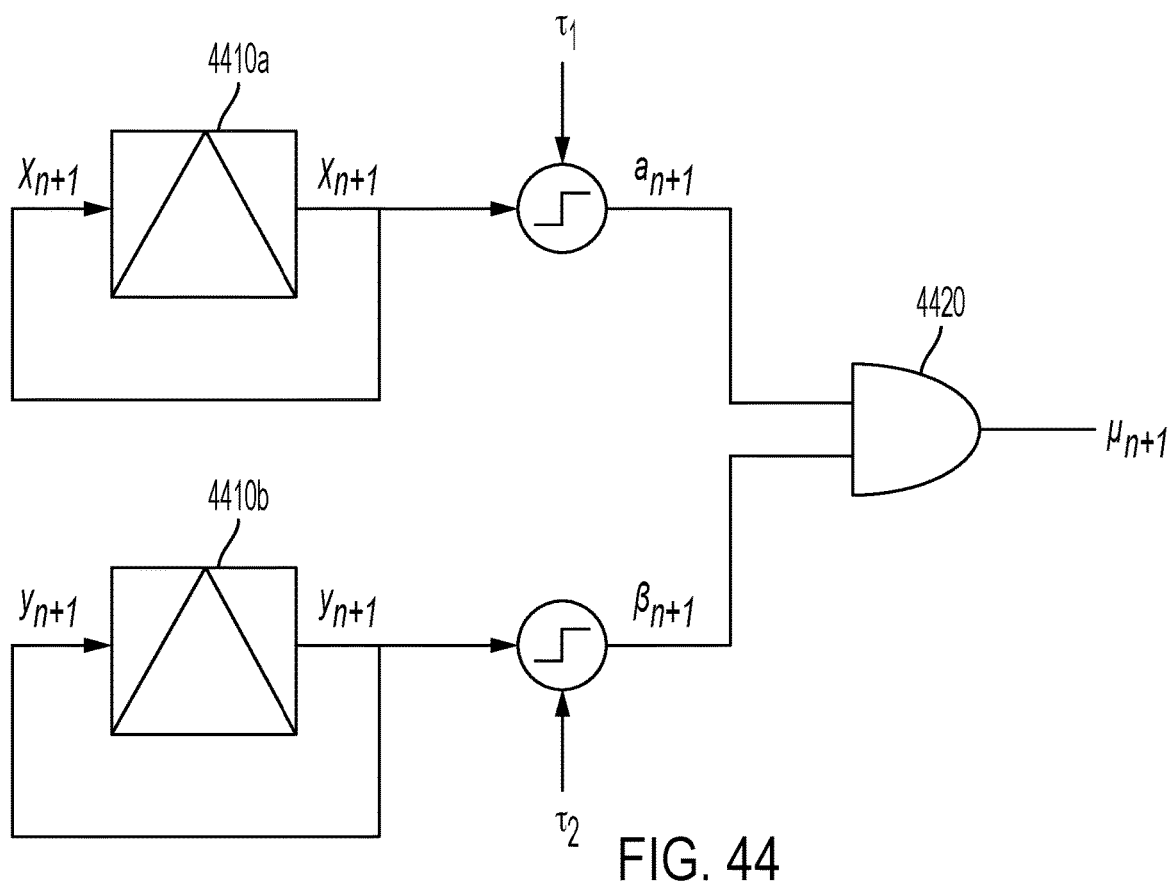
FIG. 44 is a schematic diagram of an example of nonlinear chaotic circuits coupled for use with stochastic computing according to one aspect of the present disclosure.

FIG. 44 depicts an example of chaotic nonlinear circuits 4410a-b being used to implement stochastic computing. Two real-valued, analog numbers $\tau_1$ and $\tau_1$ can be the inputs. The nonlinear circuits 4410 (in this case iterated Tent maps) start from any arbitrary or fixed initial condition, and their symbolic sequences are transformed to streams of '0's and '1's, $(\alpha_i)$ and $(\beta_i)$. By feeding these two streams to an AND gate 4420, the multiplication of two real-valued inputs can be obtained.

The nonlinear circuits can transform analog inputs to digital bits. The nonlinear circuits can further transform the inputs to a stochastic computing format, in which complex operations can be simply implemented using basic logic gates. For example, here multiplication is implemented with an AND gate.

In some example, chaos-based stochastic computing can also reduce the amount of noise on the input lines, $\tau_1$ and $\tau_2$. For example, the $\tau_1$ value can be varying due to noise, while it is applied as the threshold value. But, the effects of noise on the threshold value will be averaged out as the streams of '0's and '1's are being produced. In some aspects, the longer the length of the stream N is, the more precise the result of the computation. This implies that the precession of calculation is arbitrary and adjustable, and can be changed or adjusted after the system is fabricated. Allowing the system to be adjusted after fabrication can reduce the power consumption of the system when less precision is required.

Chaos based stochastic computing can allow for multiplication and other complex operations to be replaced by simple Boolean gates such as AND gate, as a result the chaos based stochastic computing can be a low power, low area solution. In some examples, chaos based stochastic computing can use ten times less power and area than binary computing. In some aspects, chaos based stochastic computing can directly accept analog inputs from the environment, and create digital output for processing, communication, or storage. This can be useful in internet of things nodes or in artificial intelligence solutions in which analog sensory data is being processed. In some aspects, chaos stochastic computing can also be robust to additive noise, be used in parallel processing, and have selective precision.

In some aspects, chaos stochastic computing can be used in image processing. For example, a system may include a series of image sensors, e.g. CMOS image sensors, where each sensor produces an analog value. The sensors can be aimed at an object, e.g., a U.S. Navy Blue Angels fighter jet. A grayscale digital picture may be obtained with a resolution of 345×527. Each pixel can be coded by an 8-bit number, {0, 1, 2, 3, . . . , 255}. 0 is black, 255 is white, and the other numbers in between are different shades of gray. Next a chaos-based method can be used to convert each analog sensor reading to a stream of 0's and 1's. As the length, N, of the stream, increases, the precision of the analog to digital conversion and the quality of the image increases as well even when the chaos-based circuits are used for the conversion.

In some examples, the analog readings can be very noisy. The chaos-based analog to digital conversion can almost completely remove noise from analog readings if there is no sample and hold circuit, and the comparator directly receives the analog inputs. At each iteration of the chaotic circuit, which results in the production of a new bit in the digital stream, the comparator compares the chaotic state with an instant value of the analog readings. Sometimes due to noise, the analog reading will be higher than the actual, noise free value, meaning that the produced bit is more likely to be 1; and sometime it will be lower, implying that the produced bit would be less likely to be 1. But, the analog value can be represented by a stream of the 0's and 1's, where the number is encoded as the ratio of the number of 1's to the length of the stream. The higher and lower probabilities of 1 caused by noise will average out each other's effects on the stream.

In this example, when the sample and hold circuit are removed and the analog readings flow directly into the chaos-based analog to digital conversion mechanism, the signals being read vary at a lower rate than the rate at which the chaos-based analog to digital convertor operates. In many embedded applications this assumption holds true. In many embedded applications, such as a coffee machine or an autonomous driver-less car, the rate that the signals vary is not too high. In some examples, chaos-based convertors can be designed and fabricated that iterate and produce digital bits at rates exceeding 100 MHz allowing the system to obtain a digital representation of an analog value before it has an opportunity to change.

In some aspects, the stochastic format can be easily converted to regular weighted digital format to reduce the bandwidth. A simple conventional counter can be used to count the number of the 1's in a stream, and that is going to be the regular weighted digital format. To create an analog output from the stochastic format, one can use an integrator to integrate the pulses of the stream. The number is encoded as the number of the 1's, so an integrator is integrating the pulses, and the value of the integration is going to be proportional to the number of the pulses in the stream.

In some examples, a system can include multiple nonlinear oscillators each coupled with a comparator for determining a threshold voltage based on an analog input. The analog input can be obtained from the environment of the comparator. The system can further include a deep learning neural network coupled to outputs of the comparators for receiving digital stochastic data representing the analog inputs and performing complex operations with simple logic gates.

Nonlinear Dynamics-Based Hardware Accelerator for Artificial Intelligence

Machine-learning techniques can be mated with nonlinear dynamics-based reprogrammable hardware. Machine-learning can be used to automate the process of programming the hardware. The chaos-based reconfigurable hardware can be considered a platform or an accelerator for AI and learning at the circuit level.

As described above, an architecture can include four two-input, one-output reconfigurable gates arranged in a column. The gates can receive new inputs from input pins of a chip or outputs of gates from previous computations can be fed-back to the gates again. Multiplexers can be programmed to select different inputs to each input line of each gate. Both the reconfigurable gates and the multiplexers can be programmable. This architecture can provide a suitable platform for AI and learning mechanisms. By changing the programming inputs, the hardware can be programmed to implement different objective functions and behaviors. By automating this programming method such as combining the programmable hardware with machine learning techniques, the architecture becomes an evolvable hardware that can evolve and learn to implement different operations with no need to direct programming.

Model-Based Automatic Design

In some aspects, a model of the reconfigurable gate in terms of its instruction set, which explains the relationship between the control inputs to a reconfigurable gate and the type of functions it implements for each control input is used. In additional or alternative aspects, a model for the architecture that combines these reconfigurable gates in a column and connects their outputs back to their inputs is used. Machine-learning techniques can be applied to this computer model to find the control inputs that program and connect this column of reconfigurable gates to implement different desired high-level functions. Then these control inputs can be applied to the actual fabricated integrated chip, and investigated and confirmed that the obtained programing inputs are correct and they can program the physical, fabricated integrated chip to implement those high-level objective functions.

In one example, a genetics algorithm can be used as a machine learning technique to train the model. But, other machine learning techniques can be also applied. The genetic algorithm is implemented as a C++ code. This code is run on a personal computer, and the same computer program is provided with the model architecture. The genetic program can train the model architecture, and at the end gives the proper programing input that programs the hardware to implement the desired objective function.

The architecture can be composed of four reconfigurable gates (e.g., one less than the architecture in FIG. 34). Each reconfigurable gate can be modeled with its instruction set, which says which function each reconfigurable gate implements when different control inputs are applied. Different control inputs can be applied to each reconfigurable gate inside the fabricated chip, and different associations between control inputs and the type of function that the gate implements can be observed. These associations can form an instruction set. The instruction set can be a part of the model for the chip. The table in FIG. 51 is the instruction set obtained for a single column architecture with four reconfigurable gates. Note that all four gates have the same instruction set because they have the identical circuit design and implementation. Each reconfigurable gate can receive four control bits, and can implement different two-input, one-output combinational functions. The first column is the four-bit control inputs to program the gate and the second column is the function number that the gate implements.

The function number is a unique number to label and identify different functions. The function number for each function can be obtained based on the outputs of the function when different combinations of the inputs are applied to the gate. As an example, when different input combinations 00, 01, 10, and 11 are applied to the gate and the outputs are 1, 0, 1, and 0, the function can be labeled as function number 10 because 10 is the output in weighted binary format: $1(MSB) \times 2^3 + 0 \times 2^2 + 1 \times 2^1 + 0(LSB) \times 2^0 = 10$.

The rest of the model is the connections in terms of how the inputs are connected to the reconfigurable gates via multiplexers, how the output of the gates are fed back to their inputs, and how these connections can be programmed. The aim of programing is to program this column of reconfigurable gates to implement different objective functions and operations.

In this example, the training is a supervised technique, and therefore the learning technique can use a benchmark to assess the operation of the trainee and to assign a fitness value to it. The genetic algorithm can uses this table as a benchmark to evaluate the performance of different programing inputs and to assign a fitness value to them.

Some of the parameters can be set manually. Alternatively these parameters could be included as additional learning parameters. In this example, the number of columns was set to five. The number of columns can indicate how many times the outputs of the gates are fed back to the input lines of the gates to perform more computation on them before producing the final outputs. The reconfigurable gates can be programmed differently for each column. Different control inputs can be provided for different columns.

In this example, new inputs can be applied to column 1. Column two, three, four, and five can receive the outputs of the gates from their previous columns as their inputs. The programmable multiplexers can perform this task of selecting different outputs of the gates to be used as the new inputs. In additional or alternative examples, a mixed architecture can be used in which new inputs could be used in other columns as well.

The reconfigurable gates can be designed and fabricated to have an internal iteration number. This iteration number can determines how long the dynamics-based gate should evolve over time before producing outputs. In this example, the internal iteration number is set to 1. Other parameters related to the genetic algorithm such as maximum (target) fitness value, population size, and mutation rate can change as the results evolve and converge to the objective function, and a maximum allowed number of genetic algorithm iterations.

Direct Training of the Fabricated Chip:

In some aspects, no modeling is involved, instead the actual fabricated chip can be directly trained and evolved to implement the desired objective functions. At each iteration of the learning, the computer system that executes and manages the learning algorithm can fed a set of control inputs to the fabricated chip to reprogram it and to observes the outputs of the chip, and then based on how well or badly the chip implemented the objective function, the learning algorithm adjusted and changed the control inputs to further improve the performance of the chip in implementing the that objective function. This process can be repeated until the desired objective function or behavior is achieved.

The genetic algorithm can be written in the form of a LabVIEW IDE program. The algorithm can apply different programing inputs to the chip, and obtain real outputs from the fabricated chip to determine the fitness value of the current circuit design.

In some examples, Hamming weight can be examined as an objective function. Hamming weight of a binary string is the number of 1's in the stream. Similar to model based learning, some assumptions can be made and some parameters can be set manually, although the system can also learn them. The iteration number that adjusts how long the dynamics-based gate should evolve over time before producing the outputs can be set to one. The number of columns can be set to three, assuming that three columns are enough to implement this objective function. The inputs can be fed to the first column, and the output of the three gates from column three can be considered as the outputs.

The same genetic algorithm described above can be used, but instead of using a model of the chip, now the programing inputs can be directly sent to the fabricated chip to program it and the outputs can be obtained from the fabricated chip. These data delivery and acquisition can be performed with a data acquisition system. The learning algorithm can observes how well or badly the fabricated chip implements the objective functions and changes the programing inputs accordingly. In this example, the algorithm converged and after 1240 iterations of the algorithm, the fabricated circuit was able to perform the Hamming weight.

Nonlinear dynamics-based hardware can be reconfigurable and flexible, and can be reprogrammed to implement different functions. Leaning can be implemented at the circuit level and hardware can evolve to implement an objective function. In some aspects, a model of hardware can be used for training and learning purposes. In additional or alternative aspects, the hardware itself can be put in a loop with a learning method to evolve and learn how to implement different objective functions. In some examples, the model-based learning can be faster because it does not require live communications between the hardware and the training module. Model based-learning can be a design-time process in the sense that the programing inputs can be found during the design of the system and then they can be hardwired into the hardware. In some examples, direct training of the hardware avoids modeling. Models have limitations and may not fully represent the exact operation of the hardware, the possible faults or imperfections within the system, or the interactions between the hardware and the environment that the hardware is located. In direct training of the hardware all those parameters and factors are included in the training. And the learning method automatically adjusts the programing inputs to compensate the effects of

What is claimed is:

1. A system comprising:
   a nonlinear oscillator for performing an operation on an input signal, the operation being changeable;
   a decoder communicatively coupled to the nonlinear oscillator for receiving an output signal from the nonlinear oscillator that results from the operation performed on the input signal, for comparing the output signal to a threshold value based on an analog input, and for determining a result of the operation, wherein the result of the operation is the analog input in digital stochastic format; and
   an encoder for generating the input signal and a control signal, wherein the nonlinear oscillator is communicatively coupleable to the encoder for receiving the input signal and the control signal and for determining the operation from a plurality of operations based on the control signal.

2. The system of claim 1, wherein the nonlinear oscillator is configured to perform the operation on an input voltage representing the input signal, wherein the decoder includes a voltage decoder configured to receive an output voltage representing the output signal, wherein the encoder includes a voltage encoder configured to generate the input voltage and a control voltage representing the control signal.

3. The system of claim 2, wherein the input voltage is a plurality of input voltages, and wherein the nonlinear oscillator is configured for performing the operation by performing at least one of a signal processing operation, logic operation, an arithmetic operation, or an analog-to-digital conversion.

4. The system of claim 3, wherein the nonlinear oscillator is a discrete nonlinear circuit, the system further comprising a feedback loop to provide an output of the nonlinear oscillator as an input to the nonlinear oscillator, the discrete nonlinear circuit being communicatively coupled to the voltage encoder for performing a number of iterations of the feedback loop based on the control voltage and determining the output voltage is an interim voltage after the number of iterations are performed, wherein the discrete nonlinear circuit has a fixed number of transistors for performing a plurality of operations and a linear increase in the number of iterations corresponds to an exponential increase in a number of the plurality of operations.

5. The system of claim 1, further comprising a logic gate conductively couple to the decoder for receiving digital stochastic data, an output of the logic gate being a result of a complex operation performed on a real number version of the result and a real number version of the digital stochastic data.

6. The system of claim 5, wherein the logic gate includes an AND gate, and an output of the and gate being a multiplication of the real number version of the result and the real number version of the stochastic data.

7. The system of claim 1, wherein result of the operation is a stream of digital data representing the analog input, the stream of digital data having a lower noise level than the analog input.

8. The system of claim 1 wherein the decoder comprises a comparator.

9. A non-transitory computer-readable medium in which instructions executable by a processing device are stored for causing the processing device to:
   receive program instructions to execute an operation;
   determine machine code instructions based on the program instructions;
   configure a dynamics-based logic block to perform the operation by determining a control signal to apply to the dynamics-based logic block and determining an amount of time to wait before reading an output of the dynamics-based logic block, the dynamics-based logic block including a nonlinear circuit that is reconfigurable to perform a plurality of operations and a feedback loop such that an output of the nonlinear circuit is fed back to an input of the nonlinear circuit; and
   protect the processing device from side-band attacks by causing the dynamics-based logic block to generate constant system characteristics regardless of the plurality of operations.

10. The non-transitory computer-readable medium of claim 9 further comprising additional instructions executable by the processing device to determine a configuration for the dynamics-based logic block based on testing the dynamics-based logic block using different control signals and determining an operation performed in response to each control signal.

11. The non-transitory computer-readable medium of claim 9, further comprising additional instructions executable by the processing device to configure the nonlinear circuit to operate as an analog-to-digital converter.

12. The non-transitory computer-readable medium of claim 9, further comprising additional instructions executable by the processing device to train the nonlinear circuit by applying different control signals for a series of iterations and recording the operations implemented by the nonlinear circuit for the different control signals after each iteration for use by a encoder in determining subsequent control signals.

13. The non-transitory computer-readable medium of claim 9, wherein the instructions for causing the processing device to configure the dynamics-based logic block further comprises instructions for determining a number of clock cycles to wait before reading the output of the dynamics-based logic block, the nonlinear circuit including a discrete nonlinear circuit that performs a different operation based on the number of clock cycles that pass between reading the output.

14. The non-transitory computer-readable medium of claim 9, further comprising additional instructions executable by the processing device for causing processing device to:
   apply an input voltage and a control voltage representing the control signal to the dynamics-based logic block; and
   determine a result of performing the operation on the input voltage by reading the output of the dynamics-based logic block after the amount of time.

15. The non-transitory computer-readable medium of claim 14, wherein the dynamics-based logic block is a first dynamics-based logic block, the non-transitory computer-readable medium further comprising additional instructions executable by the processing device for causing processing device to determine another result of performing another operation on the input voltage by reading an output of a second dynamics-based logic block included in the feedback loop after the amount of time.

* * * * *